US012798098B2

(12) United States Patent
Hashiguchi et al.

(10) Patent No.: US 12,798,098 B2
(45) Date of Patent: Nov. 17, 2026

(54) DEVICE CONTROL BASED ON EXECUTION COMMAND AND UPDATED ENVIRONMENT INFORMATION

(71) Applicant: KABUSHIKI KAISHA YASKAWA DENKI, Kitakyushu (JP)

(72) Inventors: Yukio Hashiguchi, Fukuoka (JP); Yoshifumi Onoyama, Fukuoka (JP)

( * ) Notice: Subject to any disclaimer, the term of this patent is extended or adjusted under 35 U.S.C. 154(b) by 487 days.

(21) Appl. No.: 18/062,019

(22) Filed: Dec. 6, 2022

(65) Prior Publication Data

US 2023/0099602 A1 Mar. 30, 2023

Related U.S. Application Data

(63) Continuation of application No. PCT/JP2021/021758, filed on Jun. 8, 2021.

(Continued)

(30) Foreign Application Priority Data

Aug. 21, 2020 (JP) ................................ 2020-140303

(51) Int. Cl.
*B25J 9/16* (2006.01)
*G05B 19/418* (2006.01)

(52) U.S. Cl.
CPC ........... *B25J 9/1679* (2013.01); *B25J 9/1666* (2013.01); *G05B 19/41815* (2013.01); *G05B 19/41865* (2013.01)

(58) Field of Classification Search
CPC ...... B25J 9/1679; B25J 9/1666; B25J 9/1669; B25J 9/1682; B25J 9/1661; B25J 9/1656;

(Continued)

(56) References Cited

U.S. PATENT DOCUMENTS 6,160,371 A * 12/2000 Tachikawa ................ G01S 5/30 901/6
8,380,652 B1 * 2/2013 Francis, Jr. ............ B25J 9/1661 706/48

(Continued)

FOREIGN PATENT DOCUMENTS

CN 102341046 2/2012
CN 108508762 9/2018

(Continued)

OTHER PUBLICATIONS

Dixon K., et al., RAVE: A Real and Virtual Environment for Multiple Mobile Robot Systems, IEE/RSJ 1999 (Year: 1999).*

(Continued)

*Primary Examiner* — Eric J Yoon
(74) *Attorney, Agent, or Firm* — SHIPWAY IP

(57) ABSTRACT

A production system includes: a plurality of controllers configured to control a plurality of devices, the plurality of devices including at least one robot; and circuitry communicable with the plurality of controllers, the circuitry may be configured to: output execution commands of next tasks based on a process including a plurality of tasks for a workpiece and progress information of the process; store environment information; and update the stored environment information in accordance with operations of the plurality of devices, wherein each of the plurality of controllers is configured to control one of the plurality of devices to execute a next task corresponding to one of the execution commands based on the environment information.

20 Claims, 41 Drawing Sheets

Related U.S. Application Data

(60) Provisional application No. 63/046,701, filed on Jul. 1, 2020, provisional application No. 63/035,829, filed on Jun. 8, 2020.

(58) Field of Classification Search
CPC ........ G05B 19/41815; G05B 19/41865; G05B 2219/32297; G05B 19/418; G05B 2219/40584; G05B 13/04; G05B 2219/39138; G05B 2219/40317; G05D 1/0297; G05D 1/0225
See application file for complete search history.

(56) References Cited

U.S. PATENT DOCUMENTS

| | | | | |
|---|---|---|---|---|
| 10,105,847 | B1 | 10/2018 | Latimer et al. | |
| 10,207,407 | B1 * | 2/2019 | Kuffner | G05D 1/0088 |
| 10,792,810 | B1 | 10/2020 | Beckman et al. | |
| 2004/0225484 | A1 | 11/2004 | Hamann | |
| 2005/0071048 | A1 | 3/2005 | Watanabe et al. | |
| 2006/0009878 | A1 | 1/2006 | Kobayashi et al. | |
| 2006/0276934 | A1 | 12/2006 | Nihei et al. | |
| 2007/0135932 | A1 | 6/2007 | Pannese | |
| 2009/0198370 | A1 | 8/2009 | Nishi et al. | |
| 2011/0306986 | A1 | 12/2011 | Lee et al. | |
| 2014/0148949 | A1 | 5/2014 | Graca et al. | |
| 2015/0032244 | A1 | 1/2015 | Hashiguchi et al. | |
| 2015/0277398 | A1 * | 10/2015 | Madvil | B25J 9/1671 901/3 |
| 2015/0306763 | A1 * | 10/2015 | Meier | G05B 19/42 901/3 |
| 2015/0379171 | A1 | 12/2015 | Kuwahara | |
| 2016/0075019 | A1 | 3/2016 | Tabuchi et al. | |
| 2016/0136815 | A1 | 5/2016 | Linnell et al. | |
| 2017/0227945 | A1 | 8/2017 | Wang et al. | |
| 2017/0232614 | A1 | 8/2017 | Takeda | |
| 2018/0021952 | A1 | 1/2018 | Fujieda et al. | |
| 2018/0079078 | A1 | 3/2018 | Nagatsuka et al. | |
| 2018/0164788 | A1 | 6/2018 | Shimamura et al. | |
| 2018/0224841 | A1 | 8/2018 | Tani et al. | |
| 2018/0264649 | A1 | 9/2018 | Ojima et al. | |
| 2018/0326583 | A1 * | 11/2018 | Baroudi | B25J 9/1661 |
| 2019/0133689 | A1 | 5/2019 | Johnson et al. | |
| 2019/0291277 | A1 | 9/2019 | Oleynik | |
| 2019/0308322 | A1 | 10/2019 | Nishitani et al. | |
| 2019/0358816 | A1 | 11/2019 | Saito et al. | |
| 2020/0061817 | A1 | 2/2020 | Takeuchi et al. | |
| 2020/0101610 | A1 | 4/2020 | Thackston et al. | |
| 2020/0249654 | A1 | 8/2020 | Edwards et al. | |
| 2020/0276708 | A1 | 9/2020 | Shah et al. | |
| 2020/0376675 | A1 | 12/2020 | Bai et al. | |
| 2020/0398424 | A1 | 12/2020 | Hane et al. | |
| 2021/0053227 | A1 | 2/2021 | Wartenberg et al. | |
| 2021/0078167 | A1 | 3/2021 | Khansari Zadeh et al. | |
| 2021/0089040 | A1 | 3/2021 | Ebrahimi Afrouzi et al. | |
| 2021/0122046 | A1 | 4/2021 | Sun et al. | |
| 2021/0387350 | A1 | 12/2021 | Oleynik | |
| 2022/0016763 | A1 * | 1/2022 | Chen | B25J 9/163 |
| 2022/0072703 | A1 | 3/2022 | Hashiguchi et al. | |

FOREIGN PATENT DOCUMENTS

| | | | | |
|---|---|---|---|---|
| CN | 109571476 | | 4/2019 | |
| CN | 110225100 | | 9/2019 | |
| CN | 110597162 | | 12/2019 | |
| CN | 110712205 | | 1/2020 | |
| CN | 110800033 | | 2/2020 | |
| EP | 2829932 | | 1/2015 | |
| EP | 3363604 | | 8/2018 | |
| EP | 3385797 | | 10/2018 | |
| JP | H2-257204 | | 10/1990 | |
| JP | H6-301412 | | 10/1994 | |
| JP | H7-044214 | | 2/1995 | |
| JP | H7-160323 | | 6/1995 | |
| JP | H7-200019 | | 8/1995 | |
| JP | H9-081218 | | 3/1997 | |
| JP | 2002-318607 | | 10/2002 | |
| JP | 2004-038565 | | 2/2004 | |
| JP | 2005-103681 | | 4/2005 | |
| JP | 2005-316937 | | 11/2005 | |
| JP | 2006-343828 | | 12/2006 | |
| JP | 2012-181574 | | 9/2012 | |
| JP | 2015-024477 | | 2/2015 | |
| JP | 2016-059985 | | 4/2016 | |
| JP | 2017-102620 | | 6/2017 | |
| JP | 2018-051686 | | 4/2018 | |
| JP | 2018-097661 | | 6/2018 | |
| JP | 2018-153881 | | 10/2018 | |
| JP | 2019-504421 | | 2/2019 | |
| JP | 2019-209454 | | 12/2019 | |
| JP | 6658985 | | 3/2020 | |
| WO | 2010/110560 | | 9/2010 | |
| WO | 2017/068559 | | 4/2017 | |
| WO | 2017/136645 | | 8/2017 | |
| WO | WO2018077032 | * | 5/2018 | G05B 19/00 |
| WO | 2019/005983 | | 1/2019 | |
| WO | 2019/064916 | | 4/2019 | |
| WO | 2020/234946 | | 11/2020 | |

OTHER PUBLICATIONS

Office Action issued in Japanese Patent Application No. P2021-155480, dated Oct. 22, 2024 (with English partial translation).

Extended Search Report in corresponding European Application No. 21822136.4, dated Oct. 30, 2024.

Office Action issued in Japanese Patent Application No. P2021-097363, dated Jul. 2, 2024 (with English partial translation).

Extended Search Report in corresponding European Application No. 21820875.9, dated Jun. 26, 2024.

Office Action issued in U.S. Appl. No. 17/361,323, dated May 10, 2023.

International Search Report dated Aug. 31, 2021 for PCT/JP2021/021758.

International Search Report dated Aug. 10, 2021 for PCT/JP2021/021772.

International Preliminary Report on Patentability with Written Opinion dated Dec. 22, 2022 for PCT/JP2021/021758.

International Preliminary Report on Patentability with Written Opinion dated Dec. 22, 2022 for PCT/JP2021/021772.

Office Action issued in Japanese Patent Application No. P2020-140303, dated Jan. 5, 2021 (with English partial translation).

Office Action issued in Japanese Patent Application No. P2020-140303, dated May 11, 2021 (with English partial translation).

Office Action issued in Japanese Patent Application No. P2020-140307, dated Apr. 13, 2021 (with English partial translation).

Extended Search Report in corresponding European Application No. 21181526.1, dated Nov. 22, 2021.

SOEI Patent and Law Firm, Statement of Related Matters, dated Feb. 3, 2023.

Office Action issued in European Patent Application No. 21822136.4, dated Jun. 4, 2024.

Office Action issued in Chinese Patent Application No. 202110729979.6, dated Nov. 30, 2023 (with English partial translation).

Office Action issued in Chinese Patent Application No. 202180039869.5 dated Jun. 27, 2025 (with English partial translation).

Office Action issued in Chinese Patent Application No. 202180039808.9, dated Dec. 19, 2025 (with English partial translation).

Office Action issued in Chinese Patent Application No. 202180039869.5, dated Mar. 2, 2026 (with English partial translation).

* cited by examiner

*Fig.4*

| WORKPIECE | TASK 1 | TASK 2 | TASK 3 | TASK 4 | TASK 5 | ··· |
|---|---|---|---|---|---|---|
| A | a1 | a2 | a3 | | | |
| B | b1 | b2 | b3 | b4 | b5 | |
| C | c1 | c2 | | | | |
| D | d1 | d2 | d3 | | | |
| E | e1 | e2 | e3 | e4 | | |
| ··· | | | | | | |
| | | | | | | |
| | | | | | | |

*Fig.5*

| DEVICE ID | STATE PARAMETER 1 | STATE PARAMETER 2 | STATE PARAMETER 3 | STATE PARAMETER 4 | ... | STATE PARAMETER N |
|---|---|---|---|---|---|---|
| | | | | | | |
| | | | | | | |
| | | | | | | |
| | | | | | | |
| | | | | | | |
| | | | | | | |
| | | | | | | |
| | | | | | | |

Fig.6

| TYPE | SERIAL No. | POSITION |
|---|---|---|
| | | |
| | | |
| | | |
| | | |
| | | |
| | | |
| | | |
| | | |

*Fig.7*

131

| | |
|---|---|
| PRIORITY | 1 |
| EXECUTION PROPRIETY CONDITION 1 | NO OBSTACLES IN OPERATION RANGE OF SUBORDINATE LOCAL DEVICE |
| EXECUTION PROPRIETY CONDITION 2 | POSITION OF WORKPIECE = PREDETERMINED POSITION |
| EXECUTION PROPRIETY CONDITION 3 | NO OTHER WORKPIECE AT DESTINATION |
| EXECUTION PROPRIETY CONDITION 4 | DESTINATION IS OPEN |
| ... | |
| | |
| | |
| | |

Fig.8

| REMAINING TASK |
| --- |
| a1 |
| b2 |
| e3 |
| ... |
| |
| |
| |
| |

Fig.16

| TASK | REAL EXECUTION TIME LENGTH | VIRTUAL EXECUTION TIME LENGTH | REAL STATE INFORMATION | VIRTUAL STATE INFORMATION |
|---|---|---|---|---|
| | | | | |
| | | | | |
| | | | | |
| | | | | |
| | | | | |
| | | | | |
| | | | | |
| | | | | |

DEVICE CONTROL BASED ON EXECUTION COMMAND AND UPDATED ENVIRONMENT INFORMATION

CROSS-REFERENCE TO RELATED APPLICATIONS

This application is a continuation application of PCT Application No. PCT/JP2021/021758, filed on Jun. 8, 2021, which claims the benefit of priority from Japanese Patent Application No. 2020-140303, filed on Aug. 21, 2020, and U.S. Provisional Patent Application No. 63/046,701, filed on Jul. 1, 2020, and U.S. Provisional Patent Application No. 63/035,829, filed on Jun. 8, 2020. The entire contents of the above listed PCT and priority applications are incorporated herein by reference.

BACKGROUND

Field

The present disclosure relates to a production system, a control method, and a non-transitory memory device.

Description of the Related Art

Japanese Unexamined Patent Application Publication No. 2018-153881 discloses a control system including a first controller, a second controller, and a third controller. The third controller includes a first communication unit and a second communication unit. The third controller further includes a control processing unit configured to execute: outputting a first operation command for operating a first control target to the first controller via the first communication unit; outputting a second operation command for operating a second control target to the second controller via the second communication unit; acquiring information about a current position of the first control target from the first controller via the first communication unit; and correcting the second operation command based on the information about the current position of the first control target.

SUMMARY

Disclosed herein is a production system. The production system may include: a plurality of controllers configured to control a plurality of devices, the plurality of devices including at least one robot; and circuitry communicable with the plurality of controllers, the circuitry may be configured to: output execution commands of next tasks based on a process including a plurality of tasks for a workpiece and progress information of the process; store environment information; and update the stored environment information in accordance with operations of the plurality of devices, wherein each of the plurality of controllers is configured to control one of the plurality of devices to execute a next task corresponding to one of the execution commands based on the environment information.

Additionally, a control method is disclosed herein. The control method may include: outputting execution commands of next tasks based on a process including a plurality of tasks for a workpiece and progress information of the process; storing environment information; updating the stored environment information in accordance with operations of the plurality of devices; and controlling each of the plurality of devices to execute a next task corresponding to one of the execution commands based on the environment information.

Additionally, a non-transitory memory device is disclosed herein. The memory device may have instructions stored thereon that, in response to execution by a processing device, cause the processing device to perform operations. The operations may include: receiving one of execution commands for next tasks output, for controlling a plurality of devices, by circuitry based on a process including a plurality of tasks for a workpiece and progress information of the process; receiving environment information updated by the circuitry in accordance with operations of the plurality of devices; and controlling one of the plurality of devices to execute a next task corresponding to the received one of the execution commands based on the received environment information.

BRIEF DESCRIPTION OF THE DRAWINGS

FIG. 4 is a table illustrating an example allocation result of processes to workpieces.

FIG. 5 is a table illustrating example device information.

FIG. 6 is a table illustrating example workpiece information.

FIG. 7 is a table illustrating an example execution condition.

FIG. 8 is a table illustrating an example content of the command buffer.

FIG. 16 is a table illustrating an example comparative displaying of execution situations.

DETAILED DESCRIPTION

In the following description, with reference to the drawings, the same reference numbers are assigned to the same components or to similar components having the same function, and overlapping description is omitted.

Production System

Figure 1:
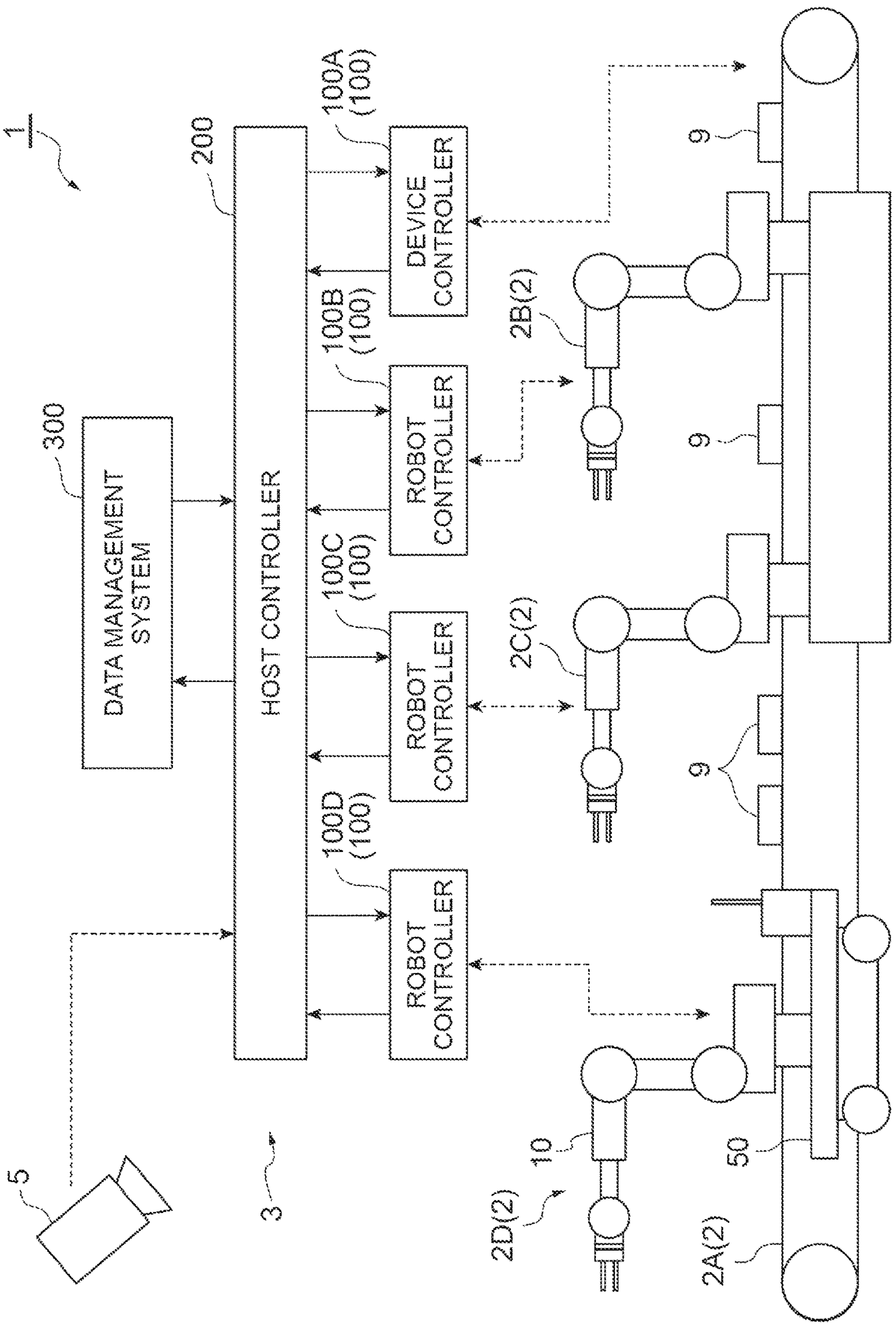
FIG. 1 is a schematic diagram illustrating an example configuration of a production system.

A production system 1 illustrated in FIG. 1 is a system for producing workpieces by cooperative operation of a plurality of local devices. Hereinafter, all objects to be worked by each local device in the production process of workpieces will be referred to as "workpieces". For example, the term "workpiece" includes a final product in the production system 1, a component of the final product, and a unit obtained by combining a plurality of components.

Cooperative operation means that a plurality of local devices operate so as to share a plurality of processes for obtaining at least one final product. The plurality of local devices may operate so as to share a plurality of processes for obtaining one final product in units of processes, or may operate so as to share a plurality of processes for obtaining a plurality of final products in units of final products.

The production system 1 includes a plurality of local devices 2 and a control system 3. The local devices 2 are devices that perform direct operation on a workpiece 9 at the site where the workpiece 9 is produced. The direct operation is an operation of applying some energy such as heat energy, kinetic energy, or potential energy to the workpiece 9.

Each of the plurality of local devices 2 is, for example, an industrial machine. The plurality of local devices 2 includes at least a robot (at least one local device 2 is a robot). The plurality of local device 2 include an industrial machine that cooperates with the robot. Examples of industrial machines that cooperate with the robot include NC machine tool, in addition to another robot. The plurality of local devices 2 illustrated in FIG. 1 include, but are not limited to, a transport device 2A, robots 2B and 2C, and a mobile robot 2D. The number and type of local devices 2 may be changed as long as at least one robot is included.

The transport device 2A transports the workpiece 9 using, for example, an electric motor or the like as a power source. Examples of the transport device 2A include a belt conveyor and a roller conveyor. The robots 2B and 2C, and the mobile robot 2D perform operations on the workpiece 9 transported by the transport device 2A. Examples of the operation on the workpiece 9 include assembly of another workpiece 9 (for example, a sub-part) to the workpiece 9 (for example, a base part) transported by the transport device 2A, fastening (for example, bolt fastening) and joining (for example, welding) of parts in the workpiece 9 transported by the transport device 2A, carrying-in of the workpiece 9 to an NC machine tool installed around the transport device 2A, carrying-out of the workpiece 9 from the NC machine tool, and the like.

Figure 2:
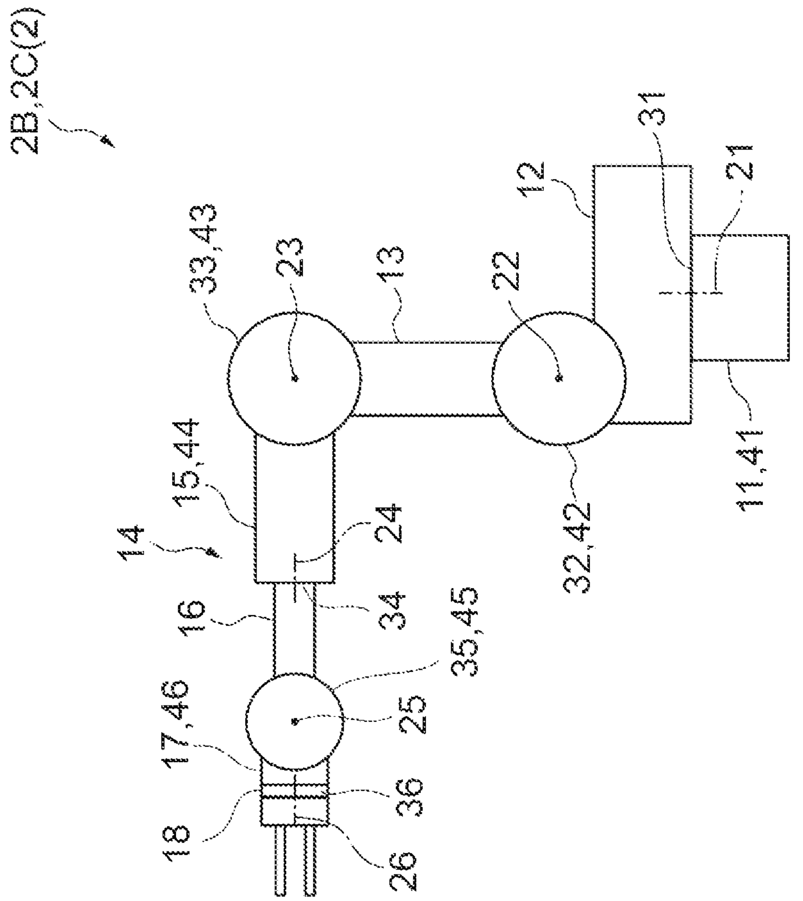
FIG. 2 is a schematic diagram illustrating an example configuration of a robot.

The robots 2B and 2C are multi jointed robots having a base 11 and a tip portion 18. The robots 2B and 2C change the position/posture of the tip portion 18 with respect to the base 11 by operating multiple joints in a complex manner, and perform operations on the workpiece 9 with the tip portion 18. For example, the robots 2B and 2C are six-axis vertical articulated robots, and as illustrated in FIG. 2, include the base 11, a pivoting portion 12, a first arm 13, a second arm 14, a third arm 17, the tip portion 18, and actuators 41, 42, 43, 44, 45, and 46. The base 11 is installed around the transport device 2A. The pivoting portion 12 is provided on the base 11 so as to turn around a vertical axis 21. The first arm 13 is connected to the pivoting portion 12 so as to swing around an axis 22 intersecting (for example, orthogonal to) the axis 21. The intersecting includes a case where there is a twisted relationship such as so-called three-dimensional crossing. The second arm 14 is connected to the tip portion of the first arm 13 so as to swing around an axis 23 substantially parallel to the axis 22. The second arm 14 includes an arm base 15 and an arm end 16. The arm base 15 is connected to a tip portion of the first arm 13 and extends along an axis 24 intersecting (e.g., orthogonal to) the axis 23. The arm end 16 is connected to a tip portion of the arm base 15 so as to turn around an axis 24. The third arm 17 is connected to a tip portion of the arm end 16 so as to swing around an axis 25 intersecting (for example, orthogonal to) the axis 24. The tip portion 18 is connected to a tip portion of the third arm 17 so as to turn around an axis 26 intersecting (e.g., orthogonal to) the axis 25. A Work tool such as a hand, a suction nozzle, a welding torch and the like is attached to the tip portion 18.

As described above, the robots 2B and 2C have a joint 31 connecting the base 11 and the pivoting portion 12, a joint 32 connecting the pivoting portion 12 and the first arm 13, a joint 33 connecting the first arm 13 and the second arm 14, a joint 34 connecting the arm base 15 and the arm end 16 in the second arm 14, a joint 35 connecting the arm end 16 and the third arm 17, and a joint 36 connecting the third arm 17 and the tip portion 18.

The actuators 41, 42, 43, 44, 45, and 46 include, for example, an electric motor and a speed reducer, and respectively drive the joints 31, 32, 33, 34, 35, and 36. For example, the actuator 41 turns the pivoting portion 12 around the axis 21, the actuator 42 swings the first arm 13 around the axis 22, the actuator 43 swings the second arm 14 around the axis 23, the actuator 44 turns the arm end 16 around the axis 24, the actuator 45 swings the third arm 17 around the axis 25, and the actuator 46 turns the tip portion 18 around the axis 26.

The configurations of the robots 2B and 2C may be changed. For example, the robots 2B and 2C may be seven-axis redundant robots in which one joint is further added to the 6-axis vertical articulated robot, or may be so-called SCALA multi-jointed robots.

Referring back to FIG. 1, the mobile robot 2D is a multi jointed robot capable of autonomous traveling. The mobile robot 2D includes a robot 10 configured similarly to the robots 2B and 2C, and an unmanned transport vehicle 50. The unmanned transport vehicle 50 autonomously travels so as to transport the robot 10. Examples of the unmanned transport vehicle 50 include so-called electric automated guided vehicles (AGVs). The robot 10 changes the position/posture of the tip portion 18 with respect to the unmanned transport vehicle 50 by operating multiple joints in a complex manner, and performs operation on the workpiece 9 with the tip portion 18.

The production system 1 may further include an external sensor 5. The external sensor 5 detects the state of the work environment of the plurality of local device 2 (hereinafter referred to as an "environmental state"). Examples of the external sensor 5 include a camera that captures an image of a work environment of the plurality of local devices 2. The external sensor 5 may be a sensor that detects the presence or absence of the workpiece 9 at a predetermined position by laser light or the like, or may be a sensor that detects the size or the like of the workpiece 9. The production system 1 may include a plurality of the external sensor 5.

The control system 3 controls the plurality of local devices 2. Hereinafter, an example configuration of the control system 3 will be described in detail.

Control System

In the production system 1, an inconsistency may occur between a target production pace of the workpiece 9 and an actual production pace of the workpiece 9. In addition, an inconsistency may occur between a target quality of the workpiece 9 and an actual quality of the workpiece 9. Hereinafter, these inconsistencies are referred to as "inconsistency of production situation". In a case where a process for the workpiece 9 includes a plurality of tasks, it is difficult to specify a factor of the inconsistency of production situation based on the inconsistency of the production pace or the inconsistency of the quality of the workpiece 9.

The control system 3 includes: a local controller configured to control the local device 2 to execute a plurality of tasks included in a process for a workpiece in a real space; a virtual local controller configured to control a virtual local device to execute a plurality of tasks in a virtual space; a real information collection unit configured to collect a real execution record (for example, real execution situation information indicating execution situations of the plurality of tasks by the local controller) from the real space during execution of each of the plurality of tasks by the robot; a virtual information collection unit configured to collect a virtual execution record (for example, virtual execution situation information indicating execution situations of the plurality of tasks by the virtual local controllers) from the virtual space during execution of each of the plurality of tasks by the virtual robot; and a task comparison unit configured to extract one or more inconsistent tasks in which the real execution situation information and the virtual execution situation information are inconsistent with each other among the plurality of tasks. Accordingly, an inconsistency of the execution situation for each of the plurality of tasks between the real space and the virtual space may be confirmed, and the cause of the inconsistency of production situation may be quickly specified.

In some cases, it may be beneficial for the production system 1 to flexibly adapt to changes in production plans including changes in objects to be produced. In addition, flexible adaptation to changes in the manufacturing environment, such as changes in the type, number, and arrangement of the local devices 2, may be may be beneficial. On the other hand, it may be beneficial to achieve autonomous adaptation of the local device 2 with respect to changes in the production plans and the production environment. However, in order to control the local controllers to specify a task to be executed and specify an execution timing thereof, condition settings may be complicated. In a system to which autonomy is imparted by complicated condition setting, it is difficult to further adapt to a new production plan or production environment which is not initially assumed.

The control system 3 may include: a command output unit configured to output an execution command of the next task based on a process including a plurality of tasks for the workpiece and progress information of the process; an environment information storage unit configured to store environment information; a local controller configured to control the local device 2 to execute a next task based on the execution command output from the command output unit and environment information in the environment information storage unit; and an environment update unit configured to update the environment information of the environment information storage unit in accordance with an operation of the local device 2. By providing the execution command of the next task to the local controller in addition to the environment information, the task to be executed next in the local controllers may not be specified based on the environment information. Accordingly, the condition setting for imparting autonomy to the local device 2 is simplified. Thus, the autonomous execution of each task by the local device 2 can be readily achieved. Therefore, a plurality of tasks may be performed in an efficient order by a simple process of outputting the execution command of the next task based on the progress of the plurality of tasks and updating the environment information in accordance with the operation of the local device 2. Therefore, a plurality of tasks to be executed by the individual local device 2 may be quickly rearranged in accordance with changes in production plans or changes in production environments.

As illustrated in FIG. 1, the control system 3 includes a plurality of local controllers 100, a host controller 200 (cell controller), and a data management device 300. The plurality of local controllers 100 respectively control the plurality of the local device 2.

Each of the plurality of local controllers 100 controls the local device 2 to be controlled (hereinafter referred to as "a subordinate local device 2") to execute a plurality of tasks included in a process for the workpiece 9 in the real space. The real space is a space where the subordinate local device 2 actually exists.

Each of the plurality of local controllers 100 may adjust execution timing based on the environment information in the environment information storage unit for each of the plurality of tasks. Further, the local controllers 100 may control the subordinate local device 2 to execute the next task corresponding to the execution command from the command output unit. For example, each of the plurality of local controllers 100 controls the subordinate local device 2 to execute the next task based on the execution command and the environment information. For example, the local controller 100 controls the local device 2 to execute the next task corresponding to the execution command from the command output unit while adjusting the execution timing based on the environment information of the environment information storage unit.

In the figure, the control system 3 has four local controllers 100A, 100B, 100C, and 100D. The local controller 100A controls the transport device 2A. The local controller 100B is a robot controller that controls robot 2B. The local controllers 100C is a robot controller that controls robot 2C. The local controller 100D is a robot controller that controls the mobile robot 2D. The number of local controllers 100 and the configuration of each local controller 100 may be changed in accordance with the number and type of the local device 2.

The host controller 200 includes the command output unit, the environment information storage unit, and the environment update unit, and performs synchronous communication with the plurality of local controllers 100. The synchronous communication means that communication with the plurality of local controllers 100 is performed for each cycle in synchronization with a synchronous frame of a constant cycle (the communication cycle). The host controller 200 is configured to output the execution command of the next task to each of the plurality of local controllers 100 based on the process for the workpiece 9 and the progress information of the process, and configured to update the environment information in accordance with the operation of the plurality of local devices 2. Further, the host controller 200 is configured to update progress information of the process for the workpiece 9 in accordance with the execution situation of the task by the plurality of local devices 2.

The data management device 300 includes the virtual local controller, the real information collection unit, the virtual information collection unit, and the task comparison unit, and performs synchronous communication or asynchronous communication with the host controller 200. The data management device 300 is configured to collect the real execution situation information from the plurality of local controllers 100 through the host controller 200. The data management device 300 includes a plurality of virtual local controllers respectively corresponding to the plurality of local controllers 100, and is configured to collect the virtual execution situation information from the plurality of virtual local controllers. Hereinafter, example configurations of the local controllers 100, the host controller 200, and the data management device 300 will be described in detail.

Figure 3:
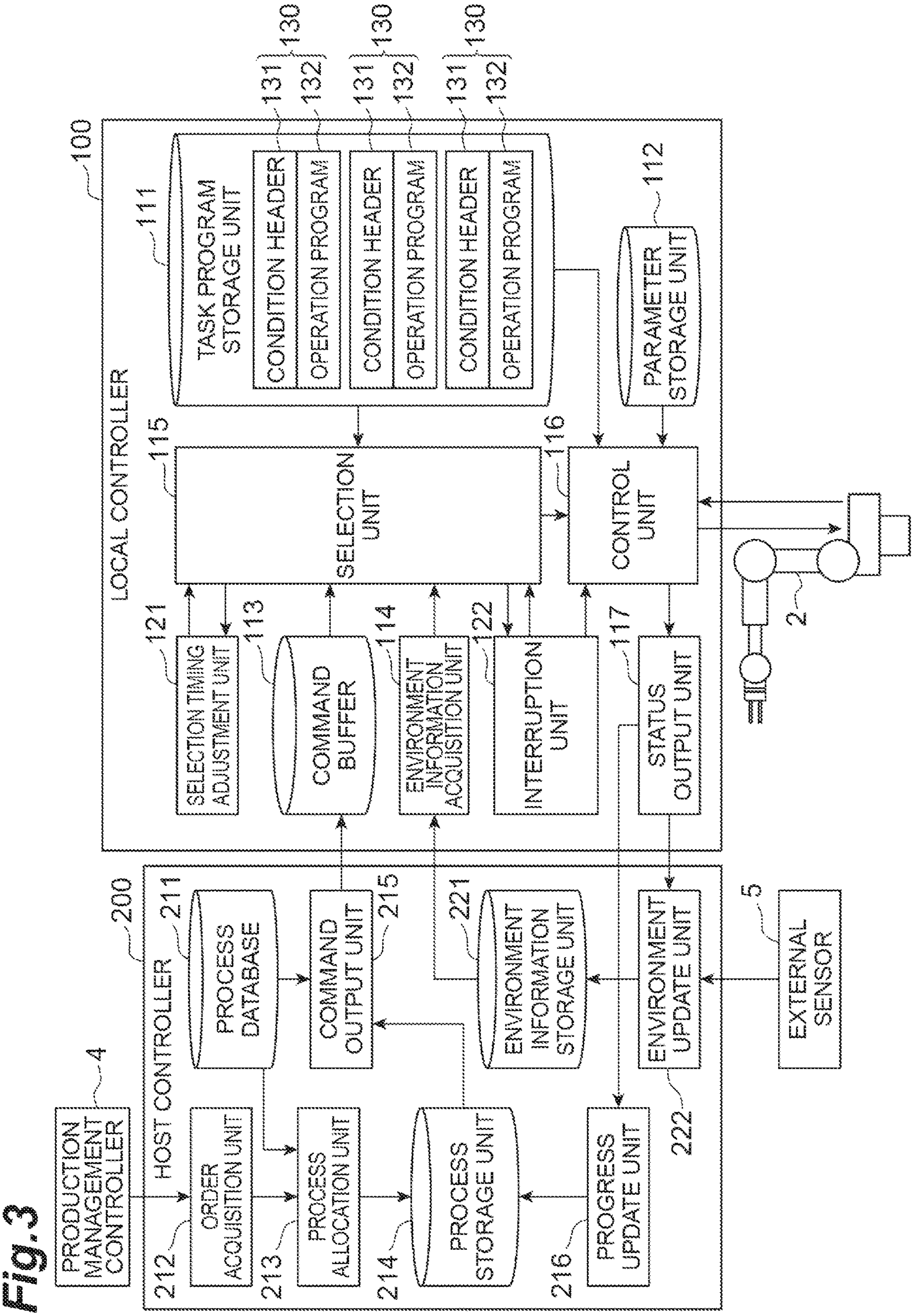
FIG. 3 is a block diagram illustrating an example functional configuration of a host controller and a local controller.

As illustrated in FIG. 3, the host controller 200 includes a process database 211, an order acquisition unit 212, a process allocation unit 213, a process storage unit 214, a command output unit 215, a progress update unit 216, an environment information storage unit 221, and an environment update unit 222 as functional configurations (hereinafter referred to as a “functional block”).

The process database 211 is configured to store a plurality of processes for each of a plurality of types of the workpiece 9 targeted by the production system 1. Each process includes identification information of each of a plurality of tasks for the workpiece 9, an order of executing the plurality of tasks, and identification information of the local device 2 that executes each of the plurality of tasks.

The plurality of tasks may include tasks to be executed by local devices 2 which are different with each other. For example, the plurality of tasks may include a plurality of tasks executed by a robot 2B, 2C, or the mobile robot 2D and one or more tasks executed by another local device 2. The task is a unit of work executed by one the local device 2. The tasks executed by the robots 2B, 2C, or the mobile robot 2D may include tasks that operate one or more identical joints. For example, in any of the plurality of tasks, the position/posture of the tip portion 18 is adjusted by the composite operation of the joints 31, 32, 33, 34, 35, and 36, but there may be a case where any of the joints 31, 32, 33, 34, 35, and 36 does not operate depending on the content of the task. Examples of tasks executed by the robots 2B, 2C, or the mobile robot 2D include a task of picking up a part and conveying it to a predetermined position, a task of fastening two parts (for example, bolt fastening), a task of welding two parts, a task of bonding two parts, and a task of picking up an assembly of two or more parts and conveying it to a predetermined position. Each task may include an operation of moving the tip portion 18 to a position for picking up a workpiece or a tool, and may include an operation of moving the tip portion 18 that has released the workpiece or the tool to a position away from the workpiece or the tool. Examples of tasks executed by other the local device 2 include tasks for changing the position/posture of a workpiece or tool in accordance with tasks of robots 2B and 2C, tasks for performing predetermined processing (for example, cutting processing) on a workpiece or tool arranged by robots 2B and 2C, and the like.

The order acquisition unit 212 is configured to acquire the production order of the workpiece 9 from a production management controller 4. The production order includes the type of the workpiece 9 to be produced and the production quantity for each type. The production management controller 4 is, for example, a controller that allocates a production order of the workpiece 9 according to a production plan to a plurality of factory cells in a manufacturing execution system (MES) of a factory, and performs synchronous communication or asynchronous communication with the host controller 200.

The process allocation unit 213 is configured to allocate process to the workpiece 9 specified by production order. For example, the process allocation unit 213 allocates the process to the workpiece 9 specified by the production order based on the process database 211. When the production order specifies a plurality of the workpiece 9, the process allocation unit 213 allocates a process to each of the plurality of the workpiece 9 based on the process database 211. The plurality of the workpiece 9 may include workpieces 9 different from each other.

The process storage unit 214 is configured to store an allocation result of processes by the process allocation unit 213 and progress information (progress information in the real space) for each process. FIG. 4 is a table illustrating allocation results of processes to a plurality of workpiece 9. In this table, the execution order of a plurality of tasks in each process is indicated by the arrangement order from left to right.

In FIG. 4, a process including three tasks a1, a2, and a3 is allocated to a workpiece A. A Process including five tasks b1, b2, b3, b4, and b5 is allocated to a workpiece B. A process including two tasks c1 and c2 is allocated to a workpiece C. A process including three tasks d1, d2, and d3 is allocated to a workpiece D. A Processes including four tasks e1, e2, e3, and e4 are allocated to a workpiece E.

The progress information for each process is information indicating, for example, whether each task of the process has not been started, is being executed, or has been completed. The progress information may be a flag indicating not-started, being-executed, or completed, or may be a start time and a completion time. In a case where the progress information is the start time and the completion time, if neither the start time nor the completion time is stamped, it is not-started, if the start time is stamped and the completion time is not stamped, it is being executed, and if the completion time is stamped, it is completed.

Returning to FIG. 3, the command output unit 215 is configured to output the execution command of the next task based on the process stored by the process storage unit 214 and the progress information of the process. The next task in the plurality of tasks is a task in which the previous task does not exist or the previous task is completed among tasks that have not been started yet. The command output unit 215 outputs an execution command of the next task to one of the plurality of local controllers 100 based on the process database 211. For example, the command output unit 215 outputs the execution command of the next task to the local controllers 100 of the local device 2 associated with the next task in the process database 211.

When a plurality of processes are respectively allocated to a plurality of the workpiece 9 in the process storage unit 214, the command output unit 215 may output execution commands of a plurality of next tasks for each of the plurality of processes based on a plurality of pieces of progress information for each of the plurality of processes. The command output unit 215 may output execution commands of multiple next tasks to the same local controller 100.

For example, when a first process is allocated to the first workpiece 9 and a second process is allocated to the second workpiece 9 in the process storage unit 214, the command output unit 215 may output the execution command of the next task of the first process and the execution command of the next task of the second process to the same local controller 100. The command output unit 215 may output the execution command of the next task of the second process after outputting the execution command of the next task of the first process and prior to execution of the next task of the first process. The command output unit 215 may output the execution command of the next task of the first process after outputting the execution command of the next task of the second process and prior to the execution of the next task of the second process. Further, the command output unit 215 may simultaneously output an execution command of the next task of the first process and an execution command of the next task of the second process. Here, the simultaneous output means that a period in which the execution command of the next task of the first process is output and a period in which the execution command of the next task of the second process is output at least partially overlap.

The command output unit 215 may output the execution command of the next task in response to a request from the local controller 100 in the synchronous communication, or may output the execution command regardless of the presence or absence of a request from the local controller 100.

The progress update unit 216 is configured to update the process storage unit 214 information of the progress unit in accordance with the execution situation of the next task by the plurality of local devices 2. For example, the progress update unit 216 updates the progress information in the process storage unit 214 based on the status information described later output by the local controllers 100.

The environment information storage unit 221 is configured to store environment information. The environment information includes, for example, information related to the local device 2 (hereinafter referred to as "device information") and information related to the workpiece 9 (hereinafter referred to as "workpiece information"). Examples of the device information include position/posture information of the local device 2. Examples of the position/posture information of the local device 2 include posture information of robots 2B and 2C, and position/posture information of the mobile robot 2D. The posture information of the robots 2B and 2C may be operation angle information of the joints 31, 32, 33, 34, 35, and 36 or position/posture information of the tip portion 18. The position/posture information of the mobile robot 2D includes, for example, position/posture information of the unmanned transport vehicle 50 and posture information of the robots 10. The posture information of the robots 10 may be operation angle information of the joints 31, 32, 33, 34, 35, and 36, or information of position/posture of the tip portion 18 (position/posture with respect to the unmanned transport vehicle 50).

The device information includes information of control signals generated between the local controller 100 and their subordinate local device 2 (hereinafter referred to as a "real control signal"). The real control signal may be an internal signal generated by the local controller 100 for controlling the subordinate local device 2, an output signal output from the local controller 100 to the subordinate local device 2, or a feedback signal output from the subordinate local device 2 to the local controller 100. Examples of the internal signal include a command value of position/posture of the subordinate local device 2. Examples of the output signal include an output current value to the actuators of the subordinate local device 2. Examples of the feedback signal include detection values such as position/posture and speed in the local device 2.

FIG. 5 is a table illustrating the device information. In FIG. 5, identification information of the local device 2 is associated with at least one state parameter indicating information related to the local device 2.

Examples of the workpiece information include position information of each the workpiece 9. FIG. 6 is a table illustrating workpiece information. In FIG. 6, identification information (for example, a type and a serial number) of the workpiece 9 is associated with position information of the workpiece 9.

The environment update unit 222 is configured to update environment information of the environment information storage unit 221 in accordance with operations of the plurality of local devices 2. For example, the environment update unit 222 acquires the status information of the local devices 2 from each of the plurality of local controllers 100 and updates the device information based on the status information. The environment update unit 222 may further update the workpiece information based on the status information of the local device 2. For example, the environment update unit 222 may update the position information of each the workpiece 9 based on the status information of the transport device 2A acquired from the local controllers 100A. The environment update unit 222 may update the environment information further based on the detection result of the external sensor 5.

As illustrated in FIG. 3, the local controllers 100 include a task program storage unit 111, a parameter storage unit 112, a command buffer 113, an environment information acquisition unit 114, a selection unit 115, a control unit 116, and a status output unit 117 as functional blocks.

The task program storage unit 111 (condition storage unit) is configured to store one or more execution conditions predetermined for each of one or more tasks among a plurality of tasks. For example, the task program storage unit 111 stores a plurality of a task program 130 each defining an operation in a plurality of tasks. Here, the plurality of tasks may include tasks whose workpiece 9 to be operated are different from each other. Hereinafter, the workpiece 9 to be operated is referred to as a "a target workpiece 9".

The task program 130 includes a condition header 131 and an operation program 132. The operation program 132 represents the operation of the subordinate local device 2. For example, the operation program 132 includes a plurality of movement instructions arranged in time series so as to control the subordinate local device 2 to execute a set of operations. When the subordinate local device 2 is the robot 2B, the robot 2C, or the mobile robot 2D, the movement command in the operation program 132 includes the target position and the target posture of the tip portion 18.

The condition header 131 represents an execution condition of the operation program 132. The execution condition is a condition for determining the execution timing of the operation program 132. FIG. 7 is a table illustrating an example of the condition header 131. The execution condition includes an execution propriety condition for determining whether the operation program 132 (corresponding task) is executable and priority of the operation program 132. The priority indicates a priority order of a plurality of the task programs 130 stored in the task program storage unit 111. When the priority is a numerical value representing the priority order itself, the priority becomes higher as the value becomes smaller.

As illustrated in FIG. 7, examples of the execution propriety condition include the following.

Example 1) There is no obstacle to the operation of the subordinate local device 2 within the operation range of the subordinate local device 2.

Example 2) The target workpiece 9 is in a predetermined position.

Example 3) There is no other workpiece 9 at the carry-in destination of the target workpiece 9.

Example 4) The carry-in destination of the target workpiece 9 is open.

Examples of the obstacle include other local devices 2, the workpieces 9 held by other local devices 2, and persons. Examples of the carrying-in destination of the target workpiece 9 include an NC machine tool which is an example of other local devices 2. An example of the carry-in destination being open is that the door of the NC machine tool is open.

As described above, a process for one target workpiece 9 may include a task by another local device 2 other than the subordinate local device 2. Examples of the task by another local device 2 include a machine task executed by an industrial machine (for example, NC machine tool). When the subordinate local device 2 is the robot 2B, the robot 2C, or the mobile robot 2D, a plurality of tasks executed by the subordinate local device 2 may include a task executed before the machine task and a task executed after the machine task. The plurality of tasks executed by the subordinate local device 2 may include a task that is executed in cooperation with another local device 2 (first industrial machine) and a task that is executed in cooperation with yet another local device 2 (second industrial machine).

When the subordinate local device 2 is the robot 2B, the robot 2C, or the mobile robot 2D, the tasks executed by the subordinate local device 2 may include one or more interpolation tasks in addition to the tasks for the target workpiece 9. Hereinafter, a plurality of tasks for the workpiece 9 are referred to as "working tasks", and an interpolation task is referred to as "air cut task".

The air cut task represents an operation of the subordinate local device 2 between two working tasks among the plurality of working tasks. Hereinafter, for convenience of description, the two working tasks are referred to as a "first working task" and a "second working task". Examples of the air cut task is shown below.

Example 1) Moving the tip portion 18 in a predetermined trajectory from position/posture at the completion of the first working task to position/posture at the start of the second working task.

Example 2) Moving the tip portion 18 is moved in a predetermined trajectory from position/posture at the start of the first working task to position/posture at the start of the second working task.

Example 3) Moving the tip portion 18 in a predetermined trajectory from position/posture at the completion of the second working task to position/posture at the start of the first working task.

Example 4) Moving the tip portion 18 in a predetermined trajectory from position/posture at the start of the second working task to position/posture at the start of the first working task.

These air cut tasks may be provided between two or more pairs of working tasks. In the process database 211 and the process storage unit 214, the process associated with the workpiece 9 may include a plurality of working tasks and may include no air cut task.

The parameter storage unit 112 stores one or more control parameters for controlling the subordinate local device 2. Examples of the one or more control parameters include a position control gain, a speed control gain, and a current control gain.

The command buffer 113 stores the execution command of the next task acquired from the host controller 200. As described above, the command output unit 215 may output execution commands of a plurality of next tasks to the same local controller 100. For this reason, the command buffer 113 may be configured to store a plurality of execution commands.

FIG. 8 is a table describing example contents of the command buffer, and illustrates a state in which an execution command of the task a1 for the workpiece A, an execution command of a task b2 for the workpiece B, and an execution command of a task e3 for the workpiece E are stored as execution commands of a plurality of next tasks.

Returning to FIG. 3, the environment information acquisition unit 114 is configured to acquire the environment information stored in the environment information storage unit 221. The environment information acquisition unit 114 may request the host controller 200 to output environment information and acquire the environment information output in response to the request, or may acquire the environment information output from the host controller 200 in the synchronous communication, for example, regardless of the presence or absence of the request.

The selection unit 115 is configured to select one of the plurality of next tasks in the command buffer 113 based on an execution condition (the condition header 131) of each of the plurality of next tasks in the task program storage unit 111 and the environment information in the environment information storage unit 221. For example, the selection unit 115 checks whether each of the plurality of next tasks is executable. For example, the selection unit 115 checks whether the environment information satisfies the execution propriety condition of each of the plurality of next tasks. Further, the selection unit 115 selects any of one or more next tasks that can be executed based on the priority. If there is only one executable next task, the selection unit 115 selects the next task. When two or more next tasks are executable, the selection unit 115 selects the next task having the highest priority.

Execution of the air cut task may be required prior to execution of the next task. For example, when the current position/posture of the tip portion 18 is different from the start position/posture of the next task, an air cut task from the current position/posture to the start position/posture is required. The selection unit 115 may include the air cut task at the beginning of the next task. Hereinafter, the next task including the air cut task at the beginning is referred to as a "next task with air cut". When checking whether the environment information satisfies the execution propriety condition of the next task with air cut, the selection unit 115 may also check whether the environment information satisfies the execution propriety condition of the air cut task.

The control unit 116 is configured to control the subordinate local device 2 to execute the next task based on the execution condition of the next task in the task program storage unit 111 and the environment information of the environment information storage unit 221. For example, the control unit 116 causes the subordinate local device 2 to execute the next task selected by the selection unit 115. When the selection unit 115 selects the next task with air cut, the control unit 116 executes the next task after executing the air cut task included at the head of the next task.

The status output unit 117 is configured to output the status information of the subordinate local device 2 to the host controller 200. The status information includes at least position/posture information of the subordinate local device 2. The status output unit 117 may include a completion notification of task in the status information and output the status information in response to completion of execution of the task program 130.

The status output unit 117 may output the status information in response to a request from the host controller 200 in the synchronous communication or may output the status information regardless of the presence or absence of a request from the host controller 200.

Hereinafter, control executed by the local controllers 100B when the command buffer 113 of the local controllers 100B stores a plurality of next tasks will be described in detail with reference to FIGS. 9A and 9B. In this example, the plurality of local devices 2 further includes an NC machine tool 2F. The robots 2B is installed between the NC machine tool 2F and the transport device 2A. In addition to the NC machine tool 2F and the transport device 2A, workpiece tables 91 and 92 for temporarily placing the workpiece 9 are provided around the robot 2B.

The command buffer 113 of the local controllers 100B stores an execution command of a first working task, an execution command of a second working task, and an execution command of a third working task as follows.

First working task: Unloading a first workpiece 9A from the NC machine tool 2F and transferring to the workpiece table 91.

Second working task: Conveying a second workpiece 9B from the workpiece table 92 and carrying into the NC machine tool 2F.

Third working task: Transferring a third workpiece 9C from the workpiece table 91 to the transport device 2A.

In the task program storage unit 111, the priority of the first working task is higher than the priority of the second working task, and the priority of the second working task is higher than the priority of the third working task.

Figure 9A:
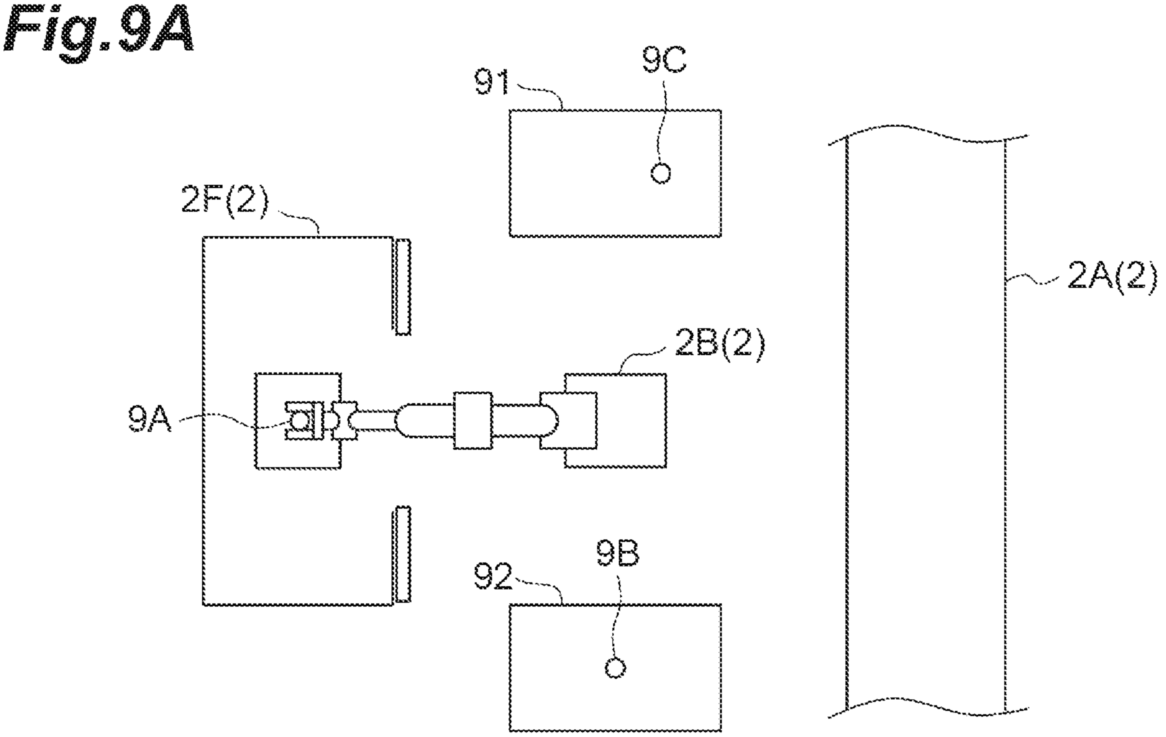
FIGS. 9A and 9B are diagrams illustrating an example selection of a next task.
Figure 9B:
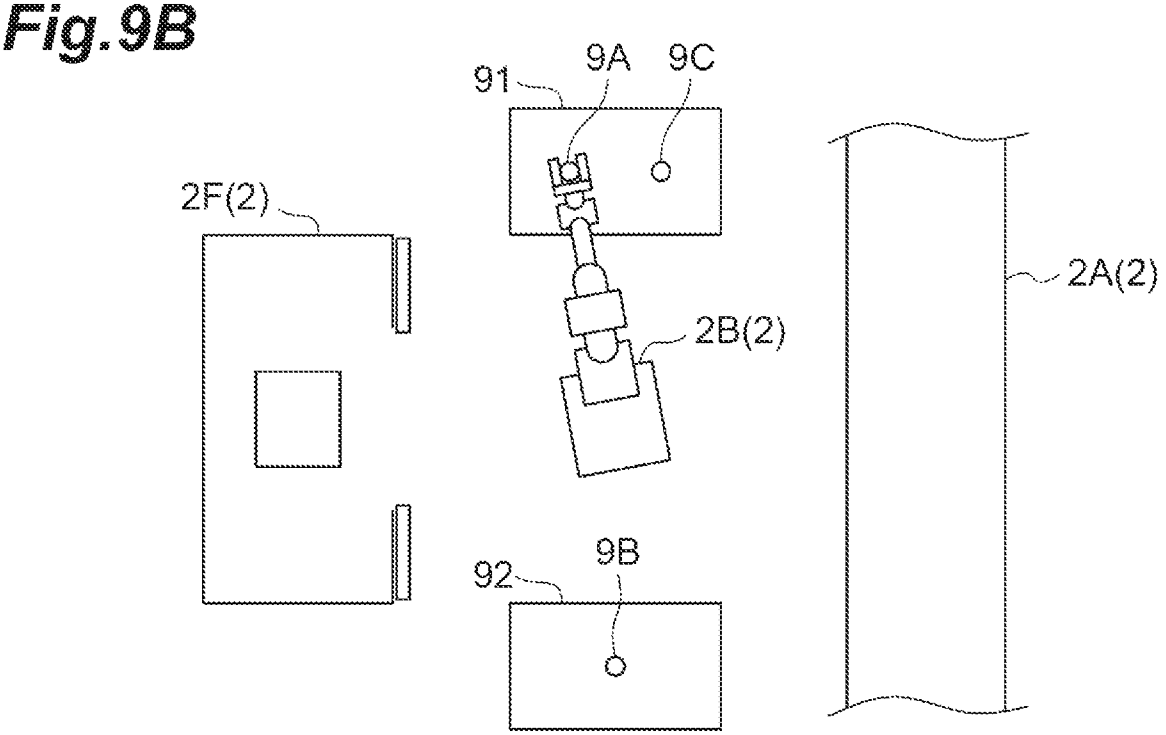

FIG. 9A illustrates a state where the first working task and the third workpiece task can be executed. The selection unit 115 selects the first working task having a higher priority than the third working task. In response to this, the control unit 116 controls the robot 2B to execute the first working task (see FIG. 9B).

Figure 10A:
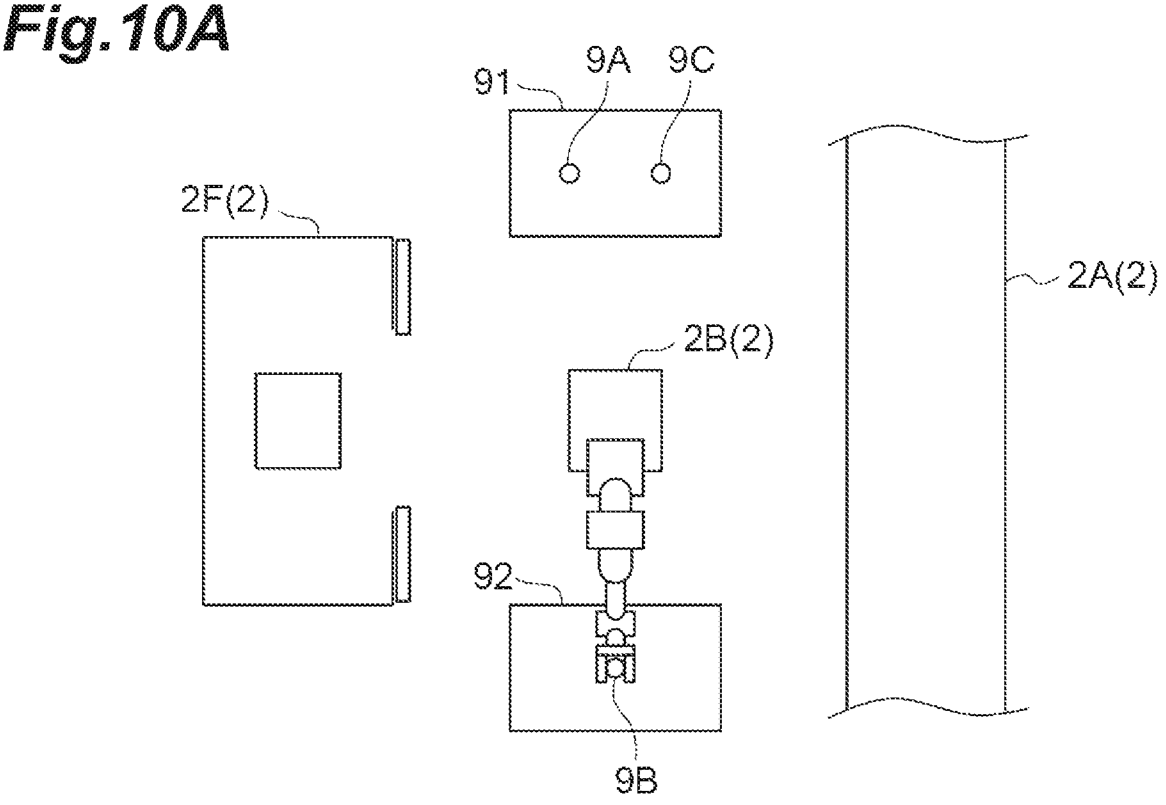
FIGS. 10A and 10B are diagrams illustrating an example selection of the next task.
Figure 10B:
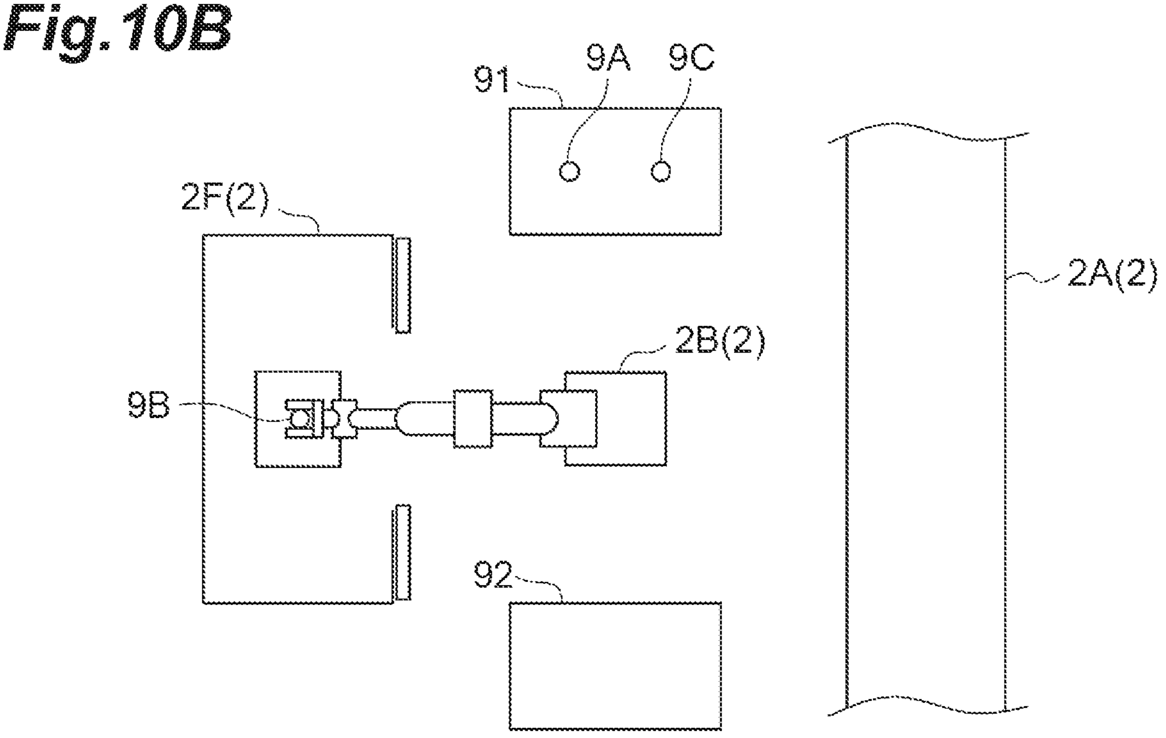

When the first working task is executed and the workpiece 9 does not exist in the NC machine tool 2F, the second working task and the third working task can be executed (see FIG. 10A). The selection unit 115 selects the second working task whose priority is higher than that of the third working task. In response to this, the control unit 116 controls the robot 2B to execute the second working task (see FIG. 10B).

Figure 11A:
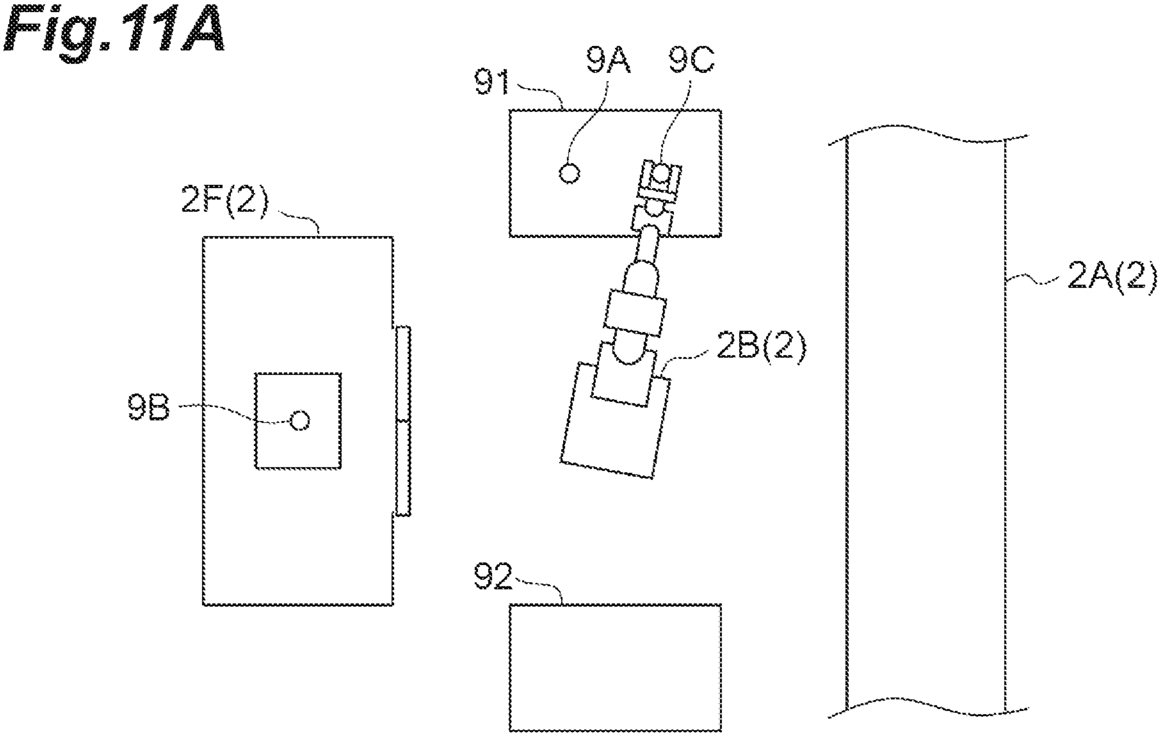
FIGS. 11A and 11B are diagrams illustrating an example selection of the next task.
Figure 11B:
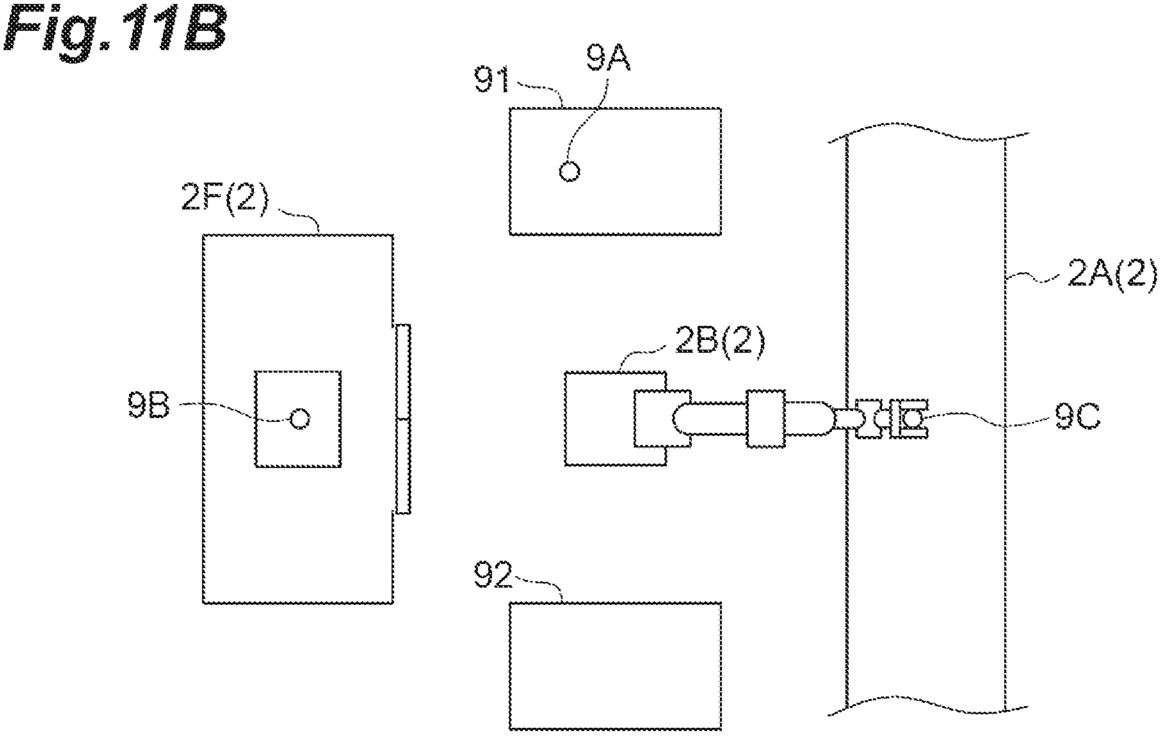

By execution of the first working task and the second working task, only the third working task remains in the command buffer 113. Since the third working task is still executable, the selection unit 115 selects the third working task. In response to this, the control unit 116 controls the robots 2B to execute the third working task (see FIGS. 11A and 11B).

The environment information stored in the environment information storage unit 221 may include a waiting time corresponding to the completion time of the machine task. The environment information may include the waiting time in any form as long as it represents the time until the completion time of the machine task. For example, the environment information may include a combination of the scheduled completion time of the machine task and the current time, or may include a time length from the current time to the scheduled completion time.

The local controllers 100 may further comprise a selection timing adjustment unit 121. When the plurality of next tasks of the command buffer 113 include a first task that becomes executable when the machine task is completed and a second task that is already executable, the selection timing adjustment unit 121 adjusts the selection timing of the next task by the selection unit 115 based on the priorities of the first task and the second task and the waiting time. For example, when the priority of the first task is higher than the priority of the second task and the waiting time is equal to or less than a predetermined threshold value, the selection timing adjustment unit 121 sets the selection timing of the next task by the selection unit 115 to be after the elapse of the waiting time.

Figure 12A:
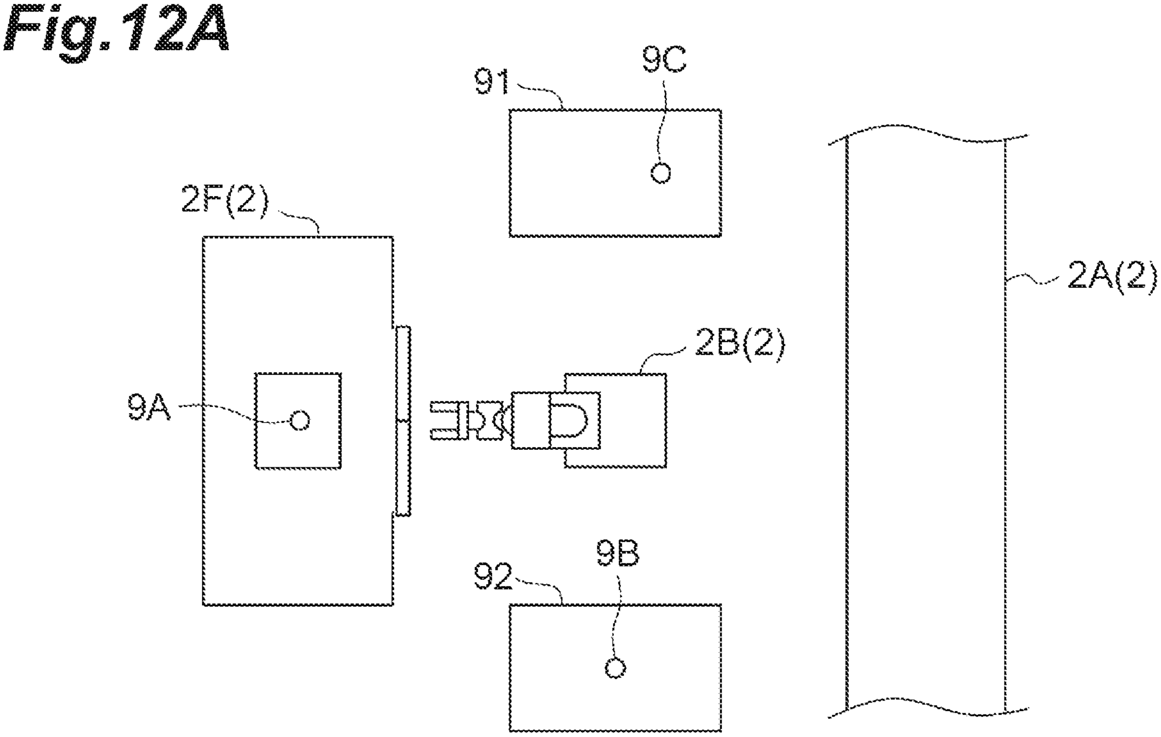
FIGS. 12A and 12B are diagrams illustrating a modified example of selection of the next task.
Figure 12B:
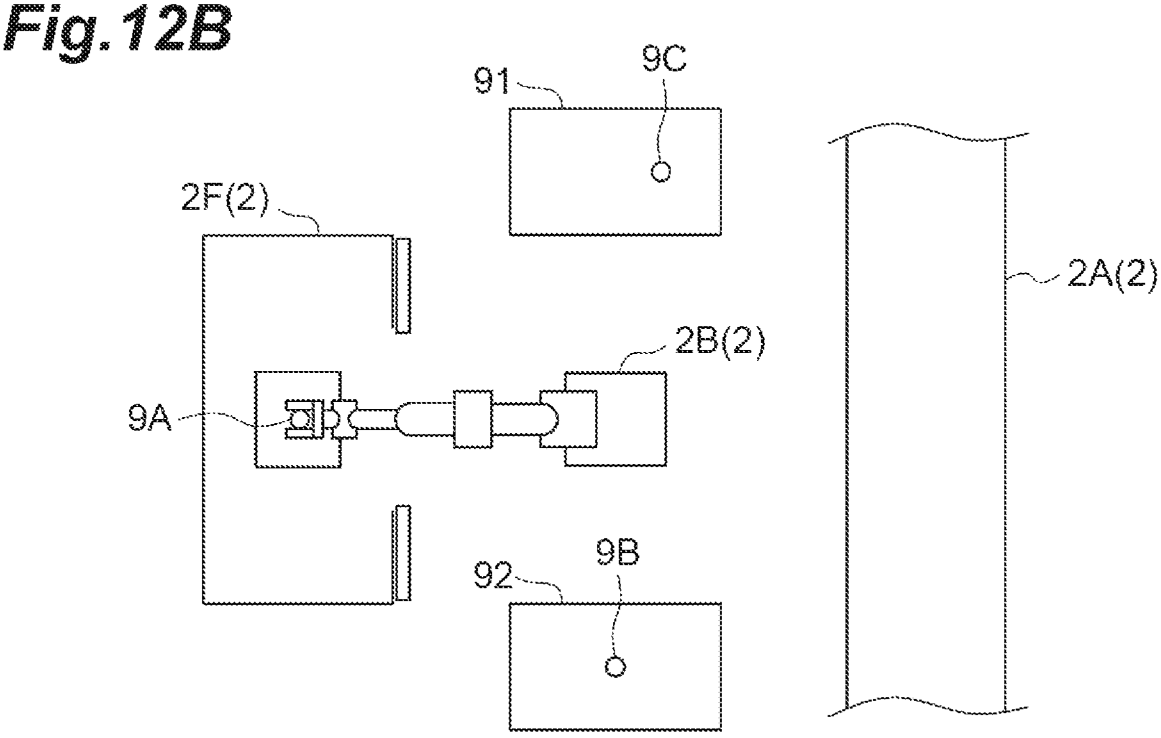

Referring to FIGS. 12A and 12B, an example processing of the selection timing adjustment unit 121 in a case where the command buffer 113 of the local controllers 100B stores the execution command of the first working task, the execution command of the second working task, and the execution command of the third working task will be described. In this example, the machining performed by the NC machine tool 2F on the first workpiece 9A corresponds to the machine task. While the machine task is being executed (see FIG. 12A), only the third working task (second task) can be executed, and the first working task (first task) and the second working task cannot be executed.

When the waiting time of the machine task being executed by the NC machine tool 2F on the first workpiece 9A is equal to or less than the predetermined threshold value, the selection timing adjustment unit 121 sets the selection timing of the next task by the selection unit 115 to be after the elapse of the waiting time. Therefore, even if the third working task is already executable, the control unit 116 does not control the robots 2B to execute the third working task and waits for the waiting time to elapse.

At the timing when the selection timing adjustment unit 121 controls the selection unit 115 to select the next task, the first working task and the third working task become executable due to the elapse of the waiting time. Therefore, the selection unit 115 executes the first working task having a higher priority than the third working task. In response to this, the control unit 116 controls the robots 2B to execute the first working task (see FIG. 12B).

The local controllers 100 may further include an interruption unit 122. The interruption unit 122 controls the control unit 116 to interrupt the second task and controls the selection unit 115 to select the first task when the plurality of next tasks in the command buffer 113 include the first task and the second task having lower priority than the first task and the first task becomes executable while the subordinate local device 2 is executing the second task. Also, the interruption unit 122 returns the execution command of the second task to the command buffer 113.

If the target workpiece 9 cannot be released while the second task is being executed, the interruption unit 122 may control the control unit 116 to return the subordinate local device 2 to the state before the start of the second task, and then cause the selection unit 115 to select the first task. For example, in a case where the first task includes conveyance of a first workpiece and the second task includes conveyance of a second workpiece, when the first task becomes executable while the subordinate local device 2 is executing the second task, the interruption unit 122 controls the control unit 116 to return the subordinate local device 2 to a state before the start of conveyance of the second workpiece, controls the selection unit 115 to select the first task, and returns the execution command of the second task to the command buffer 113.

Figure 13A:
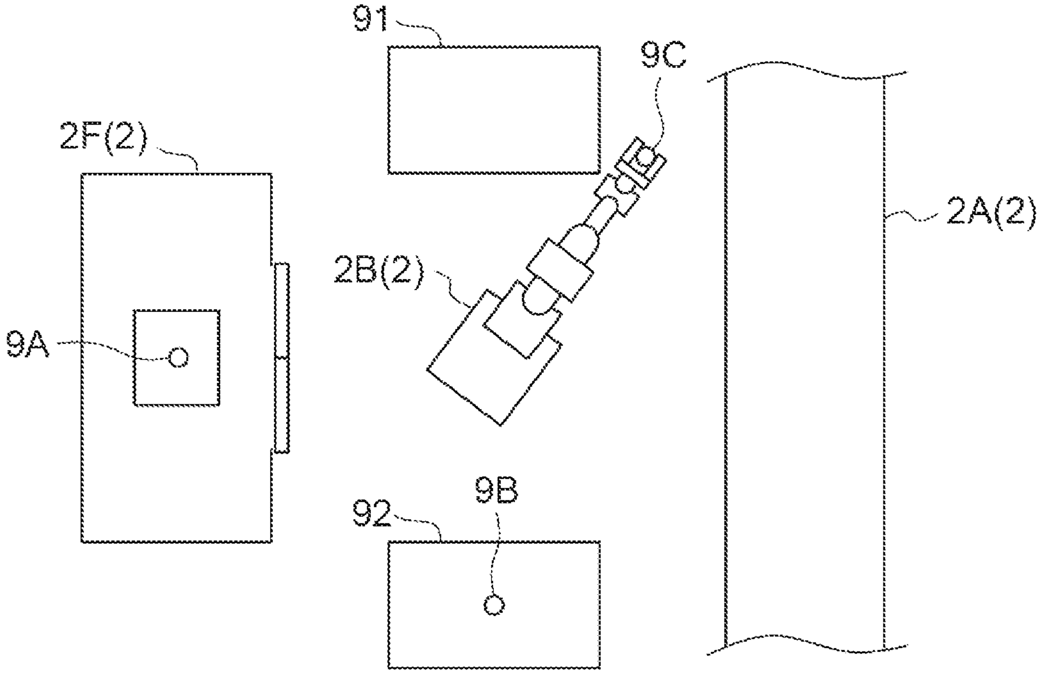
FIGS. 13A and 13B are diagrams illustrating another modified example of selection of next task.
Figure 13B:
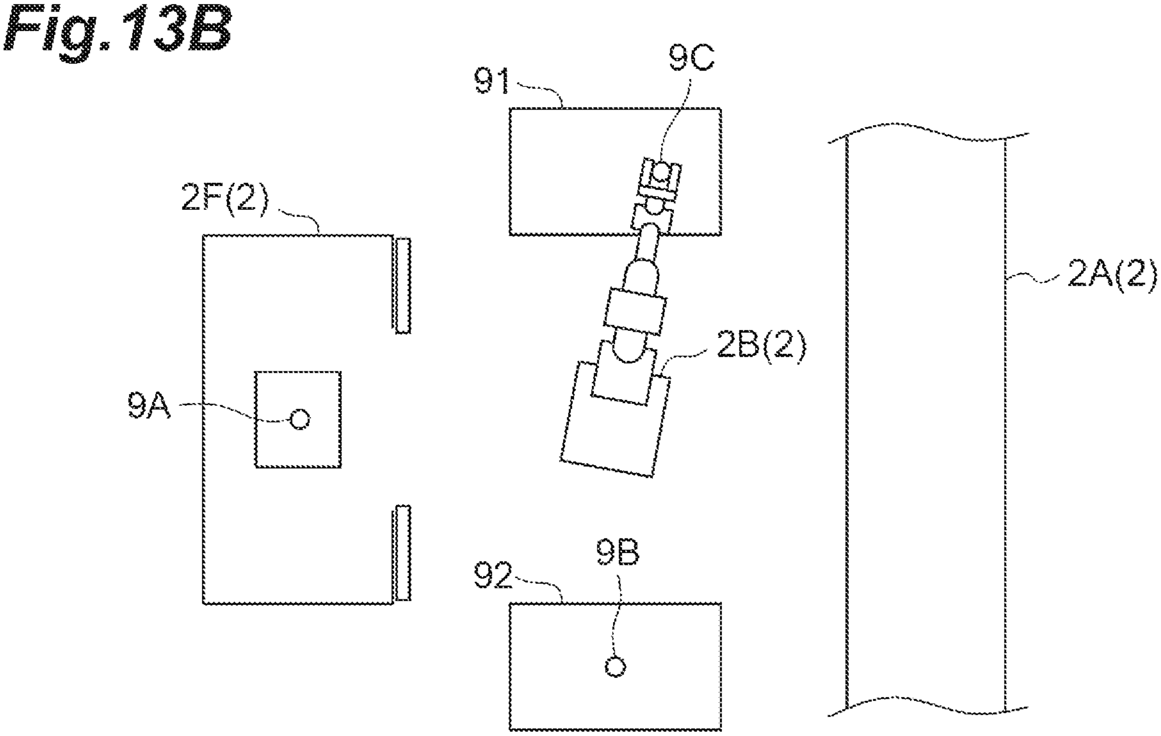

With reference to FIGS. 13A and 13B, an example processing of the interruption unit 122 when the first working task (first task) becomes executable while the third working task (second task) is being executed by the robots 2B will be described.

FIG. 13A illustrates a state in which the control unit 116 controls the robot 2B to execute the third working task in a situation where the first working task cannot be executed because the NC machine tool 2F is executing the machine task on the first workpiece 9A. The robot 2B transports the third workpiece 9C from the workpiece table 91 to the transport device 2A.

In this state, when the first working task becomes executable, the interruption unit 122 controls the control unit 116 to interrupt the third working task. In a state where the third workpiece 9C is away from the workpiece table 91 and has not reached the transport device 2A, since the third workpiece 9C cannot be released, the robot 2B controls the control unit 116 to return the robot 2B to the state before the start of the third working task. Accordingly, the third workpiece 9C is returned onto the workpiece table 91 (see FIG. 13B). Thereafter, the interruption unit 122 controls the selection unit 115 to select the first working task. The control unit 116 controls the robot 2B to execute an air cut task for moving the tip portion 18 in a predetermined trajectory from position/posture at the start of the third working task to position/posture at the start of the first working task, and then controls the robot 2B to execute the first working task.

The interruption unit 122 may not control the control unit 116 to interrupt the second task in a case where the execution time of a plurality of processes is shortened by controlling the selection unit 115 to select the first task after completion of the second task as compared to a case where the control unit 116 interrupts execution of the second task and controls the selection unit 115 to select the first task. For example, when the remaining time of the second task is equal to or less than a predetermined threshold value at the timing at which the first task becomes executable, the interruption unit 122 may not control the control unit 116 to interrupt the second task.

In response to the local controllers 100 and the host controller 200 configured as described above, the data management device 300 may include: a virtual command output unit configured to output an execution command of a next task based on a process and progress information of the process in a virtual space; a virtual environment information storage unit configured to store virtual environment information; a virtual local controllers configured to control a virtual local device to execute the next task in the virtual space based on the execution command output from the virtual command output unit and the virtual environment information in the virtual environment information storage unit; and a virtual environment update unit configured to update the virtual environment information in the virtual environment information storage unit in accordance with the operation of the virtual local device.

Figure 14:
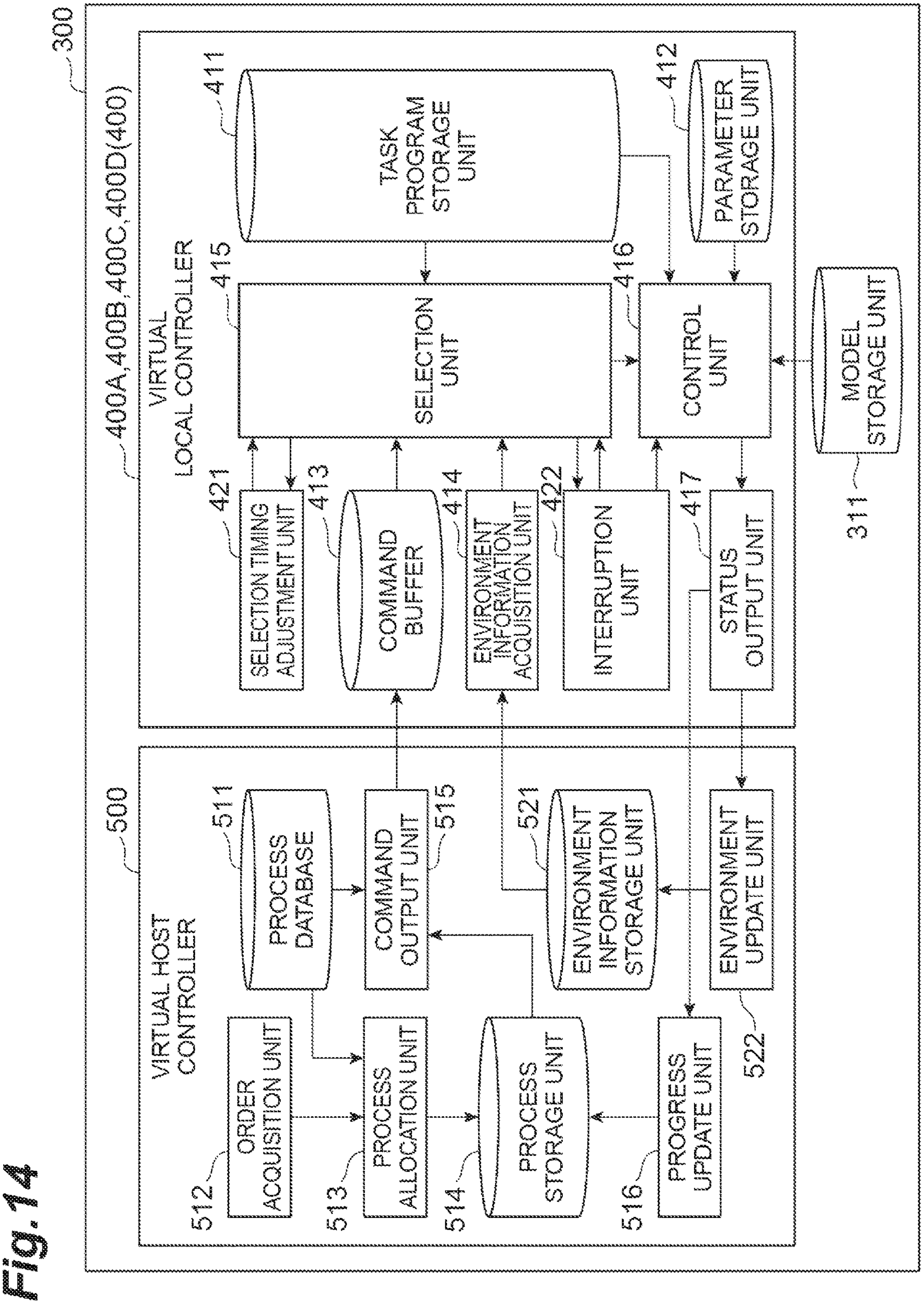
FIG. 14 is a block diagram illustrating a functional configuration of a data management device.

For example, as illustrated in FIG. 14, the data management device 300 includes a model storage unit 311, a plurality of virtual local controllers 400, and a virtual host controller 500 as functional blocks.

The model storage unit 311 is configured to store models of a plurality of virtual local devices. The model of the virtual local device includes parameters such as the arrangement in real space, the structure, the dimensions of each unit, and the mass of each unit of the corresponding local device 2. The model storage unit 311 also stores a model of the surrounding environment of a plurality of virtual local devices in a virtual space. The model of the surrounding environment includes parameters such as an arrangement in real space, a three dimensional shape, and dimensions of surrounding objects of a plurality of the local device 2. The model storage unit 311 may include a standard time indicating the responsiveness of the virtual local device to the control command in terms of time. An example of the standard time is an operation time length corresponding to a control command. The operation time length is, for example, a time length from an output start time of the control command to an operation completion time of the virtual local device corresponding thereto.

The plurality of virtual local controllers 400 correspond to the plurality of local controllers 100, respectively. For example, the data management device 300 includes a virtual local controller 400A corresponding to the local controllers 100A, a virtual local controller 400B corresponding to the local controller 100B, a virtual local controller 400C corresponding to the local controller 100C, and a virtual local controller 400D corresponding to the local controller 100D.

The virtual local controllers 400B, 400C, and 400D corresponding to the local controllers 100B, 100C, 100D, which are robot controllers, are virtual robot controllers. Virtual local devices controlled by the virtual local controllers 400B and 400C are virtual robots, and a virtual local device controlled by the virtual local controller 400D is a virtual mobile robot.

The plurality of virtual local controllers 400 respectively control a plurality of virtual local devices corresponding to the plurality of local devices 2 in the virtual space. Each of the plurality of virtual local controllers 400 controls a virtual local device to be controlled to execute a plurality of tasks included in a process for the target workpiece 9 in the virtual space.

Hereinafter, a virtual local device to be controlled by the virtual local controller 400 is referred to as a "subordinate virtual local device", and the local device 2 corresponding to the subordinate virtual local device is referred to as a "subordinate local device 2". The subordinate local device 2 is the local device 2 to be controlled by the local controllers 100 corresponding to the virtual local controllers 400.

The virtual space is an imaginary space on simulation in which the subordinate local device 2 does not exist. Controlling the subordinate virtual local device to execute a task in the virtual space means simulating an operation of the subordinate local device 2 in the real space when executing the task based on the model information of the subordinate local device 2 stored in the model storage unit 311.

Each of the plurality of virtual local controllers 400 may adjust execution timing based on the virtual environment information in the virtual environment information storage unit for each of a plurality of tasks. Further, the virtual local controllers 400 may control the subordinate virtual local device to execute the next task corresponding to the execution command from the virtual command output unit. For example, each of the plurality of virtual local controllers 400 controls the subordinate virtual local device to execute the next task based on the execution command and the virtual environment information. For example, the virtual local controller 400 controls the subordinate virtual local device to execute the next task corresponding to the execution command from the virtual command output unit while adjusting the execution timing based on the virtual environment information of the virtual environment information storage unit.

The virtual host controller 500 includes a process database 511, an order acquisition unit 512, a process allocation unit 513, a process storage unit 514, a command output unit 515, a progress update unit 516, an environment information storage unit 521, and an environment update unit 522, which correspond to the process database 211, the order acquisition unit 512, the process allocation unit 213, the process storage unit 214, the command output unit 215, the progress update unit 216, the environment information storage unit 221, and the environment update unit 222, respectively, as subdivided functional blocks.

Similarly to the process database 211, the process database 511 is configured to store a plurality of processes for each of a plurality of types of the workpiece 9 targeted by the production system 1. The order acquisition unit 512 is configured to acquire a production order for simulation from, for example, an input device 396 described later.

Similarly to the process allocation unit 213, the process allocation unit 513 is configured to allocate a process to the workpiece 9 specified by the production order. For example, the process allocation unit 513 allocates the process to the workpiece 9 specified by the production order based on the process database 511. Similarly to the process storage unit 214, the process storage unit 514 is configured to store an allocation result of processes by the process allocation unit 513 and progress information (progress information in the virtual space) for each process.

Similarly to the command output unit 215, the command output unit 515 (virtual command output unit) is configured to output the execution command of the next task based on the process stored in the process storage unit 514 and the progress information of the process in the virtual space. The command output unit 515 outputs an execution command of the next task to one of the plurality of virtual local controllers 400 based on the process database 511. For example, the command output unit 515 outputs the execution command of the next task to the virtual local controllers 400 of the virtual local device of the local device 2 associated with the next task in the process database 511.

Similarly to the progress update unit 216, the progress update unit 516 is configured to update the progress information in the process storage unit 514 in accordance with the execution situation of the next task by the plurality of virtual local devices. For example, the progress update unit 516 updates the progress information in the process storage unit 514 based on status information described later output from the virtual local controllers 400.

The environment information storage unit 521 (virtual environment information storage unit) is configured to store virtual environment information. The configuration of the virtual environment information is similar to the configuration of the environment information. The virtual environment information includes device information in the virtual space and workpiece information in the virtual space.

Examples of the device information in the virtual space include position/posture information of the virtual local device in the virtual space. The device information in the virtual space includes information of control signals generated between the virtual local controllers 400 and their subordinate virtual local devices (hereinafter referred to as a "virtual control signal").

The virtual control signal may be an internal signal generated by the virtual local controllers 400 for control of the subordinate virtual local device, an output signal output from the virtual local controllers 400 to the subordinate virtual local device, or a feedback signal output from the subordinate virtual local device to the virtual local controllers 400. Examples of the internal signal include a command value of position/posture of the subordinate virtual local device. Examples of the output signal include an output current value to actuators of the subordinate virtual local device. Examples of the feedback signal include a simulation result of an operation of the subordinate local device 2 based on the output signal and model information stored in the model storage unit 311.

Examples of the workpiece information in the virtual space include position information of each workpiece 9 in the virtual space.

The environment update unit 522 (virtual environment update unit) is configured to update the virtual environment information in the environment information storage unit 521 in accordance with operations of a plurality of virtual local devices.

The virtual local controllers 400 includes a task program storage unit 411, a parameter storage unit 412, a command buffer 413, an environment information acquisition unit 414, a selection unit 415, a control unit 416, a status output unit 417, a selection timing adjustment unit 421, and an interruption unit 422 corresponding to the task program storage unit 111, the parameter storage unit 112, the command buffer 113, the environment information acquisition unit 114, the selection unit 112, the control unit 116, the status output unit 117, the selection timing adjustment unit 121, and the interruption unit 122, respectively, as more subdivided functional blocks.

Similarly to the task program storage unit 111, the task program storage unit 411 is configured to store one or more execution conditions predetermined for each of one or more tasks among a plurality of tasks. For example, the task program storage unit 411 stores the plurality of the task program 130. Similarly to the parameter storage unit 112, the parameter storage unit 412 stores one or more parameters for controlling the subordinate virtual local device.

Similarly to the command buffer 113, the command buffer 413 is configured to store the execution command of the next task acquired from the virtual host controller 500. Similarly to the environment information acquisition unit 114, the environment information acquisition unit 414 is configured to acquire the environment information stored in the environment information storage unit 521. Similarly to the selection unit 115, the selection unit 415 is configured to select one of the plurality of next tasks in the command buffer 413 based on an execution condition (the condition header 131) of each of the plurality of next tasks in the task program storage unit 411 and environment information of the environment information storage unit 521.

The control unit 416 is configured to control the subordinate virtual local device to execute the next task based on the execution condition of the next task in the task program storage unit 411 and the environment information in the environment information storage unit 521. For example, the control unit 416 controls the subordinate virtual local device to execute the next task selected by the selection unit 415. Hereinafter, the task selected by the selection unit 415 is referred to as "selected task". For example, the control unit 416 simulates the operation of the subordinate local device 2 in real space when executing the selected task based on the model information of the subordinate local device 2 stored in the model storage unit 311. Similarly to the status output unit 117, the status output unit 417 is configured to output the status information of the subordinate virtual local device to the virtual host controller 500.

Similarly to the selection timing adjustment unit 121, the selection timing adjustment unit 421 is configured to adjust the selection timing of the next task by the selection unit 415. For example, when the plurality of next tasks of the command buffer 413 include a first task that becomes executable when the machine task is completed and a second task that is already executable, the selection timing adjustment unit 421 adjusts the selection timing of the next task by the selection unit 415 based on the priorities of the first task and the second task and the waiting time.

Similarly to the interruption unit 122, the interruption unit 422 is configured to control the control unit 416 to suspend the second task and is configured to control the selection unit 415 to select the first task when the plurality of next tasks of the command buffer 413 include the first task and the second task having lower priority than the first task and the first task becomes executable while the subordinate virtual local device is executing the second task.

Figure 15:
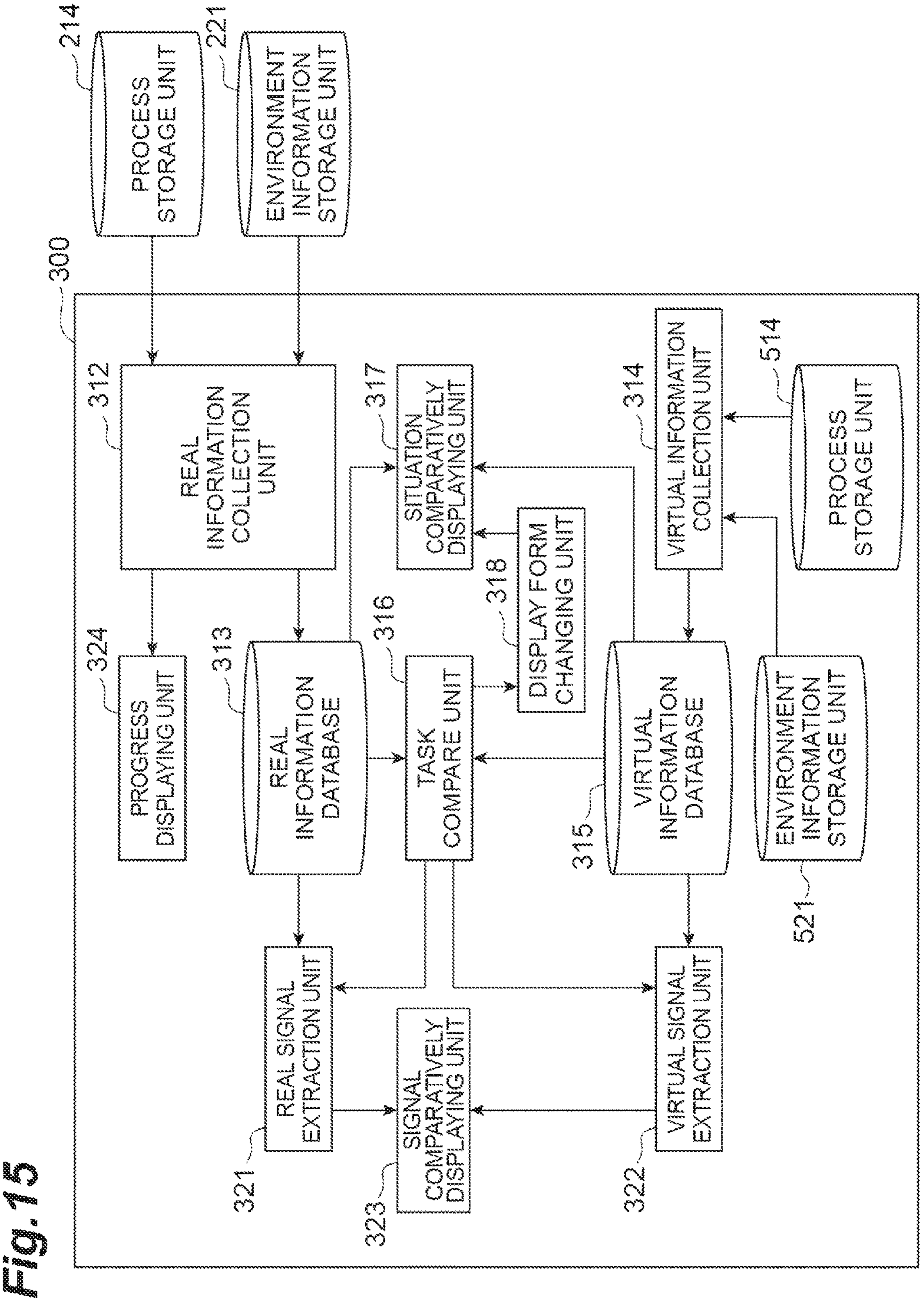
FIG. 15 is a block diagram illustrating a functional configuration of the data management device.

As illustrated in FIG. 15, the data management device 300 further includes a real information collection unit 312, a real information database 313, a virtual information collection unit 314, a virtual information database 315, a task comparison unit 316, a situation comparatively displaying unit 317, a display form changing unit 318, a real signal extraction unit 321, a virtual signal extraction unit 322, and a signal comparatively displaying unit 323 as functional blocks.

The real information collection unit 312 is configured to collect real execution situation information representing the execution situation of each of a plurality of tasks by local controllers 100. The real execution situation information is information representing one situation generated in the real space by the complex operation of the joints 31, 32, 33, 34, 35, and 36. The situation in the real space includes not only the state of the real space but also the elapsed time situation in the real space. The real execution situation information includes the execution time of the corresponding task. The execution time may be a start time, a completion time, or a time length from the start time to the completion time. For example, the real information collection unit 312 collects real execution situation information including an execution start time and an execution completion time of each of the tasks in a first timeline. The first timeline is, for example, a timeline based on a timer in the host controller 200. The real execution situation information may include state information of the target workpiece 9 after the corresponding task is executed. Examples of the state information of the target workpiece 9 include position/posture of the target workpiece 9 after conveyance.

The real information collection unit 312 acquires the real execution situation information from the process storage unit 214 of the host controller 200. The real information collection unit 312 may further acquire the real control signal from the environment information storage unit 221 of the host controller 200. The real information collection unit 312 may acquire environment information including the real control signal from the environment information storage unit 221 in association with a time in the first timeline. The real information collection unit 312 may request the host controller 200 to output the real execution situation information and the real control signal, and acquire the real execution situation information and the real control signal output in response to the request, or may acquire the real execution situation information and the real control signal output from the host controller 200 regardless of the presence or absence of the request.

The real information database 313 is configured to accumulate real execution situation information and a real control signal collected by the real information collection unit 312. The real information database 313 may store the real control signal in association with a time along the first timeline. The real information database 313 may accumulate environment information including the real control signal in association with a time along the first timeline.

The virtual information collection unit 314 is configured to collect virtual execution situation information representing the execution situation of each of a plurality of tasks by virtual local controllers 400. The virtual execution situation information is information indicating one situation generated in the virtual space by the composite operation of the joints 31, 32, 33, 34, 35, and 36. The situation in the virtual space includes not only the state of the virtual space but also the elapsed time situation in the virtual space. The virtual execution situation information includes the execution time of the corresponding task. The execution time may be a start time, a completion time, or a time length from the start time to the completion time. For example, the virtual information collection unit 314 collects virtual execution situation information including execution start time and execution completion time of a plurality of tasks in a second timeline. The second timeline is a timeline based on, for example, a timer in the data management device 300. The virtual execution situation information may include state information of the target workpiece 9 after the corresponding task is executed. Examples of the state information of the target workpiece 9 include position/posture of the target workpiece 9 after conveyance.

The virtual information collection unit 314 is configured to acquire the virtual execution situation information from the process storage unit 514. The virtual information collection unit 314 may further acquire the virtual control signal from the environment information storage unit 521. The virtual information collection unit 314 may acquire virtual environment information including the virtual control signal from the environment information storage unit 521 in association with the time on the second timeline.

The virtual information database 315 is configured to accumulate virtual execution situation information and virtual control signal collected by the virtual information collection unit 314. The virtual information database 315 may store the virtual control signal in association with the time along the second timeline. The virtual information database 315 may accumulate virtual environment information including the virtual control signal in association with a time along the second timeline.

The task comparison unit 316 is configured to extract one or more inconsistent tasks in which the real execution situation information and the virtual execution situation information are inconsistent with each other among a plurality of tasks. The inconsistency means that the difference between the real execution situation information and the virtual execution situation information exceeds a predetermined level. The task comparison unit 316 may perform comparison between the real execution situation information and the virtual execution situation information for at least one task among a plurality of tasks, and may not perform comparison between real execution situation information and virtual execution situation information for all of the plurality of tasks. Examples of the extraction of the inconsistent task by the task comparison unit 316 are shown below.

Example 1) Extracting one or more inconsistent tasks in which a difference between an execution time length (time length from start to completion) based on the real execution situation information and an execution time length based on the virtual execution situation information exceeds a predetermined level.

Example 2) Extracting one or more inconsistent tasks in which a difference between the state information of the target workpiece 9 based on the real execution situation information and the state information of the target workpiece 9 based on the virtual execution situation information exceeds a predetermined level.

The situation comparatively displaying unit 317 is configured to display the real execution situation information of each of the plurality of tasks collected by the real information collection unit 312 and the virtual execution situation information of each of the plurality of tasks collected by the virtual information collection unit 314 on a display unit (for example, a display device 395 to be described later) in comparison with each other for each task.

FIG. 16 is a table illustrating a comparative display of the real execution situation information and the virtual execution situation information. In this table, an execution time length based on the real execution situation information and an execution time length based on the virtual execution situation information are displayed for each of a plurality of tasks. In addition, this table displays the state information of the target workpiece 9 based on the real execution situation information and the state information of the target workpiece 9 based on the virtual execution situation information for each of a plurality of tasks.

The display form changing unit 318 is configured to display one or more inconsistent tasks on the display unit in a display form different from that of other tasks. In the table illustrated in FIG. 16, the display form changing unit 318 highlights a row corresponding to the inconsistent task by a style change such as coloring.

The real signal extraction unit 321 is configured to extract a real control signal corresponding to one or more inconsistent tasks from the real information database 313. For example, the real signal extraction unit 321 extracts real control signals corresponding to one or more inconsistent tasks from the real information database 313 based on the execution start time and the execution completion time in the first timeline. For example, the real signal extraction unit 321 extracts, from the real information database 313, the real control signal accumulated in association with the time from execution start time to execution completion time of the inconsistent task in the first timeline.

The virtual signal extraction unit 322 is configured to extract a virtual control signal corresponding to one or more inconsistent tasks from the virtual information database 315. For example, the virtual signal extraction unit 322 extracts virtual control signals corresponding to one or more inconsistent tasks from the virtual information database 315 based on the execution start time and the execution completion time in the second timeline. For example, the virtual signal extraction unit 322 extracts, from the virtual information database 315, virtual control signals accumulated in association with times from execution start time to execution completion time of the inconsistent task in the second timeline.

The signal comparatively displaying unit 323 is configured to compare the real control signal extracted by the real signal extraction unit 321 with the virtual control signal extracted by the virtual signal extraction unit 322 and to display the comparison result on the display unit (for example, the display device 395 described below). For example, the signal comparatively displaying unit 323 displays the timing chart of the real control signal and the timing chart of the virtual control signal in comparison with each other in a state where the start time of the inconsistent task is aligned for each type of the control signal.

Figure 17A:
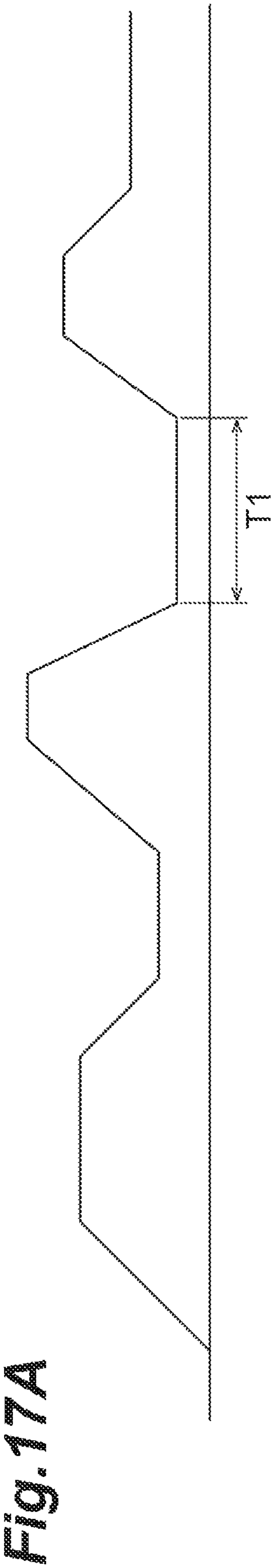
FIGS. 17A, 17B, 17C, and 17D are timing charts illustrating an example comparative displaying of control signals.
Figure 17B:
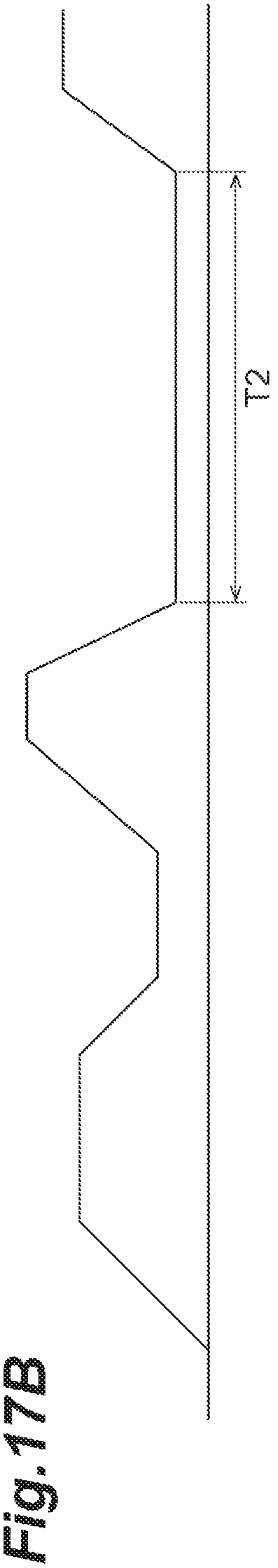
Figure 17C:
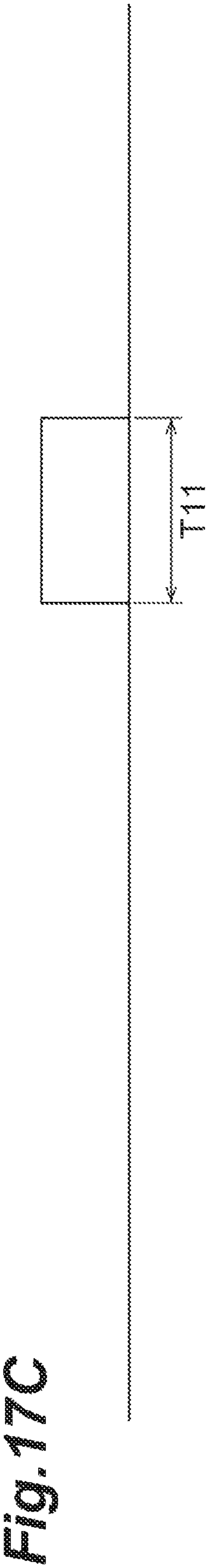
Figure 17D:
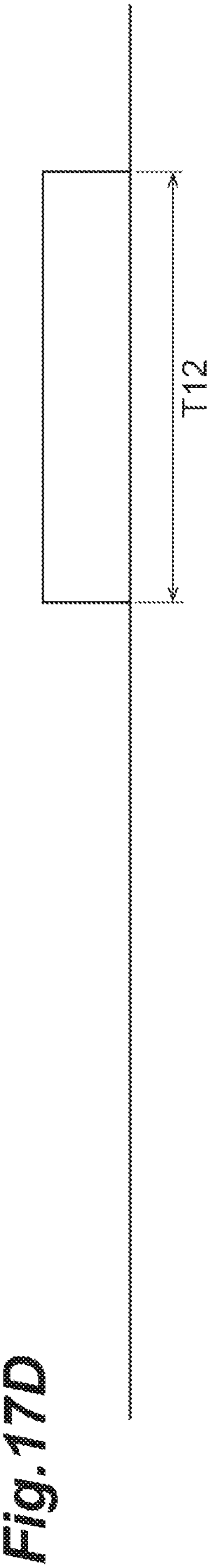

FIGS. 17A, 17B, 17C, and 17D are charts illustrating a comparative display between a real control signal and a virtual control signal. The chart includes a comparative display for signal types A and B. The signal type A is a control signal for the first actuator of the subordinate local device 2, and a signal type B is a control signal for the second actuator of the subordinate local device 2. The first actuator and the second actuator cooperate. FIG. 17A is a timing chart of a real control signal A1 for the signal type A, and FIG. 17B is a timing chart of a virtual control signal A2 corresponding to the signal type A. FIG. 17C is a timing chart of a real control signal B1 for the signal type B, and FIG. 17D is a timing chart of a virtual control signal B2 corresponding to the signal type B.

When the chart of FIG. 17A is compared with the chart of FIG. 17B, it can be seen that there is a difference between a period T1 in which the real control signal A1 is at a low level and a period T2 in which the virtual control signal A2 is at a low level. When the chart of 17A and the chart of 17C are compared with each other, it can be seen that the period T1 in which the real control signal A1 is at the low level corresponds to the period T11 in which the real control signal B1 is at the high level. When the chart of 17B and the chart of 17D are compared with each other, it can be seen that the period T2 in which the virtual control signal A2 is at the low level corresponds to the period T12 in which the virtual control signal B2 is at the high level.

From these charts, it is estimated that the inconsistency between the real control signal B1 and the virtual control signal B2 is a factor of inconsistency between the real execution situation information and the virtual execution situation information in the inconsistent task. For example, the difference between the operation of the second actuator in the real space and the operation of the second actuator in the virtual space is estimated to be the factor of inconsistency. For example, in the subordinate local device 2, a difference between a portion driven by the second actuator and model information of the portion in the model storage unit 311 is estimated to be the factor of inconsistency.

The data management device 300 may further include a progress displaying unit 324. The progress displaying unit 324 is configured to control the display unit (for example, the display device 395 described later) to display progress of a plurality of processes for each of a plurality of the workpiece 9 in the real space. For example, the progress displaying unit 324 displays the task being executed by the production system 1 on the display unit based on the real execution situation information collected by the real information collection unit 312.

Figure 18:
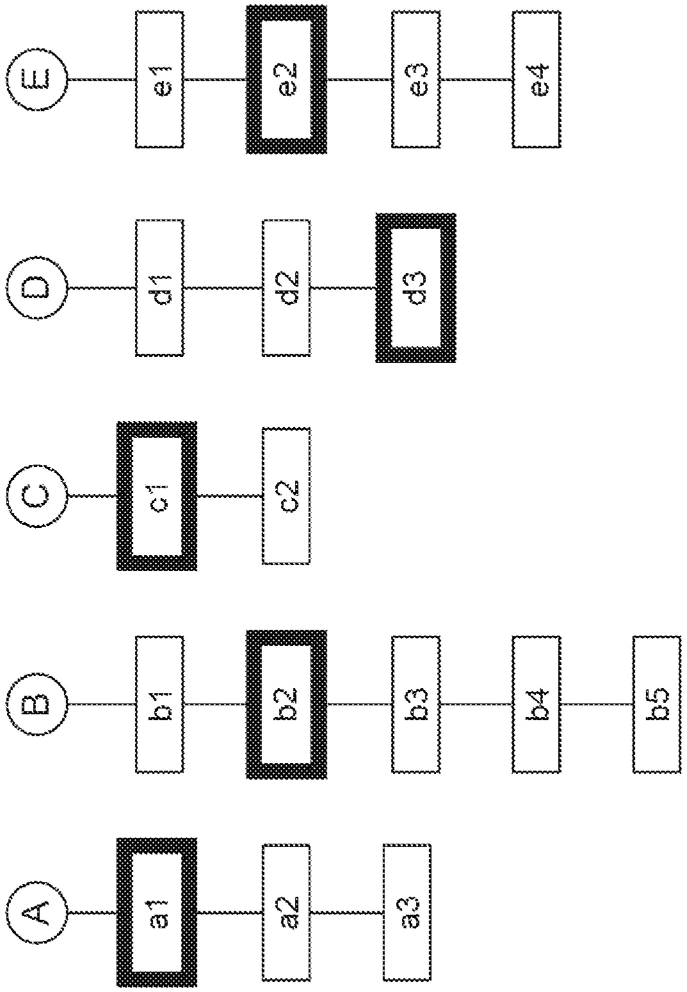
FIG. 18 is a chart illustrating a display example of tasks being executed.

FIG. 18 is a diagram illustrating a display example of progress of a plurality of processes. For example, the progress displaying unit 324 displays a process for each of a plurality of workpieces in a flowchart, and highlights a task being executed by the production system 1 in each flowchart. The chart of FIG. 18 illustrates, from left to right, a flowchart of a process for the workpiece A, a flowchart of a process for the workpiece B, a flowchart of a process for the workpiece C, a flowchart of a process for the workpiece D, and a flowchart of a process for the workpiece E.

Figure 19:
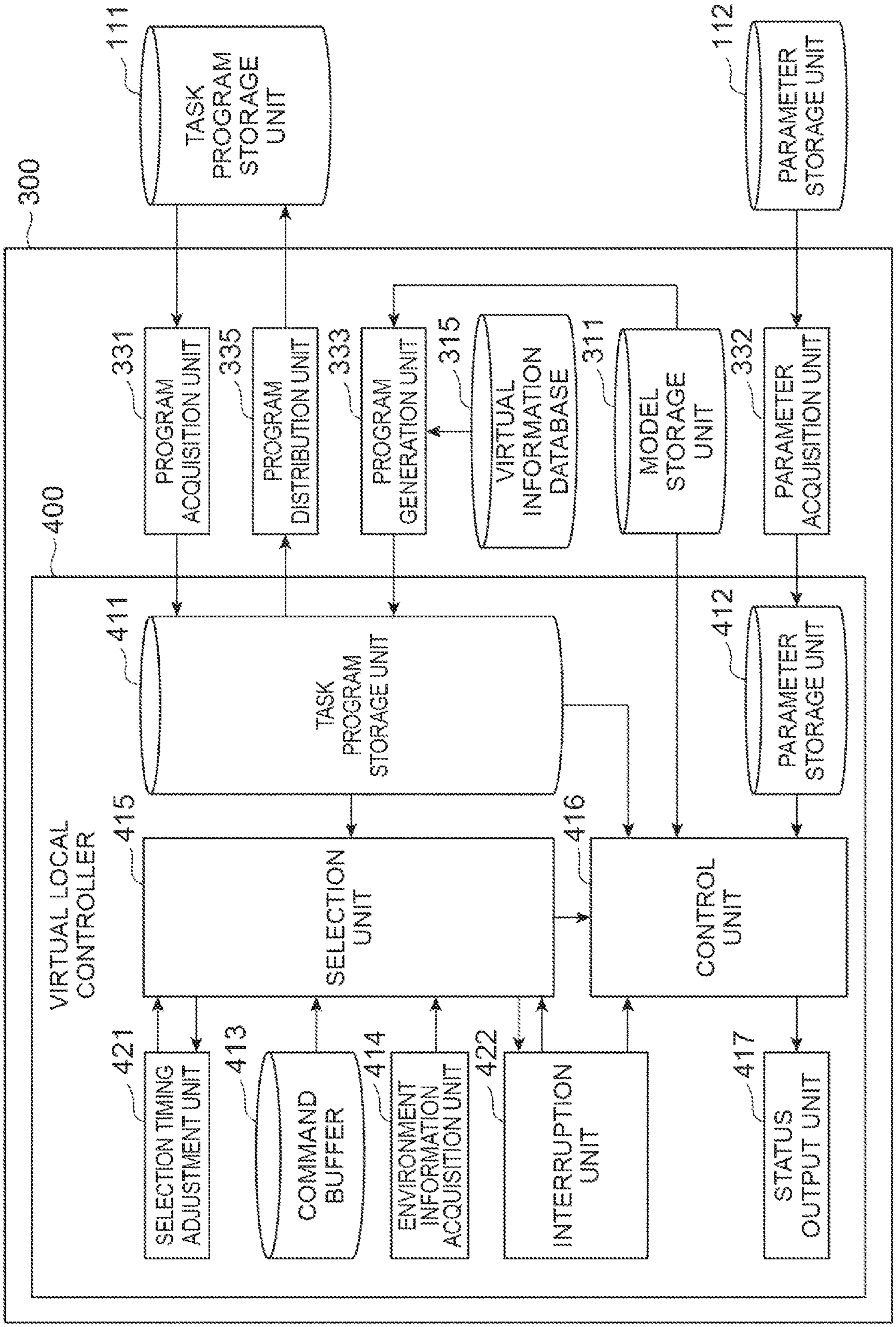
FIG. 19 is a block diagram illustrating a modified example of the data management device.

As illustrated in FIG. 19, the data management device 300 may further include a program acquisition unit 331, a parameter acquisition unit 332, a program generation unit 333, and a program distribution unit 335 as functional blocks.

The program acquisition unit 331 is configured to acquire the task program 130 of the working task registered by teaching in each local controller 100, and to store it in the task program storage unit 411 of the virtual local controllers 400. After the teaching of the working task, the execution condition of the working task may be undetermined. For example, the condition header 131 in the task program 130 may be blank.

The parameter acquisition unit 332 is configured to acquire one or more control parameters stored by the parameter storage unit 112 in each of the local controllers 100, and to store the parameters in the parameter storage unit 412 of the virtual local controllers 400.

The program generation unit 333 is configured to generate the one or more air cut tasks based on the working task acquired by the program acquisition unit 331 and the model information stored in the model storage unit 311, and to store the one or more air cut tasks in the task program storage unit 411. The program generation unit 333 generates the air cut task by repeating addition of a via point capable of avoiding collision with a peripheral object between a start point and an end point of the air cut task until collision with the peripheral object can be avoided over the entire region from the start point to the end point. The program generation unit 333 may generate the air cut task for all combinations of two working tasks assumed to be sequentially executed in a plurality of working tasks stored in the task program storage unit 411.

The program generation unit 333 (execution condition generation unit) generates at least a part of the one or more execution conditions based on an operation in the virtual space of a plurality of virtual local devices. For example, the program generation unit 333 generates an execution propriety condition based on the environment information accumulated in the virtual information database 315.

For example, the program generation unit 333 generates an execution propriety condition of task of a first virtual local device and an execution propriety condition of a second virtual local device so as to avoid collision in the virtual space between one virtual local device (first virtual local device) and another virtual local device (second virtual local device) based on environment information accumulated in the virtual information database 315. For example, when a plurality of tasks include a first robot task executed by a robot (for example, the robot 2B, the robot 2C, or the mobile robot 2D) and a second robot task executed by a second robot (for example, robot 2B, 2C, or the mobile robot 2D), the program generation unit 333 generates an execution propriety condition of the first robot task and an execution propriety condition of the second robot task so as to avoid collision in the virtual space between a virtual robot corresponding to the robot and a second virtual robot corresponding to the second robot.

For example, the program generation unit 333 derives an overlapping region of an operation region of a virtual robot executing a first robot task and an operation region of a second virtual robot executing a second robot task, generates an execution propriety condition of the first robot task to include that the second virtual robot is not located in the overlapping region, and generate an execution propriety condition of the second robot task to include that the first virtual robot is not located in the overlapping region. The program generation unit 333 registers the generated execution propriety condition in the condition header 131 of the task program 130 of the corresponding task.

The program generation unit 333 may change at least a part of the execution condition so as to shorten the execution time of a plurality of processes in the virtual space when the plurality of virtual local devices operate based on the generated execution condition. For example, the program generation unit 333 repeats: randomly changing a priority combination that determines the priority of each of the plurality of tasks and registering each of the priority combinations in the condition header 131 of the corresponding the task program 130; and evaluating the execution times of the plurality of processes in the changed priority combination. The program generation unit 333 adopts the priority combination in which the execution time of the plurality of processes is the shortest, and registers each of the adopted priority combinations in the condition header 131 of the corresponding the task program 130.

A program stored by the task program storage unit 411 after addition of the air cut task by the program generation unit 333 and addition of the execution condition by the program generation unit 333, as described above, is referred to as a "generated program" below.

The program distribution unit 335 is configured to output the generated program in the task program storage unit 411 to the corresponding local controllers 100 and to store the program in the task program storage unit 111 of the local controllers 100. For example, the program distribution unit 335 outputs the generated program to the corresponding local controllers 100 via the host controller 200.

Figure 20:
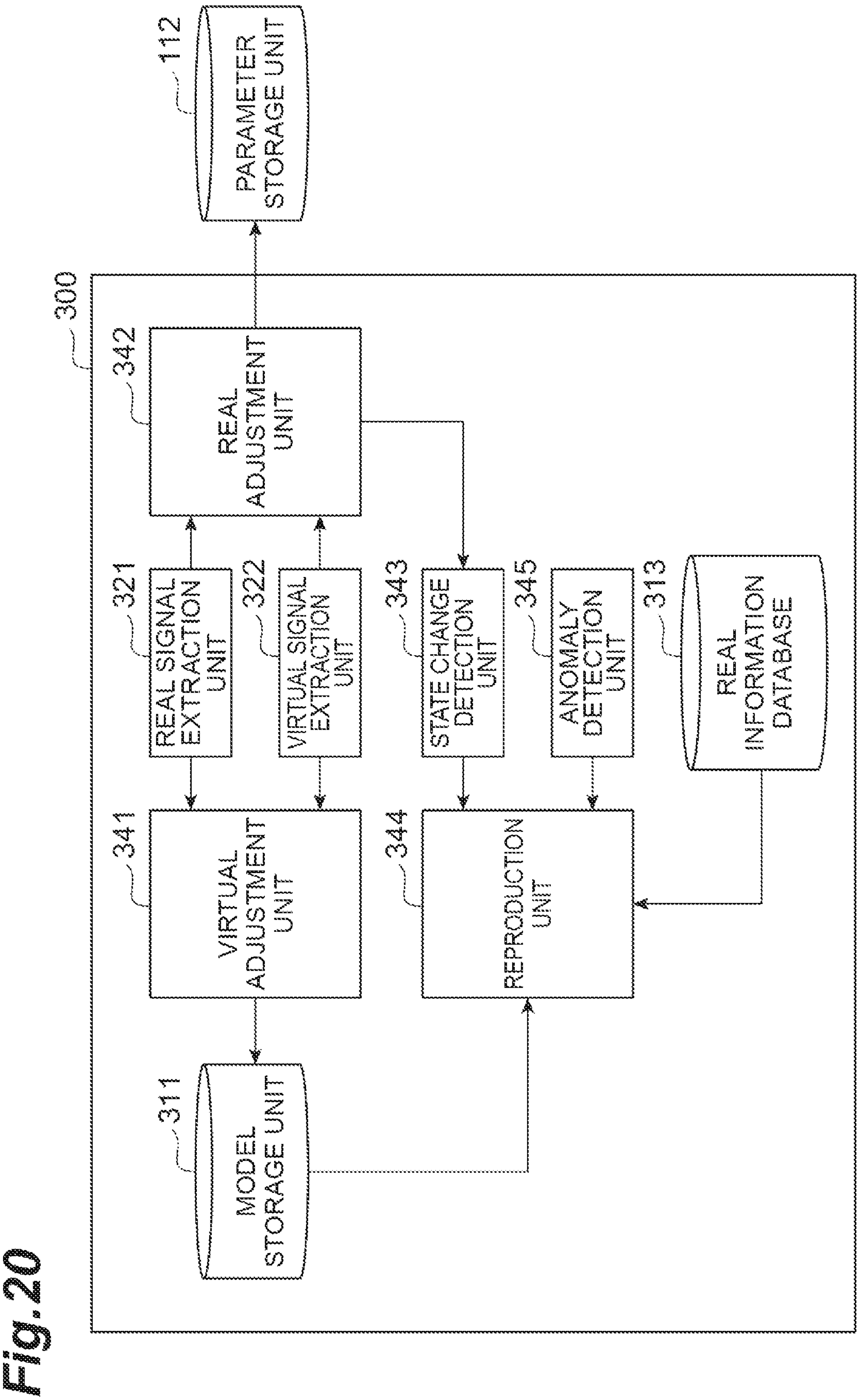
FIG. 20 is a block diagram illustrating a modified example of the data management device.

As illustrated in FIG. 20, the data management device 300 may further include a virtual adjustment unit 341, a real adjustment unit 342, a state change detection unit 343, a reproduction unit 344, and an anomaly detection unit 345.

The virtual adjustment unit 341 is configured to adjust parameters of models of the plurality of virtual local devices stored in the model storage unit 311 based on at least one of the real control signal extracted by the real signal extraction unit 321 and the virtual control signal extracted by the virtual signal extraction unit 322. Hereinafter, the real control signal extracted by the real signal extraction unit 321 is referred to as an "extracted real control signal", and the virtual control signal extracted by the virtual signal extraction unit 322 is referred to as an "extracted virtual control signal".

For example, the virtual adjustment unit 341 changes the parameters of the model of the corresponding virtual local device so that the control signal of the virtual local controllers 400 approaches the extracted real control signal. As an example, the virtual adjustment unit 341 changes the parameters of the model of the corresponding virtual local device so as to reduce the difference between the extracted real control signal and the extracted virtual control signal. An example of changing the parameters of the model of the virtual local device will be described below.

Example 1) Changing object information such as the arrangement, structure, dimensions of each part, and mass of each part.

Example 2) Changing the standard time in accordance with the operation time length of the local device 2 corresponding to the control command.

The real adjustment unit 342 is configured to adjust the control parameters (parameters of the parameter storage unit 112) of the plurality of local controllers 100 based on at least one of the extracted real control signal and the extracted virtual control signal. For example, the real adjustment unit 342 changes the parameter of the corresponding local controllers 100 so that the control signal of the local controllers 100 approaches the extracted virtual control signal. For example, the real adjustment unit 342 changes parameters such as the position control gain, the speed control gain, or the current control gain so as to reduce the difference between the extracted real control signal and the extracted virtual control signal. When the real adjustment unit 342 changes the parameter of the parameter storage unit 112, the parameter acquisition unit 332 may acquire the changed parameter from the parameter storage unit 112 and register the parameter in the parameter storage unit 412.

In a case where the difference between the extracted real control signal and the extracted virtual control signal is reduced due to the real adjustment unit 342 changing the parameter of the parameter storage unit 112, if the changed parameter is overwritten by the parameter storage unit 412, the difference between the extracted real control signal and the extracted virtual control signal may be enlarged again. The virtual adjustment unit 341 may further change the parameter of the model of the virtual local device so as to reduce the difference enlarged again. As a result, the change of the local device 2 is reflected in the parameter of the model of the corresponding virtual local device.

The state change detection unit 343 is configured to detect a state change of at least one of the virtual local device 2 and the device with which the virtual local device 2 cooperate based on at least one of the extracted real control signal and the extracted virtual control signal. Examples of the state change include a change in responsiveness to a control command, a change in tracking accuracy with respect to the control command, and the like. Examples of a change factor of the responsiveness include an increase in internal failure due to an increase in friction or the like. Examples of a change factor of the follow-up accuracy include an increase in rattling of the movable portion.

The reproduction unit 344 is configured to control, when the state change detection unit 343 detects the state change, the subordinate virtual robot to reproduce the operation of the subordinate local device 2 that executes the task based on at least the real control signal corresponding to the task in which the state change has occurred. Hereinafter, the task in which the state change has occurred is referred to as a "change occurrence task". For example, the reproduction unit 344 generates a replay video of the operation of the local device 2 that executes the change occurrence task based on the model of the virtual local device stored in the model storage unit 311 and the real control signal corresponding to the change occurrence task, and displays the replay video on the display unit (for example, the display device 395 described later) or the like. The reproduction unit 344 may control the subordinate virtual local device to reproduce the operation of the subordinate local device 2 based on the real control signal for tasks before and after the change-occurring task.

The data management device 300 may further include the anomaly detection unit 345. The anomaly detection unit 345 is configured to detect an anomaly of at least one of the subordinate local device 2 and a device with which the subordinate local device 2 cooperate based on an alarm signal or the like generated by the host controller 200. When the anomaly detection unit 345 detects an anomaly, the reproduction unit 344 may control the subordinate virtual local device to reproduce an operation of the subordinate local device 2 at least one of before and after a time point at which the anomaly occurs, based on the real control signal.

Figure 21:
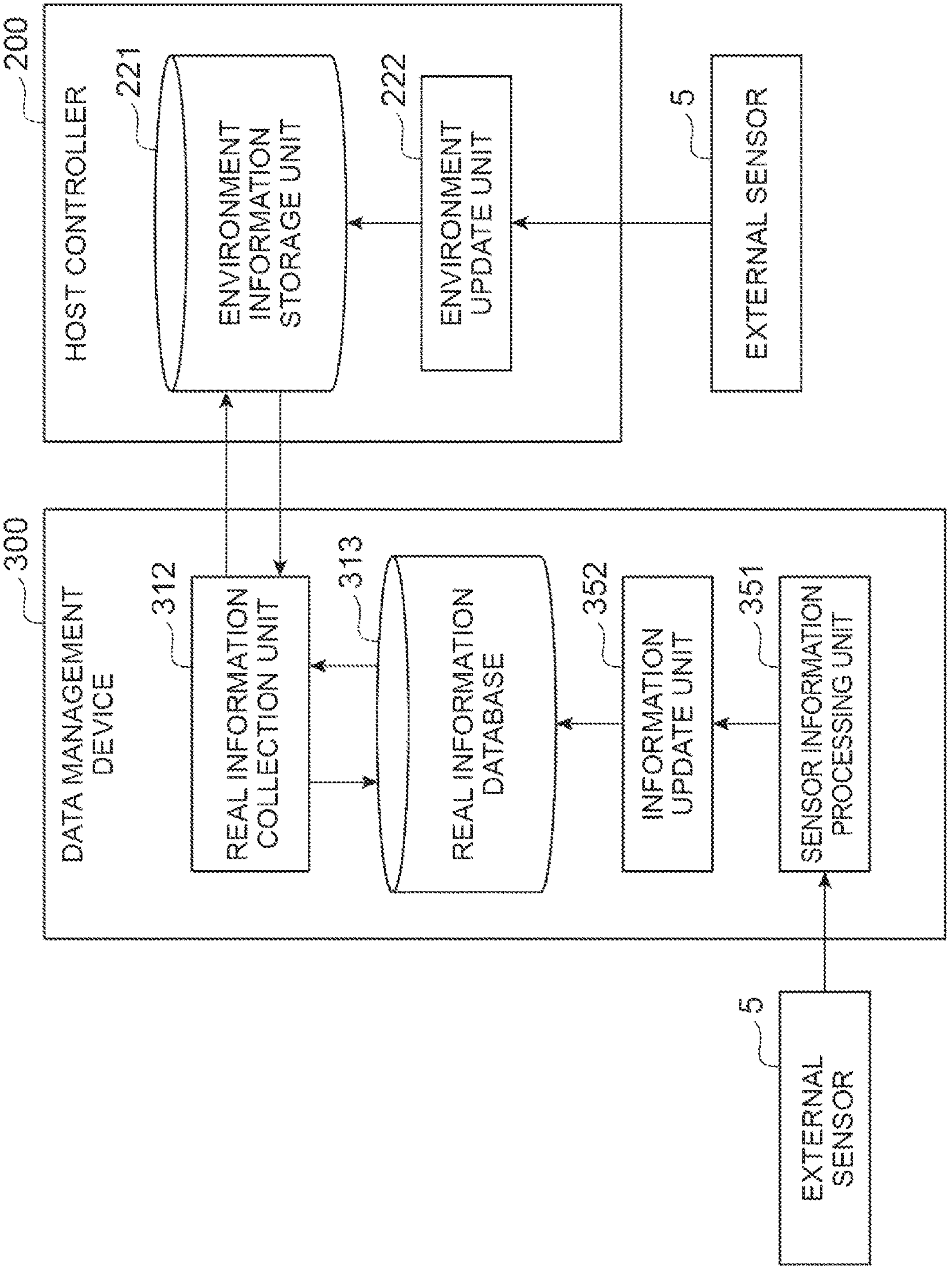
FIG. 21 is a block diagram illustrating a modified example of the data management device.

As illustrated in FIG. 21, the data management device 300 may further include a sensor information processing unit 351 and an information update unit 352. The sensor information processing unit 351 is configured to perform predetermined processing on sensor information acquired from the external sensor 5. Examples of the predetermined process include a process of extracting workpiece information such as the type and position/posture of the workpiece 9, position of the local device 2, device information such as the operation state of the local device 2, and an approach state of the local device 2 with respect to the workpiece 9 (composite information of workpiece information and device information) based on image information acquired from a camera as an example of the external sensor 5.

The information update unit 352 is configured to update the latest environment information in the real information database 313 based on the processing result by the sensor information processing unit 351. When the latest environment information in the real information database 313 is updated by the information update unit 352, the real information collection unit 312 updates the environment information of the environment information storage unit 221 in the host controller 200 in accordance with the update result. As a result, an information process load in the host controller 200 may be reduced and to save a synchronous communication resource or the like in the host controller 200.

Figure 22:
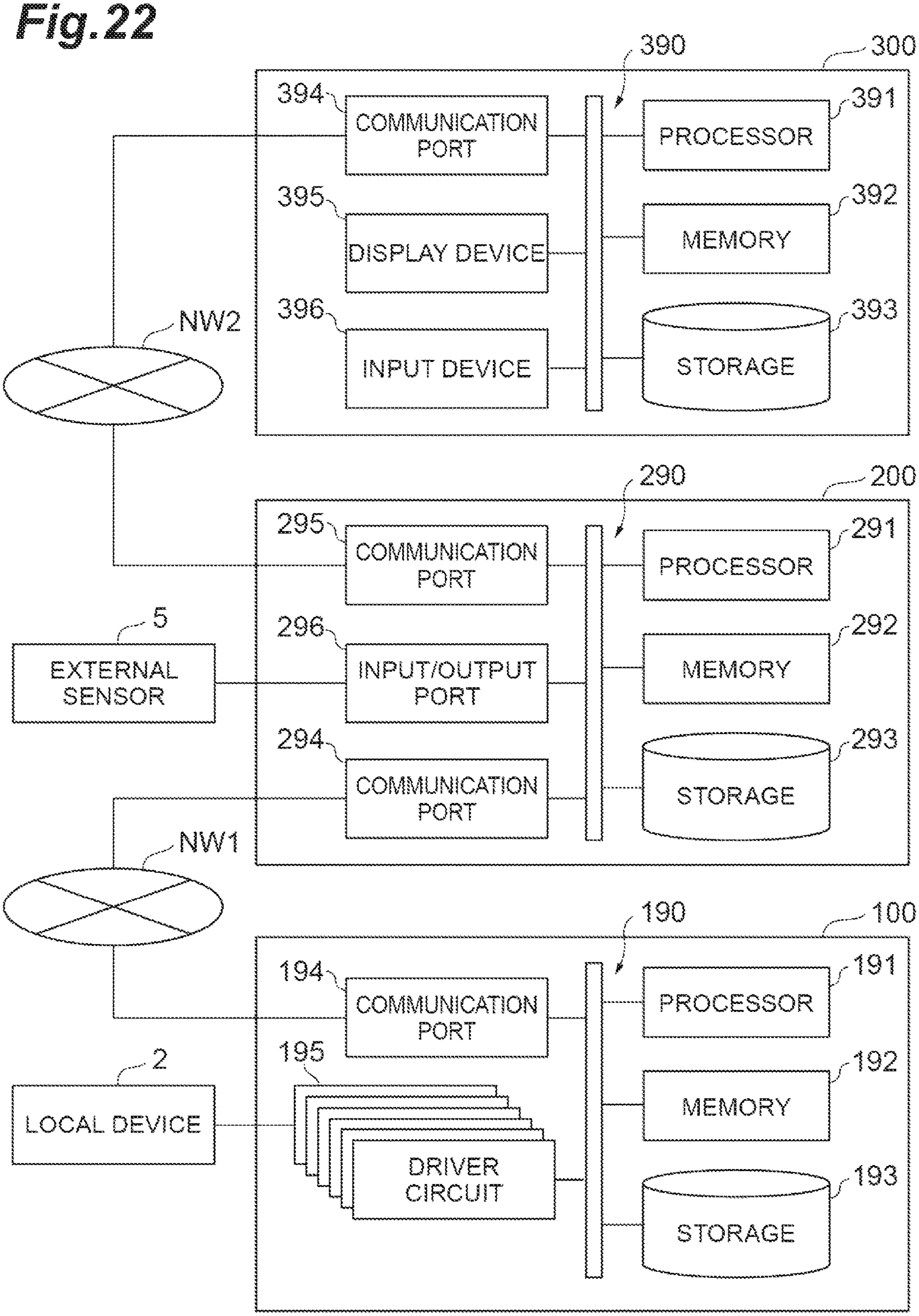
FIG. 22 is a diagram illustrating a hardware configuration of the control system.

FIG. 22 is a block diagram illustrating an example hardware configuration of the control system 3. As illustrated in FIG. 22, the host controller 200 includes circuitry 290. The circuitry 290 includes one or more processor(s) 291, a memory 292, storage 293, communication ports 294 and 295, and an input/output port 296. The storage 293 includes a computer-readable storage medium such as a nonvolatile semiconductor memory. The storage 293 stores a program for causing the host controller 200 to execute: transmitting an execution command of the next task to the local controller 100 based on a process including a plurality of tasks for the workpiece 9 and the progress information of the process; storing environment information in the environment information storage unit 221; and updating the environment information based on the execution command and the environment information in the environment information storage unit 221 in accordance with an operation which the local controllers 100 controlled the local device 2 to execute. For example, the storage 293 stores a program for configuring the above-described functional blocks in the host controller 200.

The memory 292 temporarily stores the program loaded from the storage medium of the storage 293 and the calculation result by the processor 291. The processor 291 configures each functional block of the host controller 200 by executing the program in cooperation with the memory 292. The communication port 294 communicates with the local controllers 100 via a first network line NW1 in accordance with commands from the processor 291. The communication port 295 communicates with the data management device 300 via a second network line NW2 in accordance with commands from the processor 291. The input/output port 296 inputs and outputs information to and from the external sensor 5 in accordance with commands from the processor 291.

The local controller 100 includes circuitry 190. The circuitry 190 include one or more processor(s) 191, a memory 192, storage 193, a communication port 194, and a driver circuit 195. The storage 193 includes a computer-readable storage medium such as a nonvolatile semiconductor memory. The storage 193 stores a program for causing the local controller 100 to execute: storing in the command buffer 113 an execution command of the next task transmitted by the host controller 200 based on a process including a plurality of tasks for the workpiece 9 and progress information of the process; controlling the local device 2 to execute the next task based on environment information updated by the host controller 200 in response to execution of the task by the local device 2 and the execution command; and transmitting an execution situation of the next task to the host controller 200. For example, the storage 193 stores a program for causing the local controller 100 to configure the above-described functional blocks.

The memory 192 temporarily stores the program loaded from the storage medium of the storage 193 and the calculation result by the processor 191. The processor 191 configures each functional block of the local controllers 100 by executing the program in cooperation with the memory 192. The communication port 194 communicates with the host controller 200 via the first network line NW1 in accordance with commands from the processor 191. The driver circuit 195 outputs drive power to the local device 2 in accordance with commands from the processor 191.

The data management device 300 includes circuitry 390. The circuitry 390 includes one or more processor(s) 391, a memory 392, a storage 393, a communication port 394, a display device 395, and an input device 396. The storage 393 includes a computer-readable storage medium such as a nonvolatile semiconductor memory. The storage 393 stores a program for causing the data management device 300 to execute: collecting real execution situation information representing the execution situation of each of the tasks by the local controller 100; collecting virtual execution situation information representing the execution situation of each of the tasks by the virtual local controllers 400; and extracting one or more inconsistent tasks in which the real execution situation information and the virtual execution situation information are inconsistent with each other among the tasks. For example, the storage 393 stores a program for configuring the above-described functional blocks in the data management device 300.

The memory 392 temporarily stores the program loaded from the storage medium of the storage 393 and the calculation result by the processor 391. The processor 391 configures each functional block of the data management device 300 by executing the program in cooperation with the memory 392. The communication port 394 communicates with the host controller 200 via the second network line NW2 in accordance with commands from the processor 391. The display device 395 and the input device 396 function as user interfaces of the data management device 300. The display device 395 includes, for example, a liquid crystal monitor, and is used to display information to the user. The input device 396 is, for example, a keypad or the like, and acquires input information by the user. The display device 395 and the input device 396 may be integrated like a so-called touch panel. The display device 395 and the input device 396 may be provided in an external device connected to the data management device 300 or may be incorporated in the data management device 300.

It should be noted that the circuitry 190, 290, and 390 may not be limited to one that configures each function by a program. For example, the circuitry 190, 290, and 390 may configure at least a part of functions by a dedicated logic circuit or an application specific integrated circuit (ASIC) in which the dedicated logic circuit is integrated. Each of the local controller 100, the host controller 200, and the data management device 300 may be constituted by a plurality of computers capable of communicating with each other, and each computer may have the circuitry. For example, the data management device 300 may be configured by a plurality of computers including a data collecting device and a simulation device. The functional blocks of the above-described data management device 300 may be distributed to a plurality of computers. As an example, the virtual local controller 400, the virtual host controller 500, the model storage unit 311, the program acquisition unit 331, the program distribution unit 335, the program generation unit 333, and the parameter acquisition unit 332 may be configured in the simulation device, and the real information collection unit 312, the real information database 313, the virtual information collection unit 314, the virtual information database 315, the task comparison unit 316, the situation comparatively displaying unit 317, the display form changing unit 318, the real signal extraction unit 321, the virtual signal extraction unit 322, the signal comparatively displaying unit 323, the progress displaying unit 324, the virtual adjustment unit 341, the real adjustment unit 342, the state change detection unit 343, the reproduction unit 344, the anomaly detection unit 345, the sensor information processing unit 351, and the information update unit 352 may be configured in the data collecting device. The data collecting device may further collect and store the task program 130 and control parameters of each local controller 100 and distribute the task program 130 to each local controller 100. The program acquisition unit 331 may acquire the task program 130 from the local controller 100 via the data collecting device. The parameter acquisition unit 332 may acquire control parameters from local controller 100 via the data collecting device. The program distribution unit 335 may output the generated program to the local controller 100 via the data collecting device. In addition, the simulation device may be configured in one computer by a program in which functions as the simulation device are integrated, and the data collection device may be configured in the same computer by a program in which functions as the data collection device are integrated.

Control Procedure

A control procedure performed by the control system 3 will be described as an example of the control method. The control procedure includes: transmitting an execution command of a next task to the local controller 100 based on a process including a plurality of tasks for the workpiece 9 and progress information of the process; storing environment information in the environment information storage unit 221; and updating the environment information based on the execution command and the environment information in the environment information storage unit 221 in response to an operation which the local controller 100 controls the local device 2 to execute.

Further, the control procedure includes: storing, in a command buffer, a process including a plurality of tasks for the workpiece 9 and an execution command of a next task transmitted by the host controller 200 based on the progress information of the process; controlling the local device 2 to execute the next task based on environment information updated by the host controller 200 in response to execution of the task by the local device 2 and the execution command; and transmitting an execution situation of the next task to the host controller 200.

In another aspect, the control procedure includes: controlling the local device 2 to execute tasks included in a process for the workpiece 9 in the real space; controlling a virtual local device to execute tasks in the virtual space; collecting real execution situation information representing an execution situation of each of the tasks by the local controller 100; collecting virtual execution situation information representing an execution situation of each of the tasks by the virtual local controller 400; and extracting one or more inconsistent tasks in which the real execution situation information and the virtual execution situation information are separated from each other among the tasks.

Hereinafter, an example control procedure will be described in detail by dividing it into a progress management procedure executed by the host controller 200, a control procedure executed by the local controller 100, and a data management procedure executed by the data management device 300. At least the progress management procedure executed by the host controller 200 and the control procedure executed by the local controllers 100 are executed in parallel.

Progress Management Procedure

Figure 23:
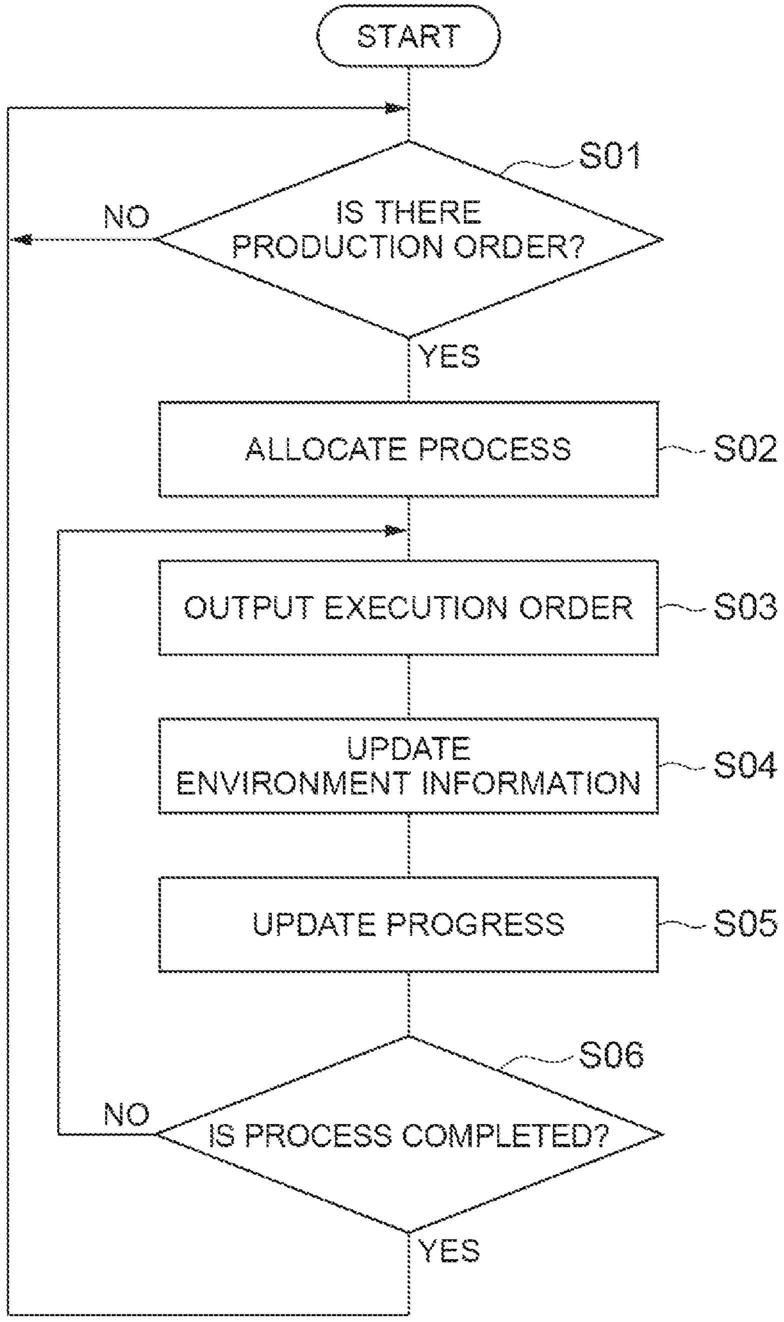
FIG. 23 is a flowchart illustrating a progress management procedure by the host controller.

As illustrated in FIG. 23, the host controller 200 sequentially executes operations S01, S02, S03, S04, S05, and S06. In operation S01, the order acquisition unit 212 waits for acquisition of the production order from the production management controller 4. In operation S02, the process allocation unit 213 allocates the process to the workpiece 9 specified by the production order and stores the result in the process storage unit 214.

In operation S03, the command output unit 215 outputs the execution command of the next task based on the process stored by the process storage unit 214 and the progress information of the process. In the process storage unit 214, when a plurality of processes are allocated to a plurality of the workpiece 9, respectively, the command output unit 215 outputs execution commands of a plurality of next tasks for each of the plurality of processes.

In operation S04, the environment update unit 222 acquires the status information of the local device 2 from each of the plurality of local controllers 100, acquires the detection result of the external sensor 5, and updates the environment information based on the status information and the detection result. In operation S05, the progress update unit 216 updates the progress information of the process storage unit 214 in response to the completion notification of the task included in the status information acquired in operation S04. If the status information does not contain a task completion notification, the progress information is not changed.

In operation S06, the command output unit 215 checks whether the process allocated to the workpiece 9 is completed in the process storage unit 214. For example, the command output unit 215 checks whether all tasks in the process storage unit 214 are completed.

If it is determined in operation S06 that task that has not been completed remains, the host controller 200 returns the processing to operation S03. Thereafter, the host controller 200 repeats operations S03 to S06 in a synchronous communication cycle of a predetermined cycle, for example, until all tasks in the process storage unit 214 are completed. If it is determined in operation S06 that all tasks are completed, the host controller 200 returns the processing to operation S01. The host controller 200 repeatedly executes the above processing.

Control Procedure

Figure 24:
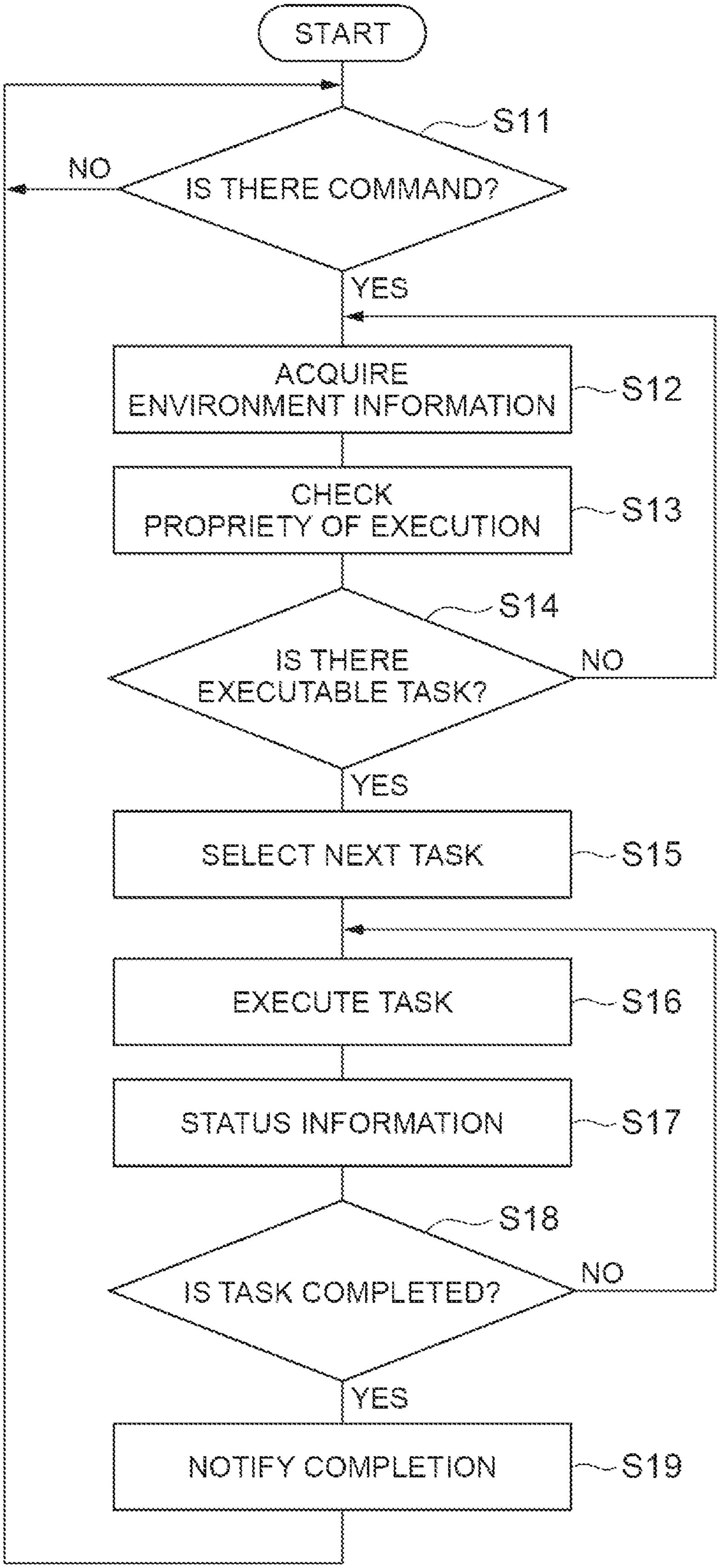
FIG. 24 is a flowchart illustrating a control procedure by the local controller.

As illustrated in FIG. 24, the local controller 100 first executes operations S11, S12, S13, and S14. In operation S11, the selection unit 115 waits for one or more execution commands of next task to be accumulated in the command buffer 113. In operation S12, the environment information acquisition unit 114 acquires environment information stored in the environment information storage unit 221.

In operation S13, the selection unit 115 checks the executability of each of the one or more next tasks based on the execution condition of each of the one or more next tasks and the environment information in the environment information storage unit 221. For example, the selection unit 115 may check whether the environment information satisfies an execution propriety condition of each of the one or more next tasks. In operation S14, the selection unit 115 checks whether there is an executable next task.

If it is determined in operation S14 that there is no executable next task, the local controller 100 returns the processing to operation S11. Thereafter, operations S11 to S14 are repeated in a communication cycle of a predetermined cycle until any next task becomes executable. The communication cycle may be synchronized with the synchronous communication cycle.

If it is determined in operation S14 that there is an executable next task, the local controller 100 executes operations S15, S16, S17, and S18. In operation S15, the selection unit 115 selects the next task having the highest priority among the executable next tasks. Hereinafter, the next task selected by the selection unit 115 is referred to as a "selected task".

In operation S16, the control unit 116 controls the subordinate local device 2 to execute one control cycle of the selected task. In operation S17, the status output unit 117 outputs the status information of the subordinate local device 2 to the host controller 200. In operation S18, the control unit 116 checks whether the execution of the selected task is completed.

If it is determined in operation S18 that the execution of the selected task is not completed, the local controller 100 returns the processing to operation S16. Thereafter, until the execution of the selected task is completed, the local controllers 100 operations S16 to S18 in a control cycle of a predetermined cycle. The control cycle may be synchronized with the synchronous communication cycle.

If it is determined in operation S18 that execution of the selected task is completed, the local controller 100 executes operation S19. In operation S19, the status output unit 117 includes the completion notification of the selected task in the status information and outputs the status information to the host controller 200. Thereafter, the local controller 100 returns the processing to operation S11. The local controller 100 repeats the above processing.

Figure 25:
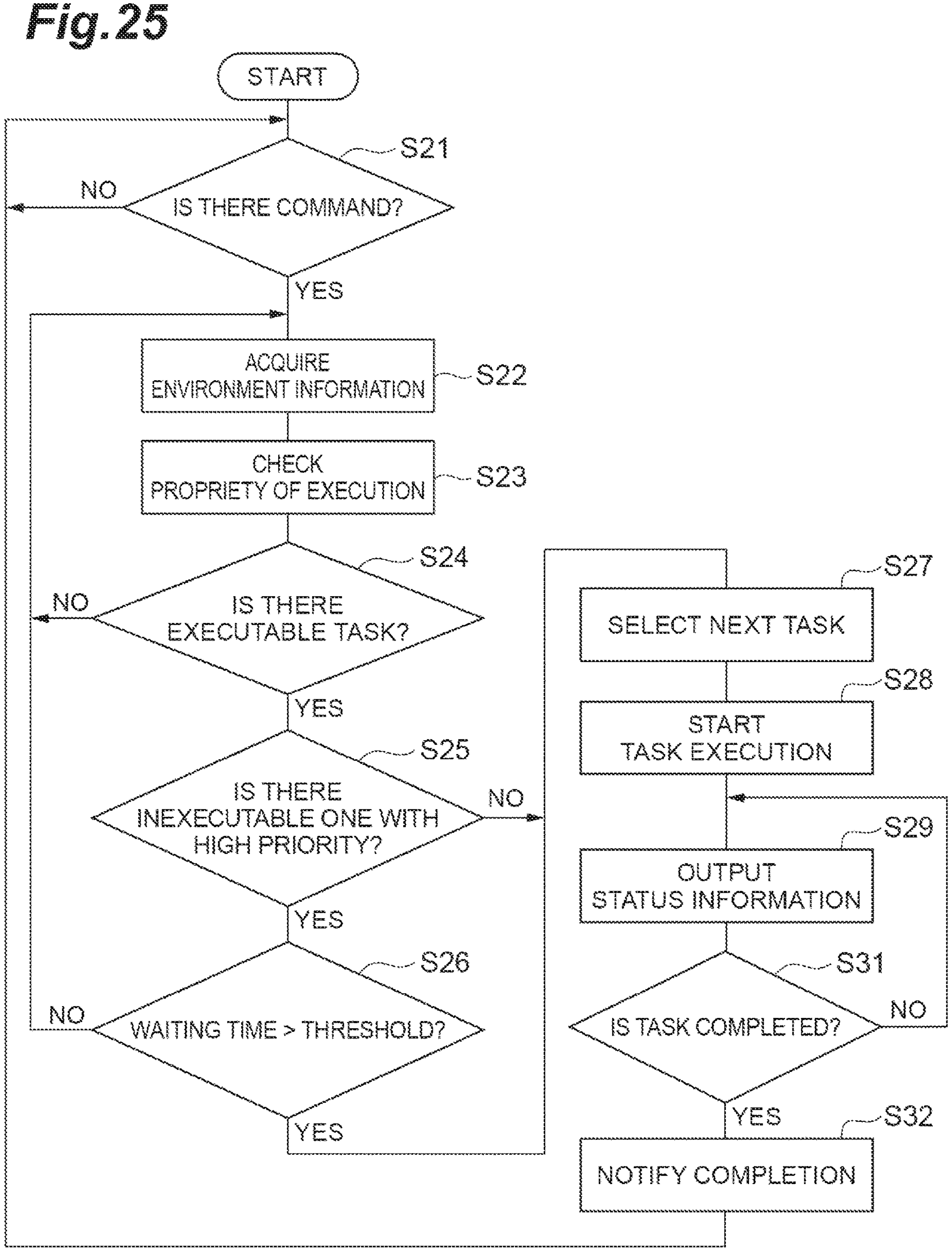
FIG. 25 is a flowchart illustrating a modified example of a control procedure.

The control procedure may further include adjusting selection timing of the next task based on the waiting time. FIG. 25 is a flowchart illustrating a control procedure including adjustment of selection timing of next task based on the waiting time. As illustrated in FIG. 25, the local controller 100 first executes operations S11 to S14 similar to operations S21 to S24. In operation S21, the selection unit 115 waits for one or more execution commands of next task to be accumulated in the command buffer 113. In operation S22, the environment information acquisition unit 114 acquires environment information stored in the environment information storage unit 221.

In operation S23, the selection unit 115 checks the executability of each of the one or more next tasks based on the execution condition of each of the one or more next tasks and the environment information in the environment information storage unit 221. For example, the selection unit 115 may check whether the environment information satisfies an execution propriety condition of each of the one or more next tasks. In operation S24, the selection unit 115 checks whether there is an executable next task.

If it is determined in operation S24 that there is no executable next task, the local controller 100 returns the processing to operation S21. If it is determined in operation S24 that there is an executable next task, the local controller 100 executes operation S25. In operation S25, the selection timing adjustment unit 121 checks whether there is a task that cannot be executed at the present time but has a higher priority than the next task that can be executed (hereinafter referred to as "selection candidate task").

If it is determined in operation S25 that the selection candidate task exists, the local controller 100 executes operation S26. In operation S26, the selection timing adjustment unit 121 checks whether the waiting time until the selection candidate task becomes executable exceeds a predetermined threshold. Specific examples of the waiting time include a waiting time until the completion of the machine task executed by another local device 2 before the selection candidate task.

If it is determined in operation S26 that the waiting time until the selection candidate task becomes executable does not exceed the predetermined threshold value, the local controller 100 returns the processing to operation S22 without selecting the next task that is executable. As a result, the selection timing of next task becomes later than the waiting time has elapsed. After the waiting time has elapsed, the selection candidate task is added to the executable next task.

In operation S26, when it is determined that the waiting time until the selection candidate task becomes executable exceeds the predetermined threshold value, the local controller 100 executes operation S27. When it is determined that the selection candidate task does not exist in operation S25, the local controller 100 executes operation S26 without executing operation S27. In operation S27, the selection unit 115 selects the next task having the highest priority among the executable next tasks. Hereinafter, the next task selected by the selection unit 115 is referred to as a "selected task".

Next, local controller 100 performs operations S28, S29, and S31. In operation S28, the control unit 116 controls the subordinate local device 2 to execute one control cycle of the selected task. In operation S29, the status output unit 117 outputs the status information of the subordinate local device 2 to the host controller 200. In operation S31, the control unit 116 checks whether the execution of the selected task is completed.

If it is determined in operation S31 that the execution of the selected task is not completed, the local controller 100 returns the processing to operation S28. Thereafter, until the execution of the selected task is completed, the local controller 100 repeats operations S28 to S31 in a control cycle of a predetermined cycle. The control cycle may be synchronized with the synchronous communication cycle.

If it is determined in operation S31 that execution of the selected task is completed, the local controller 100 executes operation S32. In operation S32, the status output unit 117 includes the completion notification of the selected task in the status information and outputs the status information to the host controller 200. Thereafter, the local controller 100 returns the processing to operation S21. The local controller 100 repeats the above processing.

Figure 26:
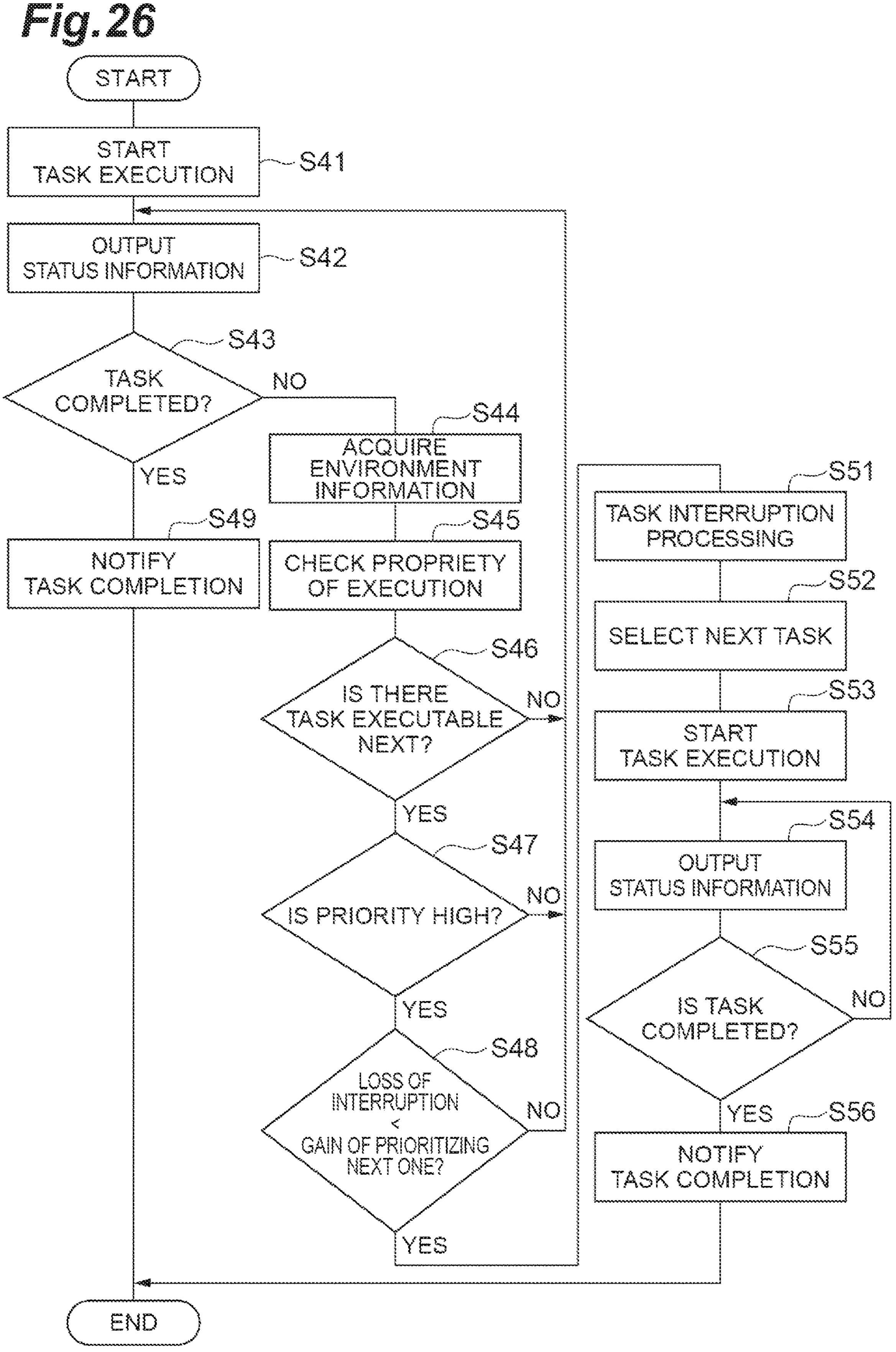
FIG. 26 is a flowchart illustrating another modified example of the control procedure.

The control procedure may further include suspending the execution of the second task and selecting the first task when the first task having priority higher than that of the second task becomes executable while the subordinate local device 2 is executing the second task. FIG. 26 is a flowchart illustrating a control procedure including interruption of the task being executed. FIG. 26 illustrates a procedure from the start of execution of the selected task to the output of the task completion notification in the control procedure.

As illustrated in FIG. 26, the local controllers 100 first execute operations S41, S42, and S43. In operation S41, as in operation S16, the control unit 116 controls the subordinate local device 2 to execute one control cycle of the selected task. In operation S42, the status output unit 117 outputs the status information of the subordinate local device 2 to the host controller 200. In operation S43, the control unit 116 checks whether the execution of the selected task is completed.

If it is determined in operation S43 that execution of the selected task is not completed, the local controllers 100 execute operations S44, S45, and S46. In operation S44, the environment information acquisition unit 114 acquires environment information stored in the environment information storage unit 221. In operation S45, the selection unit 115 checks the executability of each of the one or more next tasks based on the execution condition of each of the one or more next tasks and the environment information of the environment information storage unit 221. For example, the selection unit 115 may check whether the environment information satisfies an execution propriety condition of each of the one or more next tasks. In operation S46, the selection unit 115 checks whether there is an executable next task. Hereinafter, the executable next task is referred to as a "replacement candidate task".

If it is determined in operation S46 that there is an executable next task, the local controller 100 executes operation S47. In operation S47, the selection unit 115 checks whether the priority of the replacement candidate task is higher than the priority of the task being executed.

If it is determined in operation S47 that the priority of the replacement candidate task is higher than the priority of the task being executed, the local controller 100 executes operation S48. In operation S48, the selection unit 115 checks whether the execution time of the plurality of processes can be shortened more by suspending the selected task and controlling the selection unit 115 to select the replacement candidate task than by controlling the selection unit 115 to select the replacement candidate task after the completion of the selected task. Hereinafter, a case in which the execution of the selected task is suspended and the selection unit 115 selects the replacement candidate task is referred to as a "first case". A case in which the selection unit 115 selects the replacement candidate task after completion of the selected task is referred to as a "second case". As a simple method for checking whether the execution time of the plurality of processes can be shortened by the first case compared to by the second case, the selection unit 115 may check whether the remaining time of the selected task exceeds a predetermined threshold.

In operation S48, if it is determined that the execution time of the plurality of processes cannot be reduced by the first case as compared with the second case, the local controller 100 returns the processing to operation S42. For example, when the remaining time of the selected task is equal to or less than a predetermined threshold value, the local controllers 100 return the processing to operation S42. If it is determined in operation S46 that there is no executable next task, and if it is determined in operation S47 that the priority of the replacement candidate task is not higher than the priority of the task being executed, the local controller 100 also returns the processing to operation S42. Thereafter, unless the next task having higher priority becomes executable, the selected task is executed until completion.

If it is determined in operation S43 that execution of the selected task is completed, the local controller 100 executes operation S49. In operation S49, the status output unit 117 includes the completion notification of the selected task in the status information and outputs the status information to the host controller 200.

In operation S48, if it is determined that the execution time of a plurality of processes can be shortened by the first case compared to the second case, the local controller 100 executes operations S51, S52, S53, S54, and S55. In operation S51, the interruption unit 122 controls the control unit 116 to interrupt the task being executed. The interruption unit 122 may control the control unit 116 to return the subordinate local device 2 to the state before the start of the interrupted task. In operation S52, the interruption unit 122 controls the selection unit 115 to select the replacement candidate task. Hereinafter, the replacement candidate task is referred to as a "replaced task".

In operation S53, the control unit 116 controls the subordinate local device 2 to execute one control cycle of the replaced task. In operation S54, the status output unit 117 outputs the status information of the subordinate local device 2 to the host controller 200. In operation S55, the control unit 116 checks whether the execution of the replaced task is completed.

If it is determined in operation S55 that the execution of the replaced task is not completed, the local controllers 100 return the process to operation S53. Thereafter, until the execution of the selected task is completed, the local controller 100 repeats operations S53 to S55 in a control cycle of a predetermined cycle. The control cycle may be synchronized with the synchronous communication cycle.

If it is determined that the execution of the replaced task is completed in operation S55, the local controller 100 executes operation S56. In operation S56, the status output unit 117 includes the completion notification of the replaced task in the status information and outputs the status information to the host controller 200. Thus, the procedure up to the completion notification of task is completed.

Data Management Procedure

The data management procedure executed by the data management device 300 is roughly divided into a comparison procedure, a program generation procedure, an adjustment procedure, and an environment information update procedure. Hereinafter, examples of the comparison procedure, the program generation procedure, and the adjustment procedure will be described in detail.

Comparison Procedure

Figure 27:
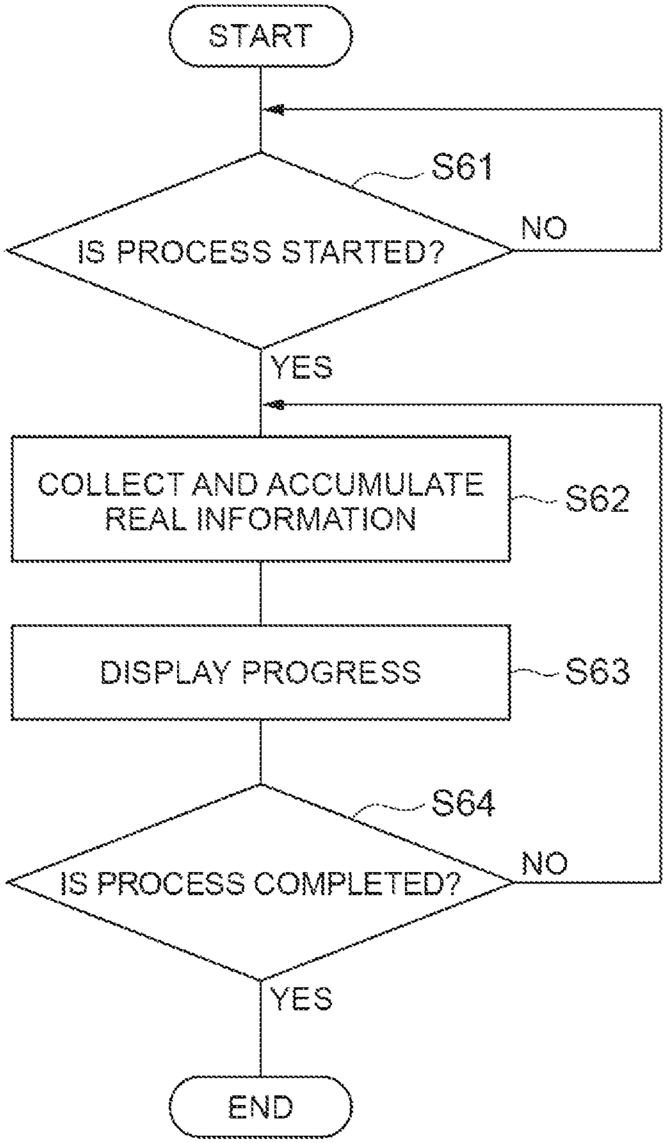
FIG. 27 is a flowchart illustrating an example real information collection procedure.

The comparison procedure includes a collection procedure of real information, a collection procedure of virtual information, and an extraction procedure of inconsistent task. FIG. 27 is a flowchart illustrating a procedure for collecting real information. As illustrated in FIG. 27, the data management device 300 sequentially executes operations S61, S62, S63, and S64. In operation S61, the real information collection unit 312 waits for the host controller 200 to start execution of the process corresponding to the production order.

In operation S62, the real information collection unit 312 acquires real execution situation information representing the execution situation of each of the tasks by the local controller 100 from the process storage unit 214, and accumulates the real execution situation information in the real information database 313. For example, the real information collection unit 312 collects real execution situation information including an execution start time and an execution completion time of each of the tasks in the first timeline. The real information collection unit 312 acquires environment information including the real control signal from the environment information storage unit 221, and accumulates the environment information in the real information database 313.

In operation S63, the progress displaying unit 324 displays the task being executed by the production system 1 on the display unit based on the real execution situation information acquired by the real information collection unit 312. In operation S64, the real information collection unit 312 checks whether the execution of the process by the host controller 200 is completed.

If it is determined in operation S64 that the execution of the process by the host controller 200 is not completed, the data management device 300 returns the processing to operation S62. Thereafter, the data management device 300 repeats acquisition and accumulation of real execution situation information and environment information and display of task being executed until the execution of process by the host controller 200 is completed. If it is determined in operation S64 that the execution of the process by the host controller 200 is completed, the collection procedure of the real information is completed.

Figure 28:
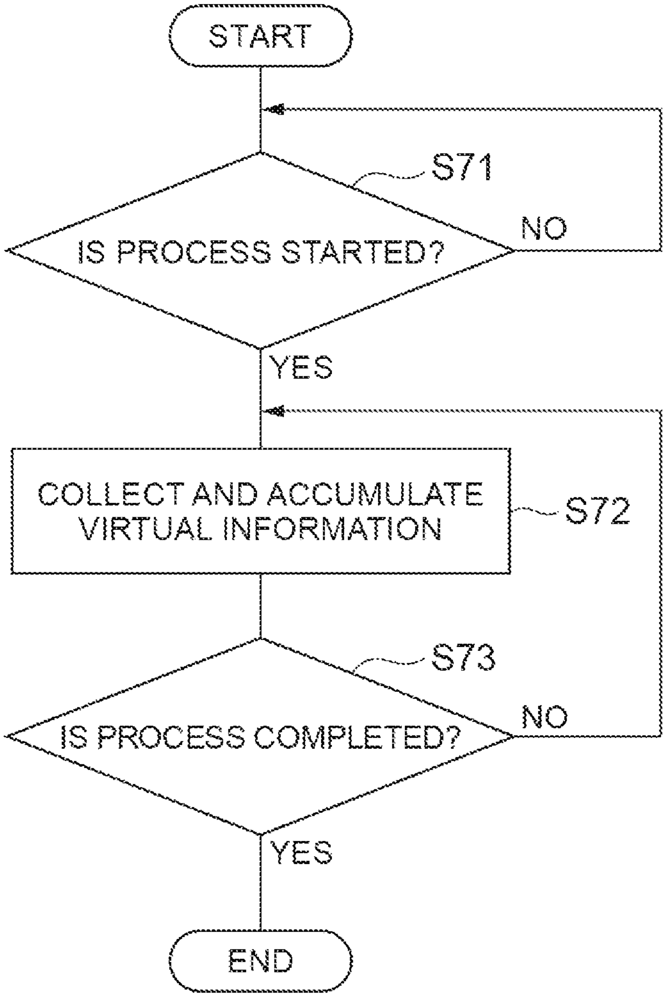
FIG. 28 is a flowchart illustrating an example virtual information collection procedure.

FIG. 28 is a flowchart illustrating a procedure for collecting virtual information. The data management device 300 sequentially executes operations S71, S72, and S73. In operation S71, the virtual information collection unit 314 waits for the virtual host controller 500 to start execution of the process corresponding to the production order.

In operation S72, the virtual information collection unit 314 acquires virtual execution situation information representing the execution situation of each of the tasks by the virtual local controllers 400 from the process storage unit 514, and accumulates the virtual execution situation information in the virtual information database 315. For example, the virtual information collection unit 314 collects virtual execution situation information including an execution start time and an execution completion time of each of the tasks in the second timeline. The virtual information collection unit 314 acquires virtual environment information including the virtual control signal from the environment information storage unit 521, and accumulates the virtual environment information in the virtual information database 315. In operation S73, the virtual information collection unit 314 checks whether the execution of the process by the virtual host controller 500 is completed.

If it is determined in operation S73 that the execution of the process by the virtual host controller 500 is not completed, the data management device 300 returns the processing to operation S72. Thereafter, the data management device 300 repeats acquisition and accumulation of virtual execution situation information and virtual environment information until execution of the process by the virtual host controller 500 is completed. When it is determined in operation S73 that the execution of the process by the virtual host controller 500 is completed, the collection procedure of the virtual information is completed.

Figure 29:
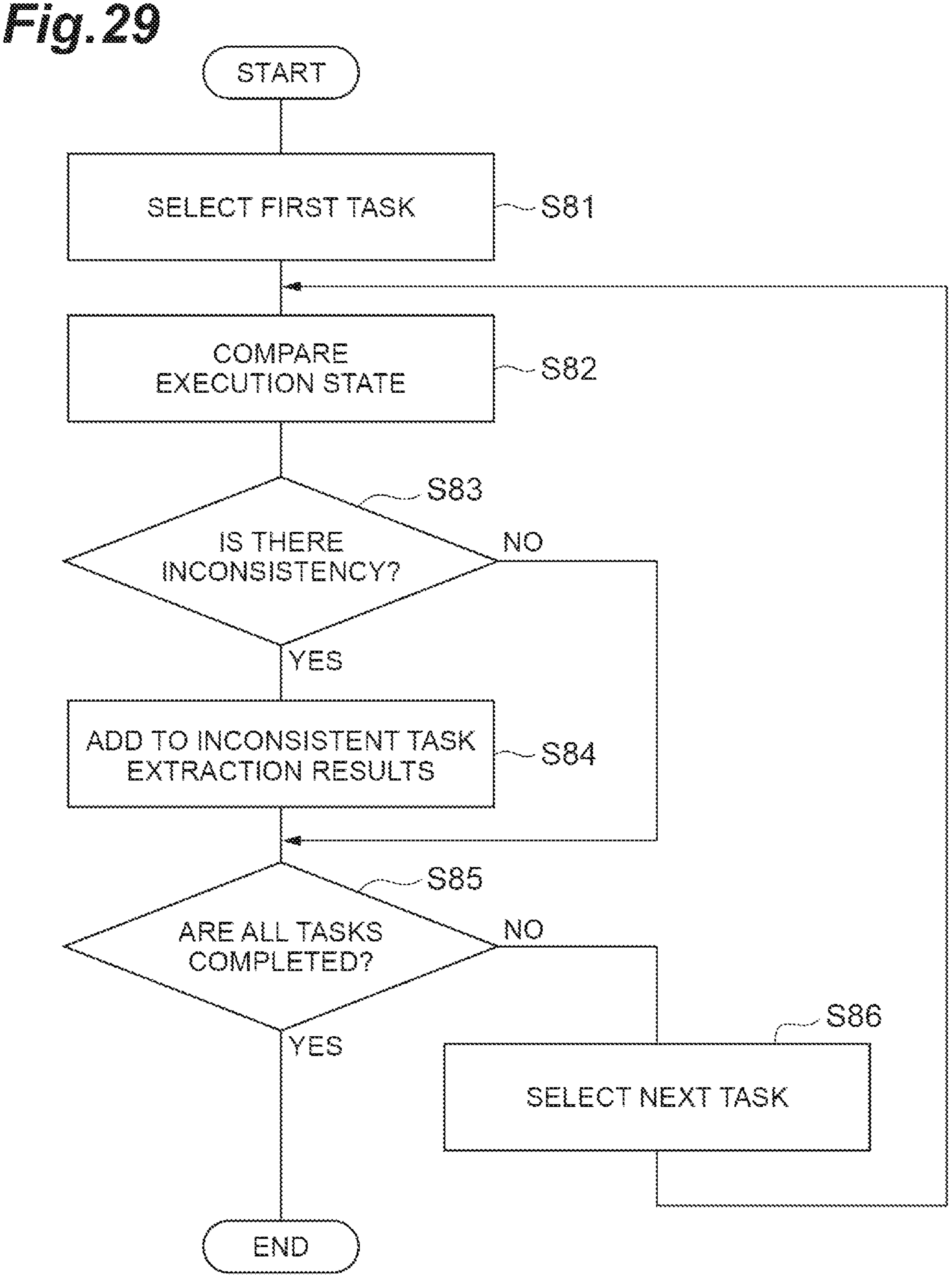
FIG. 29 is a flowchart illustrating an example procedure for extracting an inconsistent task.

FIG. 29 is a flowchart illustrating a procedure for extracting an inconsistent task. The data management device 300 first executes operations S81, S82, and S83. In operation S81, the task comparison unit 316 selects the first task in process. Hereinafter, the task selected by the task comparison unit 316 is referred to as a "comparison target task". In operation S82, the task comparison unit 316 extracts the real execution situation information of the comparison target task from the real information database 313, extracts the virtual execution situation information of the comparison target task from the virtual information database 315, and compares the extracted real execution situation information and the virtual execution situation information. In operation S83, the task comparison unit 316 checks whether there is an inconsistency between the extracted real execution situation information and the extracted virtual execution situation information.

If it is determined in operation S83 that there is an inconsistency between the extracted real execution situation information and the extracted virtual execution situation information, the data management device 300 executes operation S84. In operation S84, the task comparison unit 316 adds the comparison target task to the extraction result of the inconsistent task.

Next, the data management device 300 executes operation S85. If it is determined in operation S83 that there is no inconsistency between the extracted real execution situation information and the extracted virtual execution situation information, the data management device 300 executes operation S84 without executing operation S85. In operation S85, the task comparison unit 316 checks whether the comparison between the real execution situation information and the virtual execution situation information is completed for all tasks of the process.

If it is determined in operation S85 that the task for which the comparison between the real execution situation information and the virtual execution situation information has not been completed remains in the process, the data management device 300 executes operation S86. In operation S86, the task comparison unit 316 selects the next comparison target task from the process. Thereafter, the data management device 300 returns the processing to operation S82. Thereafter, the comparison between real execution situation information and virtual execution situation information is repeated for each task until the comparison of all tasks is completed.

If it is determined in operation S85 that the comparison between the real execution situation information and the virtual execution situation information has been completed for all tasks of the process, the detection procedure of the inconsistent task is completed.

Figure 30:
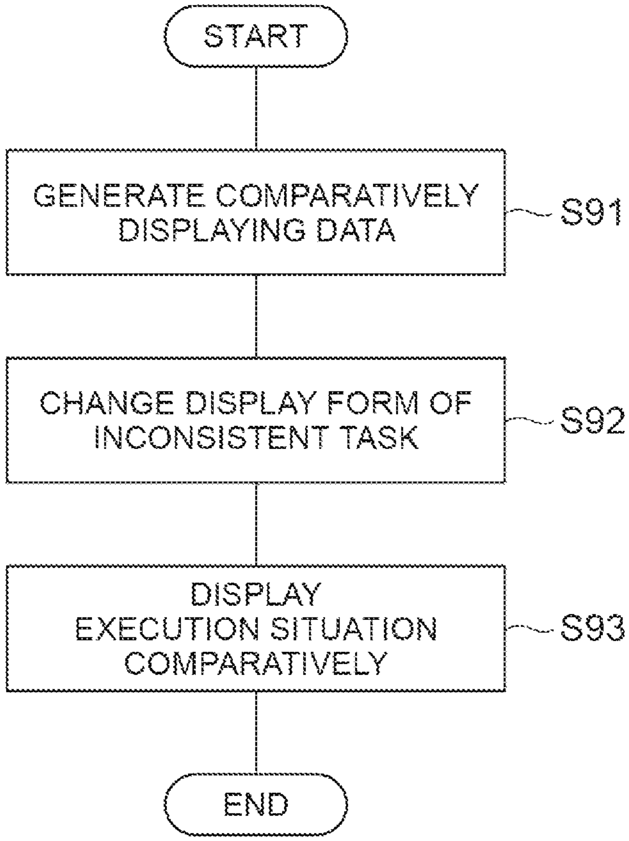
FIG. 30 is a flowchart illustrating an example comparatively displaying procedure of an execution situation.

The comparison procedure executed by the data management device 300 may further include a comparison display procedure of the execution situation illustrated in FIG. 30. The data management device 300 sequentially executes operations S91, S92, and S93. In operation S91, the situation comparatively displaying unit 317 generates a comparison display screen in which real execution situation information of each of the tasks collected by the real information collection unit 312 and virtual execution situation information of each of the tasks collected by the virtual information collection unit 314 are compared for each task. The contrast display screen includes style data defining a display form of real execution situation information and virtual execution situation information for each of a plurality of tasks.

In operation S92, the display form changing unit 318 changes the display form of one or more inconsistent tasks in the style to be different from the display form of another task. In operation S93, the situation comparatively displaying unit 317 controls the display unit to display the contrast display screen whose style has been changed by the display form changing unit 318. This completes the execution situation comparison display procedure.

Figure 31:
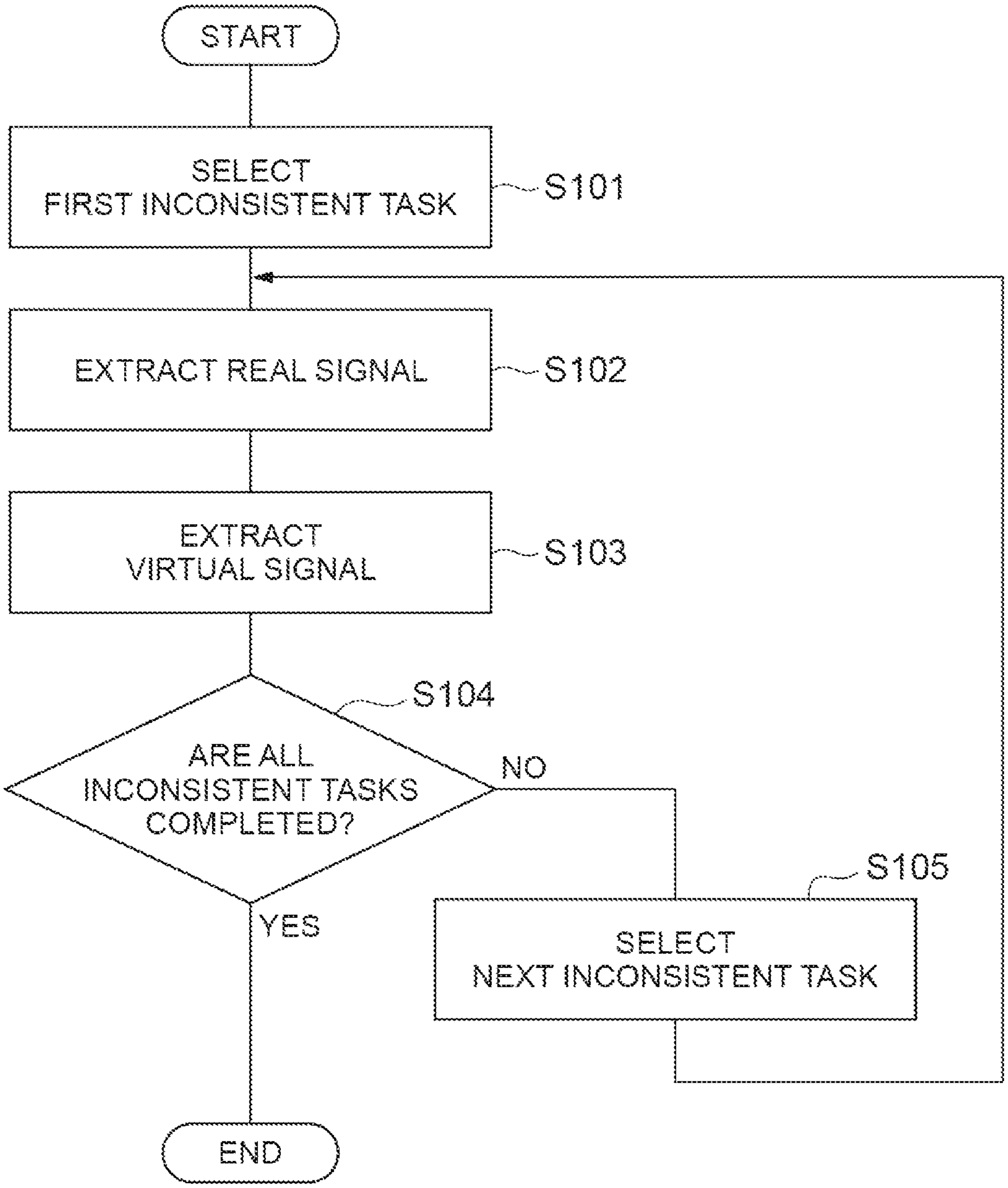
FIG. 31 is a flowchart illustrating an example procedure for extracting a control signal.

The comparison procedure may further include a control signal extraction procedure illustrated in FIG. 31. As illustrated in FIG. 31, the data management device 300 first executes operations S101, S102, S103, and S104. In operation S101, the real signal extraction unit 321 selects the first inconsistent task from the one or more inconsistent tasks extracted by the task comparison unit 316. Hereinafter, the selected inconsistent task is referred to as a "selected inconsistent task".

In operation S102, the real signal extraction unit 321 extracts the real control signal corresponding to the selected inconsistent task from the real information database 313. In operation S103, the virtual signal extraction unit 322 extracts a virtual control signal corresponding to the selected inconsistent task from the virtual information database 315. In operation S104, the real signal extraction unit 321 checks whether the extraction of the real control signal and the virtual control signal is completed for all of the one or more inconsistent tasks.

If it is determined in operation S104 that an inconsistent task remains for which the real control signal and the virtual control signal have not been extracted, the data management device 300 executes operation S105. In operation S105, the real signal extraction unit 321 selects the next inconsistent task from one or more inconsistent tasks. Thereafter, the data management device 300 returns the processing to operation S102. Thereafter, the data management device 300 repeats the extraction of the real control signal and the virtual control signal for all of the one or more inconsistent tasks until the extraction of the real control signal and the virtual control signal is completed. When it is determined that the extraction of the real control signal and the virtual control signal is completed for all of the one or more inconsistent tasks in operation S104, the extraction procedure of the control signal is completed.

Figure 32:
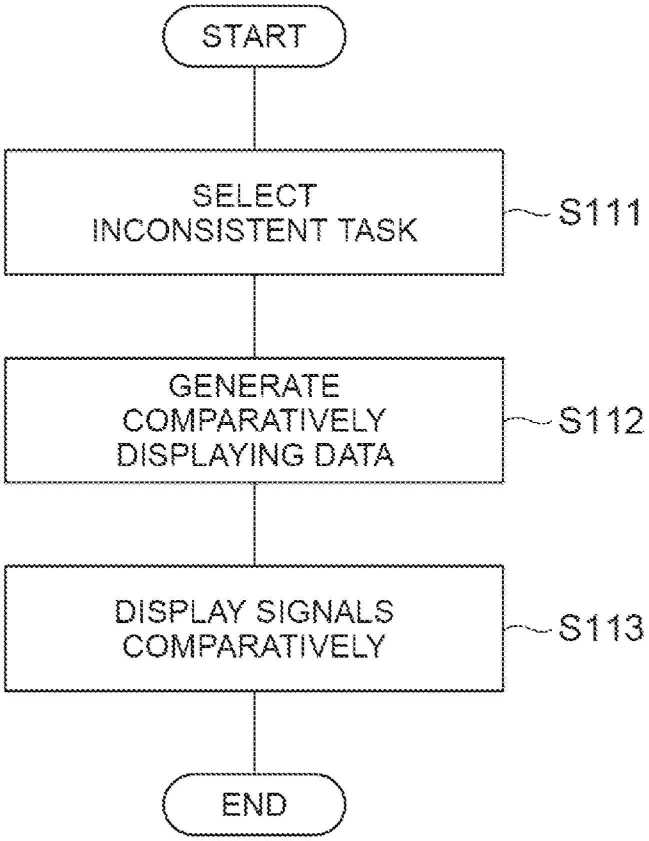
FIG. 32 is a flowchart illustrating an example comparatively displaying procedure of a control signal.

The comparison procedure may further include a control signal comparison display procedure illustrated in FIG. 32. As illustrated in FIG. 32, the data management device 300 sequentially executes operations S111, S112, and S113. In operation S111, the signal comparatively displaying unit 323 selects one of one or more inconsistent tasks based on a user input or the like to the input device 396. For example, the signal comparatively displaying unit 323 selects one of the one or more inconsistent tasks based on an input for selecting the highlighted inconsistent task in the execution situation comparison display screen. Hereinafter, the selected inconsistent task is referred to as a "display target inconsistent task".

In operation S112, the signal comparatively displaying unit 323 generates a signal contrast display screen in which the real control signal extracted by the real signal extraction unit 321 in association with the display target inconsistent task and the virtual control signal extracted by the virtual signal extraction unit 322 in association with the display target inconsistent task are displayed in contrast for each type of control signal. In operation S113, the signal comparatively displaying unit 323 displays the signal comparison display screen on the display unit. Thus, the control signal comparison display procedure is completed.

Program Generation Procedure

Figure 33:
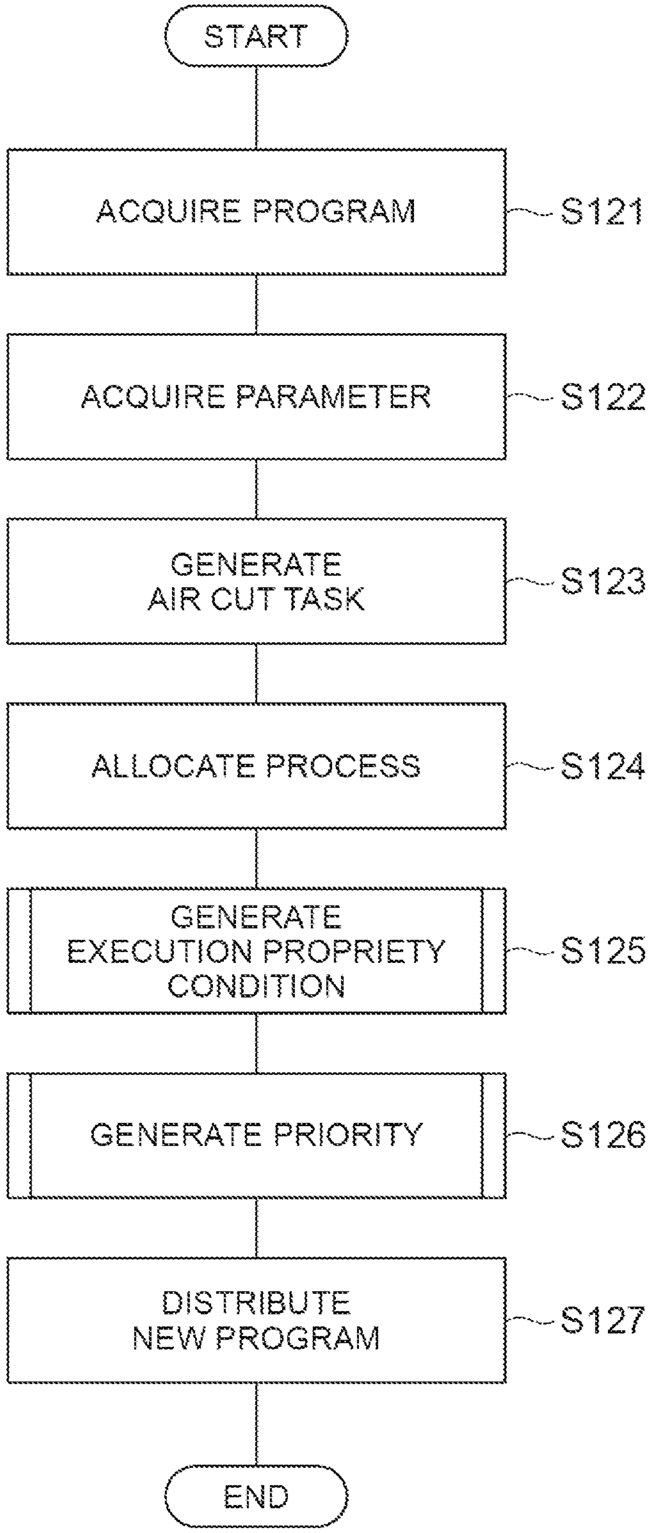
FIG. 33 is a flowchart illustrating an example program generation procedure.

As illustrated in FIG. 33, the data management device 300 sequentially executes operations S121, S122, S123, S124, S125, S126, and S127. In operation S121, the program acquisition unit 331 acquires, in each local controller 100, the task program 130 of working task registered by teaching, and stores the task program 130 in the task program storage unit 411 of virtual local controllers 400. In operation S122, the parameter acquisition unit 332 acquires one or more parameters stored by the parameter storage unit 112 in each of the local controllers 100, and stores the parameters in the parameter storage unit 412 of the virtual local controllers 400. In operation S123, the program generation unit 333 generates the one or more air cut tasks based on the working task acquired by the program acquisition unit 331 and the model information stored in the model storage unit 311, and stores the one or more air cut tasks in the task program storage unit 411.

In operation S124, the process allocation unit 513 allocates the process to the workpiece 9 specified by the production order and stores the process in the process storage unit 514. In operation S125, the data management device 300 generates an execution propriety condition. Specific contents of operation S125 will be described later. In operation S126, the data management device 300 generates priority. Example contents of operation S126 will be described later. In operation S127, the program distribution unit 335 outputs the generated program in the task program storage unit 411 to the corresponding local controller 100 and stores the program in the task program storage unit 111 of the local controllers 100. The program generation procedure is thus completed.

Figure 34:
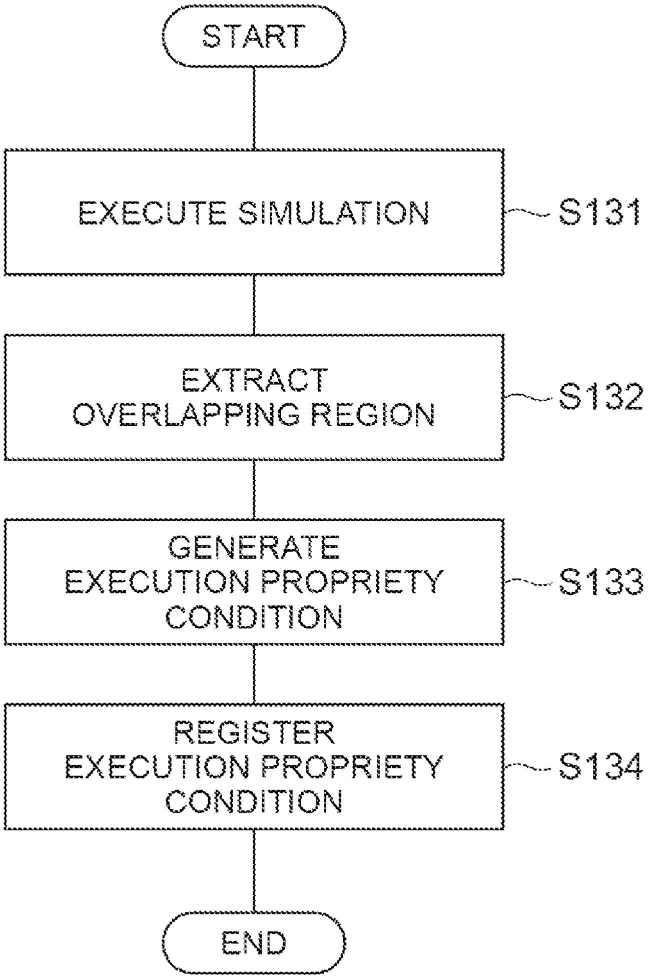
FIG. 34 is a flowchart illustrating an example procedure for generating an execution propriety condition.

FIG. 34 is a flowchart illustrating a procedure for generating an execution propriety condition in operation S125. As illustrated in FIG. 34, the data management device 300 sequentially executes operations S131, S132, S133, and S134. In operation S131, the virtual host controller 500 and the virtual local controller 400 control the virtual local devices to execute tasks in the virtual space based on the task program 130 in the task program storage unit 411.

In operation S132, the program generation unit 333 extracts an overlapping region of operation ranges of the virtual local devices based on the virtual environment information accumulated in the virtual information database 315. For example, the program generation unit 333 calculates an overlapping region between the operation region of the first virtual local device and the operation region of the second virtual local device.

In operation S133, the program generation unit 333 generates an execution propriety condition for each of the tasks such that two or more virtual local devices do not enter the overlapping region. For example, the execution propriety condition of the task of the first virtual local device is generated to include that the second virtual local device is not located in the overlapping region, and the execution propriety condition of the task of the second virtual local device is generated to include that the first virtual local device is not located in the overlapping region. In operation S134, the program generation unit 333 registers the generated execution propriety condition in the condition header 131 of the task program 130 of the corresponding task. This completes the procedure for generating the execution propriety condition.

Figure 35:
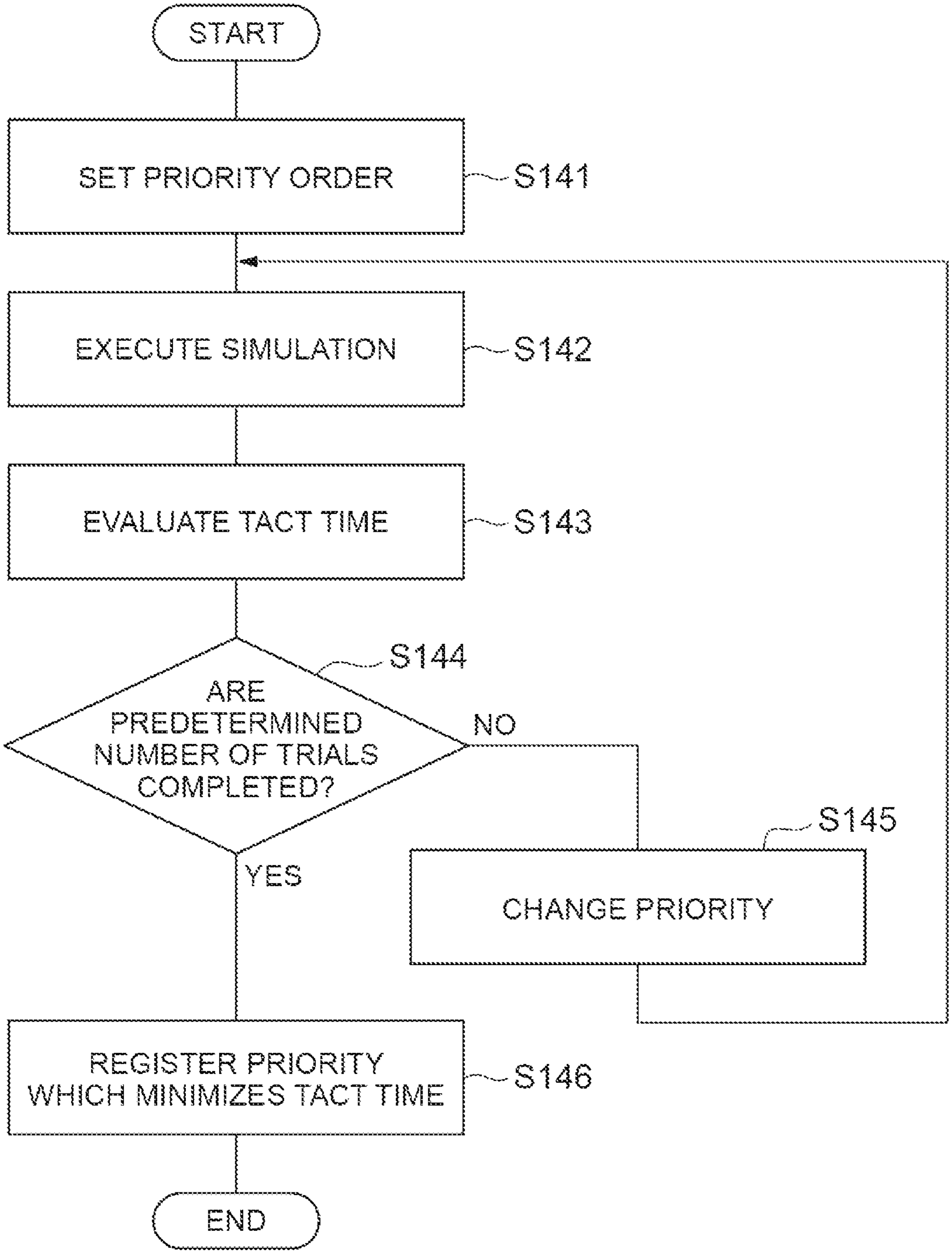
FIG. 35 is a flowchart illustrating an example priority generation procedure.

FIG. 35 is a flowchart illustrating a procedure for generating priority in operation S126. As illustrated in FIG. 35, the data management device 300 first executes operations S141, S142, S143, and S144. In operation S141, the program generation unit 333 randomly provisionally determines a priority combination that determines the priority of each of the tasks, and registers each of the provisionally determined priority combinations in the condition header 131 of the corresponding the task program 130. In operation S142, the virtual host controller 500 and virtual local controller 400 control the virtual local devices to execute tasks in the virtual space based on the task program 130 in the task program storage unit 411.

In operation S143, the program generation unit 333 evaluates execution times of a plurality of processes based on the virtual execution situation information accumulated in the virtual information database 315. In operation S144, the priority is changed, and the program generation unit 333 checks whether the number of trials to evaluate the execution times of a plurality of processes has reached a predetermined number.

If it is determined in operation S144 that the number of trials has not reached the predetermined number, the data management device 300 executes operation S145. In operation S145, the program generation unit 333 randomly changes the priority combination, and registers each of the changed priority combinations in the condition header 131 of the corresponding the task program 130. Thereafter, the local controllers 100 return the processing to operation S142. Thereafter, the change of the priority combination and the evaluation of the execution times of a plurality of processes are repeated until the number of trials reaches a predetermined number.

If it is determined in operation S144 that the number of trials has reached the predetermined number, the data management device 300 executes operation S146. In operation S146, the program generation unit 333 adopts the priority combination in which the execution time of the plurality of processes is the shortest in the trial, and registers each of the adopted priority combinations in the condition header 131 of the corresponding the task program 130. Thus, the priority generation procedure is completed.

Adjustment Procedure

Figure 36:
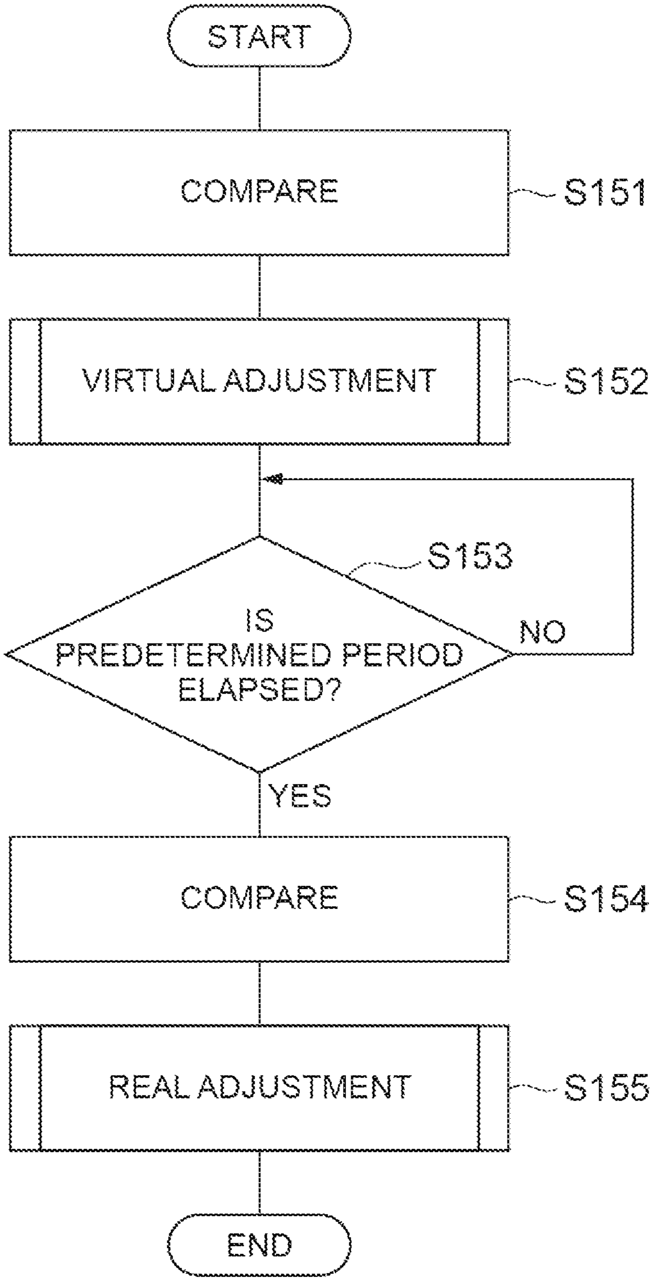
FIG. 36 is a flowchart illustrating an example adjustment procedure.

As illustrated in FIG. 36, the data management device 300 sequentially executes operations S151, S152, S153, S154, and S155. In operation S151, the data management device 300 performs the comparison procedure described above. In operation S152, the data management device 300 adjusts parameters of models of a plurality of virtual local devices based on at least one of the real control signal and the virtual control signal extracted in the comparison procedure of operation S151. The specific processing contents of operation S152 will be described later. In operation S153, the data management device 300 waits for the elapse of a predetermined period. In operation S154, the data management device 300 performs the above comparison procedure.

In operation S155, the data management device 300 adjusts the control parameters (parameters in the parameter storage unit 112) of the plurality of local controllers 100 based on at least one of the real control signal and the virtual control signal extracted in the comparison procedure of operation S154. Example contents of operation S155 will be described later. This completes the adjustment procedure.

Figure 37:
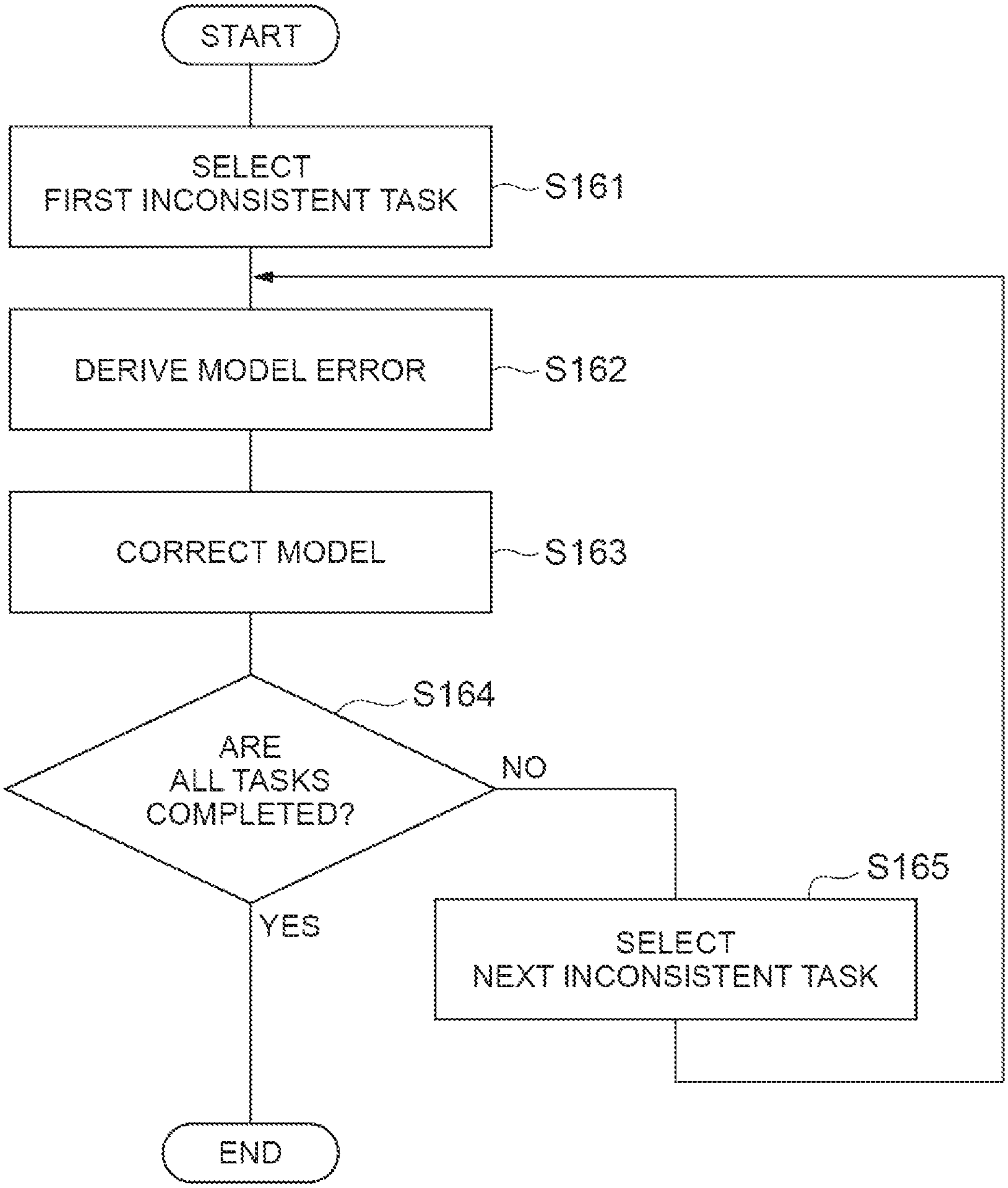
FIG. 37 is a flowchart illustrating an example adjustment procedure of model parameters.

FIG. 37 is a flowchart illustrating the procedure of adjusting the parameters of the model in operation S152. As illustrated in FIG. 37, the data management device 300 first executes operations S161, S162, S163, and S164. In operation S161, the virtual adjustment unit 341 selects the first inconsistent task from the one or more inconsistent tasks extracted by the task comparison unit 316. Hereinafter, the selected inconsistent task is referred to as a "virtual adjustment inconsistent task".

In operation S162, the virtual adjustment unit 341 derives the modeling error of the virtual local device, which is the cause of the discrepancy between the real execution situation information and the virtual execution situation information, based on the real control signal and the virtual control signal corresponding to the virtual adjustment inconsistent task.

In operation S163, the virtual adjustment unit 341 corrects the parameters of the model stored in the model storage unit 311 based on the modeling error derived in operation S162. In operation S164, the virtual adjustment unit 341 checks whether the adjustment of the parameters of the model is completed for all of the one or more inconsistent tasks.

If it is determined in operation S164 that an inconsistent task remains for which the adjustment of the parameters of the model has not been completed, the data management device 300 executes operation S165. In operation S165, the virtual adjustment unit 341 selects the next inconsistent task from one or more inconsistent tasks. Thereafter, the data management device 300 returns the processing to operation S161. Thereafter, the data management device 300 repeats the adjustment of the parameters of the model until the adjustment of the model is completed for all of one or more inconsistent tasks. If it is determined in operation S164 that the adjustment of the parameters of the model has been completed for all of the one or more inconsistent tasks, the adjustment procedure of the parameters of the model is completed.

Figure 38:
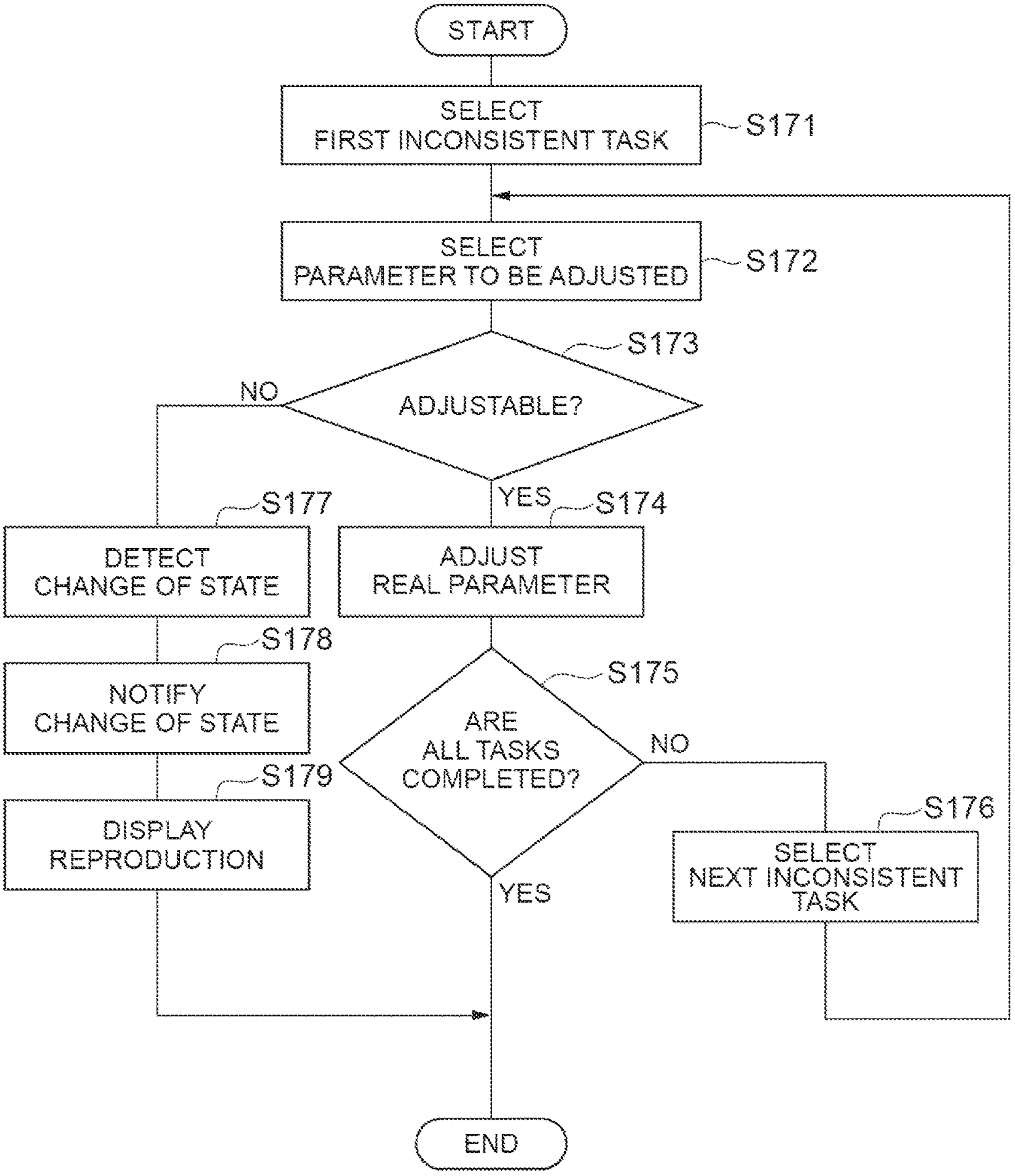
FIG. 38 is a flowchart illustrating an example adjustment procedure of control parameters.

FIG. 38 is a flowchart illustrating the adjustment procedure of the control parameter in operation S153. The data management device 300 first executes operations S171, S172, and S173. In operation S171, the real adjustment unit 342 selects the first inconsistent task from the one or more inconsistent tasks extracted by the task comparison unit 316. Hereinafter, the selected inconsistent task is referred to as a "real adjustment inconsistent task".

In operation S172, the real adjustment unit 342 selects a control parameter capable of reducing the inconsistency between the real execution situation information and the virtual execution situation information based on the real control signal and the virtual control signal corresponding to the real adjustment inconsistent task. Hereinafter, the selected control parameter is referred to as a "selected control parameter". In operation S173, the real adjustment unit 342 checks whether the difference between the real control signal corresponding to the inconsistent task and the virtual control signal can be suppressed to a desired level by the selected control parameter.

If it is determined in operation S173 that the difference between the real control signal corresponding to the inconsistent task and the virtual control signal can be suppressed to the desired level by the selected control parameter, the data management device 300 executes operations S174 and S175. In operation S174, the real adjustment unit 342 changes the selected control parameter so as to suppress the difference between the real control signal corresponding to the inconsistent task and the virtual control signal to the desired level, and registers the change result in the parameter storage unit 112 of the corresponding local controllers 100. In operation S175, the real adjustment unit 342 checks whether the adjustment of the control parameter is completed for all of the one or more inconsistent tasks.

If it is determined in operation S175 that there remains an inconsistent task for which the adjustment of the control parameter has not been completed, the data management device 300 executes operation S176. In operation S176, the real adjustment unit 342 selects the next inconsistent task from one or more inconsistent tasks. Thereafter, the data management device 300 returns the processing to operation S171. Thereafter, for all of the one or more inconsistent tasks, the data management device 300 repeats the adjustment of the control parameter until the adjustment of the control parameter is completed.

If it is determined in operation S175 that the adjustment of the control parameter is completed for all of the one or more inconsistent tasks, the adjustment procedure of the control parameter is completed. If it is determined in operation S173 that the difference between the real control signal corresponding to the inconsistent task and the virtual control signal cannot be suppressed to the desired level by the selected control parameter, the data management device 300 executes operations S177, S178, and S179.

In operation S177, the state change detection unit 343 detects a state change of at least one of the virtual local device 2 and the device with which the virtual local device 2 cooperates based on the real control signal corresponding to the inconsistent task and the virtual control signal. In operation S178, the state change detection unit 343 controls the display unit to display that the state change is detected.

In operation S179, the reproduction unit 344 controls the subordinate virtual robots to reproduce the operation of the subordinate local device 2 that executes the change occurrence task based on the real control signal corresponding to the task (the change occurrence task) in which the state change detection unit 343 detects the state change. For example, the reproduction unit 344 generates a reproduction moving image of the operation of the local device 2 that executes the change occurrence task based on the model of the virtual local device stored in the model storage unit 311 and the real control signal corresponding to the change occurrence task, and displays the reproduction moving image on the display unit or the like. Thereafter, the data management device 300 stops the adjustment procedure of the control parameter.

Figure 39:
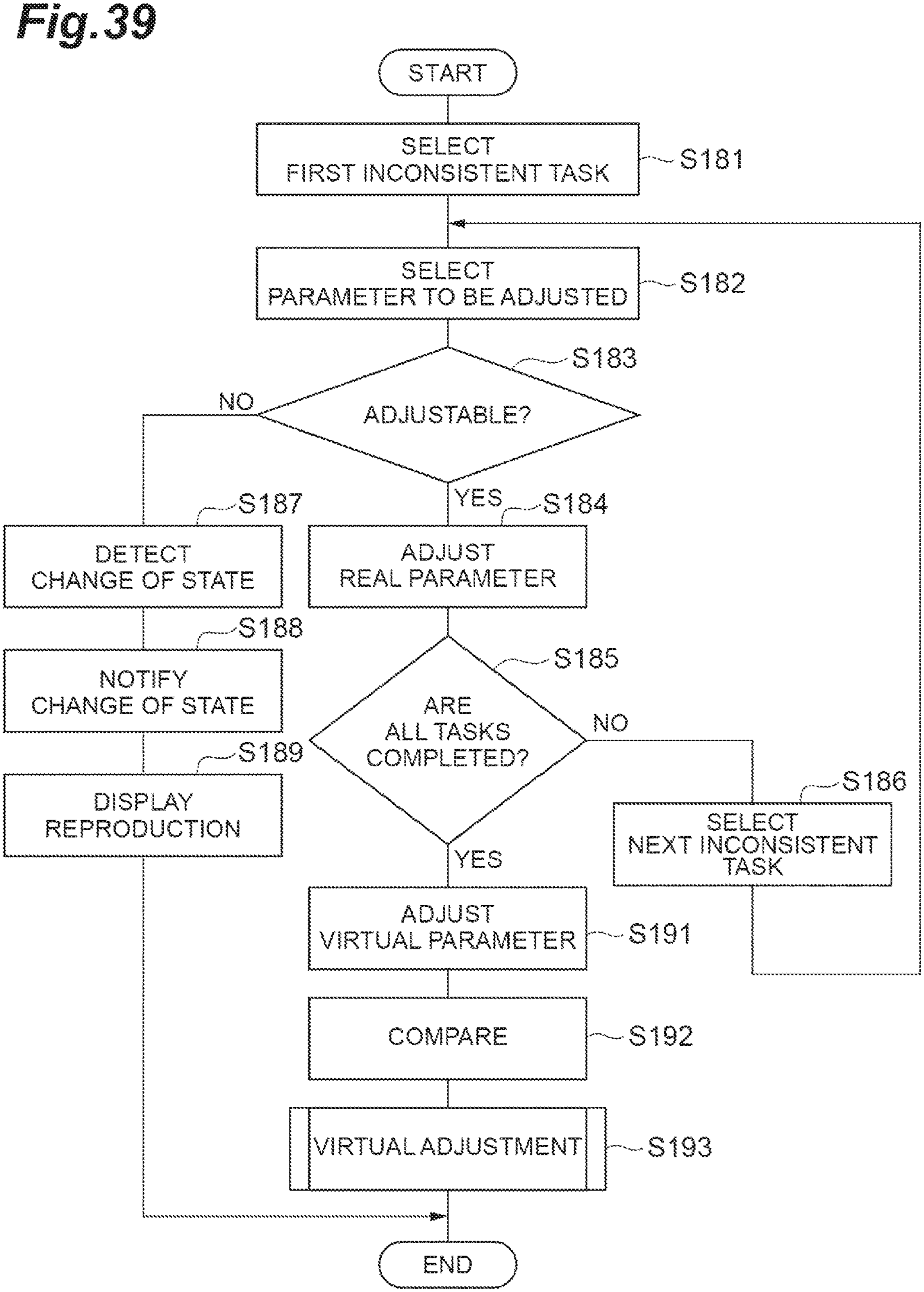
FIG. 39 is a flowchart illustrating a modified example of the adjustment procedure of the control parameters.

FIG. 39 is a flowchart illustrating a modified example of the control parameter adjustment procedure. In this flowchart, operations S181 to S189 are the same as operations S171 to S179. The adjustment procedure of FIG. 39 further includes operations S191 to S193 after operation S185 in which the adjustment of the control parameter is completed. In this adjustment procedure, the data management device 300 sequentially executes operations S191, S192, and S193. In operation S191, the parameter acquisition unit 332 acquires the changed control parameter from the parameter storage unit 112 and registers it in the parameter storage unit 412. In operation S192, the data management device 300 performs the comparison procedure described above. In operation S193, the data management device 300 executes an adjustment procedure similar to that in operation S152. By the added operations S191 to S193, the change of the local device 2 is reflected in the parameter of the model of the corresponding virtual local device.

Figure 40:
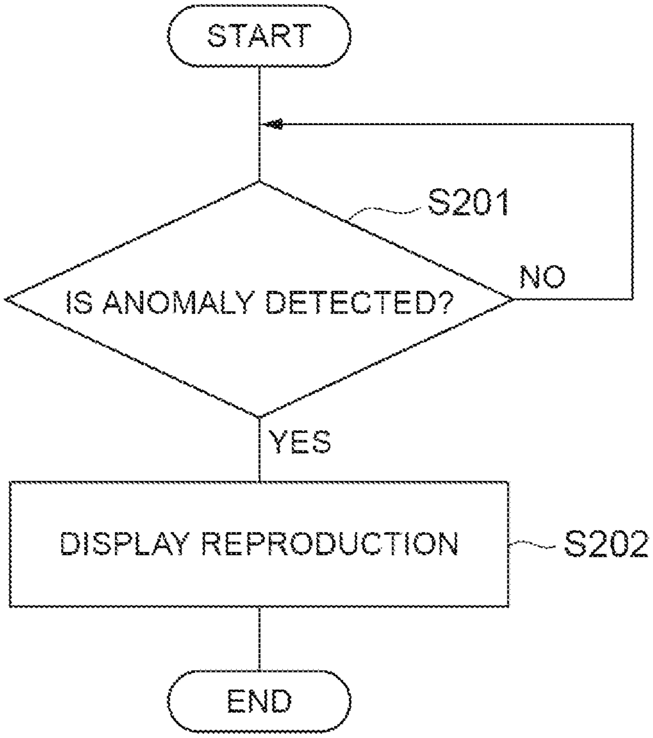
FIG. 40 is a flowchart illustrating an example reproduction display procedure.

The data management procedure executed by the data management device 300 may further include a reproduction display procedure at the time of anomaly detection in addition to the reproduction display procedure at the time of state change detection. FIG. 40 is a flowchart illustrating the reproduction display procedure. As illustrated in FIG. 40, the data management device 300 sequentially executes operations S201 and S202. In operation S201, the reproduction unit 344 waits for the anomaly detection unit 345 to detect an anomaly of at least one of the subordinate local device and the device with which the subordinate local device 2 cooperate, based on an alarm signal or the like generated by the host controller 200. In operation S202, the reproduction unit 344 controls the subordinate virtual local device to reproduce the operation of the subordinate local device 2 at least one of before and after the point in time when the anomaly occurred, based on the real control signal. Thus, the reproduction display procedure is completed.

Environment information Update Procedure

Figure 41:
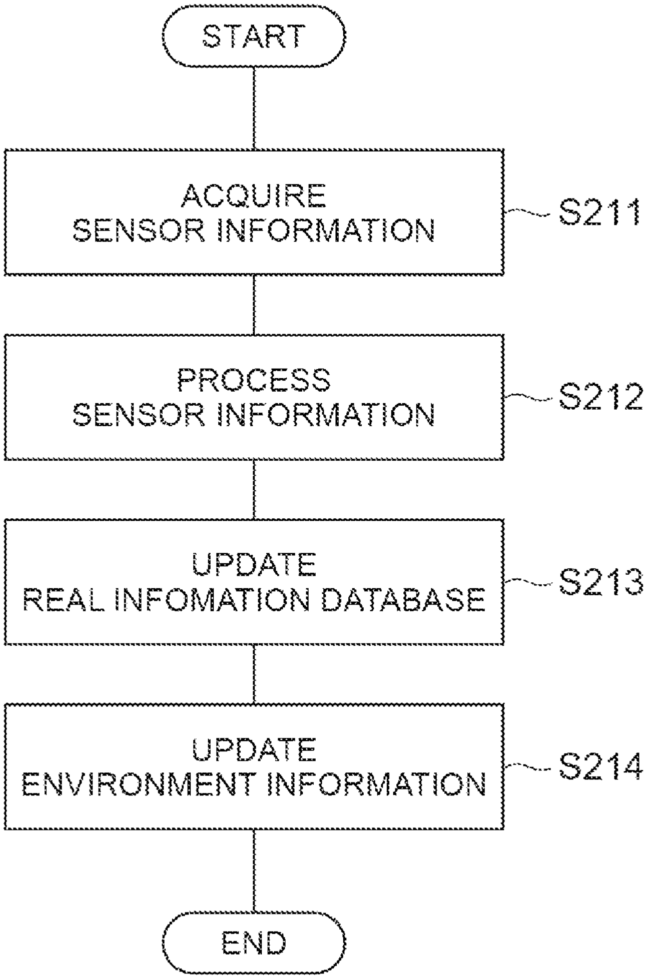
FIG. 41 is a flowchart illustrating an example environment information update procedure.

As illustrated in FIG. 41, the data management device 300 sequentially executes operations S211, S212, S213, and S214. In operation S211, the sensor information processing unit 351 acquires the sensor information detected by the external sensor 5. In operation S212, the sensor information processing unit 351 performs predetermined processing on the sensor information acquired from the external sensor 5. In operation S213, the information update unit 352 updates the latest environment information in the real information database 313 based on the processing result of the sensor information processing unit 351. In operation S214, the real information collection unit 312 updates the environment information of the environment information storage unit 221 of the host controller 200 in accordance with the update result of the latest environment information. This completes the environment information update procedure.

As described above, the production system 1 includes: the command output unit 215 configured to output an execution command of the next task based on a process including a plurality of tasks for the workpiece 9 and progress information of the process; the environment information storage unit 221 configured to store environment information; the local controller 100 (robot controller) configured to control the robots 2B, 2C, and 10 to execute the next task based on the execution command output from the command output unit 215 and environment information in the environment information storage unit 221; and the environment update unit 222 configured to update environment information in the environment information storage unit 221 in accordance with the operation of robots 2B, 2C, and 10.

With the production system 1, by providing environment information to the local controllers 100 in addition to the execution command of the next task, autonomous task execution by the robots 2B, 2C, and 10 based on the environment information may be readily implemented. Thus, autonomous execution of each task by the robots 2B, 2C, and 10 can be readily realized. Therefore, a plurality of tasks may be readily performed by outputting the execution command of the next task based on the progress of the plurality of tasks and updating the environment information according to the operation of the robots 2B, 2C, and 10. Therefore, the plurality of tasks to be executed by the robots 2B, 2C, and 10 can be readily rearranged in accordance with changes in the production plan of the workpiece 9 or changes in the production environment. Therefore, the flexibility of the production system may be improved.

The production system 1 may further include the progress update unit 216 configured to update the progress information in accordance with the execution situation of the next task by the robots 2B, 2C, and 10. Progress management can be continued by updating progress information in accordance with the execution situation of the next task.

The production system 1 may further include: the order acquisition unit 212 configured to acquires a production order of the workpiece 9 from a host production management system; and the process allocation unit 213 configured to allocate a process to the workpiece 9 specified by the production order. The command output unit 215 may be configured to output an execution command of the next task based on the process allocated by the process allocation unit 213 to the workpiece 9 specified by the production order and progress information of the process. The allocation of the process to the workpiece 9 is performed by the process allocation unit 213, the execution command of the next task based on the progress of the process is output by the command output unit 215, and the next task is sequentially executed by the robots 2B, 2C, and 10 based on the execution command and the environment information. Therefore, in the production management system, production may be readily managed by allocating production orders to the production system 1.

The local controllers 100 may include: the task program storage unit 111 (condition storage unit) configured to store one or more execution conditions predetermined for each of one or more tasks among the plurality of tasks, and the control unit 116 configured to control the robots 2B, 2C, and 10 to execute the next task based on the execution condition in the next task in the task program storage unit 111 and the environment information in the environment information storage unit 221. The execution condition referred to in combination with the environment information is determined in advance, so that the autonomous operation by the robots 2B, 2C, and 10 can be adjusted in accordance with the progress management.

The process allocation unit 213 may be configured to allocate, when the order acquisition unit 212 acquires a production order of a plurality of the workpiece 9, a plurality of processes to the plurality of workpieces, respectively, and each of the processes includes a plurality of tasks. The command output unit 215 may be configured to output an execution command of a plurality of next tasks for each of the plurality of processes based on the plurality of progress information of each of the processes. The local controller 100 may further include: the command buffer 113 configured to store the execution command of the next tasks; and the selection unit 115 configured to select one of the plurality of next tasks in the command buffer 113 based on the execution condition of each of the plurality of next tasks in the task program storage unit 111 and the environment information in the environment information storage unit 221. The control unit 116 may be configured to control the robots 2B, 2C, 10 to execute the next task selected by the selection unit 115. The progress management of the task for the plurality of the workpiece 9 is further simplified by also leaving the selection of the task for the plurality of the workpiece 9 to the local controller 100. Therefore, the flexibility of the production system may further be improved.

Each of the one or more execution conditions may include the priority of the corresponding task, and the selection unit 115 may select the next task having the highest priority when two or more next tasks among the plurality of next tasks in the command buffer 113 are executable. Both flexibility and efficiency can be achieved.

The plurality of tasks may include machine tasks executed by an industrial machine other than the robots 2B, 2C, and 10. The environment information may include a waiting time corresponding to a completion time of the machine task. The local controllers 100 may further include the selection timing adjustment unit 121 configured to adjust, when the plurality of next tasks in the command buffer 113 include a first task that becomes executable when the machine task is completed and a second task that is already executable, a selection timing of the next task by the selection unit based on priorities of the first task and the second task and a waiting time. Both flexibility and efficiency can be achieved.

When the priority of the first task is higher than the priority of the second task and the waiting time is equal to or less than a predetermined threshold value, the selection timing adjustment unit 121 may be configured to set the selection timing of the next task by the selection unit to be after the elapse of the waiting time. Both flexibility and efficiency can be achieved.

The local controllers 100 may further include the interruption unit 122 configured to, when the plurality of next tasks in the command buffer 113 include a first task and a second task having a lower priority than the first task and the first task becomes executable during execution of the second task by the robots 2B, 2C, and 10, control the control unit 116 to interrupt the second task and configured to control the selection unit to select the first task. Both flexibility and efficiency can be achieved.

The interruption unit 122 may be configured to control the control unit 116 to return the robots to the state before the start of the second task and then to control the selection unit 115 to select the first task. Even if it is difficult to release the second workpiece during execution of the second task, the first task may readily be prioritized by interrupting the second task.

The first task may include conveying a first workpiece 9A and the second task may include conveying a second workpiece 9B. The interruption unit 122 may be configured to, when the first task becomes executable during execution of the second task by the robots 2B, 2C, and 10, control the control unit 116 to return the robots 2B, 2C, and 10 to a state before starting conveyance of the second workpiece 9B, and then to control the selection unit 115 to select the first task. Even if it is difficult to release the second workpiece 9B while the second task is being executed, the first task may readily be prioritized by interrupting the second task.

The interruption unit 122 may be configured not control the control unit 116 to interrupt the second task in a case where the execution time of a plurality of processes is shorter when controlling the selection unit 115 to select the first task after completion of the second task than when controlling the control unit 116 to interrupt execution of the second task and controlling the selection unit 115 to select the first task. Both flexibility and efficiency can be achieved.

The production system 1 may further include an execution condition generation unit (the program generation unit 333) configured to generate at least a part of one or more execution conditions based on an operation in the virtual space of the virtual robots corresponding to the robots 2B, 2C, and 10. An execution condition can readily be generated.

The program generation unit 333 may be configured to change at least a part of one or more execution conditions so as to shorten the execution time of a plurality of processes in the virtual space when the virtual robots operate based on the one or more execution conditions. An execution condition can readily be generated.

The production system 1 may further include: the command output unit 515 (virtual command output unit) configured to output an execution command of the next task based on the process and the progress information of the process in the virtual space; the environment information storage unit 521 (virtual environment information storage unit) configured to store the virtual environment information; the virtual local controller 400 (virtual robot controllers) configured to control the virtual robots to execute the next task in the virtual space based on the execution command output from the command output unit 515 and the virtual environment information in the environment information storage unit 521; and the environment update unit 522 configured to update the virtual environment information in the environment information storage unit 521 in accordance with the operation of the virtual robots. An execution condition can readily be generated by operating the virtual robots in the virtual space under a condition closer to the real space.

The plurality of tasks may include a first robot task executed by the robot 2B and a second robot task executed by the second robot 2C, and the program generation unit 333 may be configured to generate an execution condition of the first robot task and an execution condition of the second robot task so as to avoid collision in the virtual space between the virtual robot and a second virtual robot corresponding to the second robot. An execution condition for collision avoidance may readily be generated.

The program generation unit 333 may be configured to derive an overlapping region between an operation region of a virtual robot executing the first robot task and an operation region of a second virtual robot executing the second robot task, generate an execution condition of the first robot task to include that the second virtual robot is not located in the overlapping region, and generate an execution condition of the second robot task to include that the virtual robot is not located in the overlapping region. An execution condition for collision avoidance may readily be generated.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A production system, comprising:

a plurality of local controllers configured to control a plurality of devices that perform a plurality of tasks for a plurality of workpieces, the plurality of devices including a robot, the plurality of local controllers including a robot controller configured to control the robot; and circuitry of a host controller communicable with the plurality of local controllers, the circuitry configured to:

allocate, in response to acquiring production orders of the plurality of workpieces, the plurality of tasks to the plurality of workpieces;

store progress information of the plurality of tasks;

store, on a remote storage device, environment information of the plurality of workpieces and the plurality of devices;

receive status information from the plurality of local controllers;

update the stored progress information based at least in part on the status information received from the plurality of local controllers;

update the stored environment information based at least in part on the status information received from the plurality of local controllers; and output execution commands of next tasks to one or more of the plurality of local controllers based on the progress information, wherein the robot controller is configured to:

store execution conditions predetermined for robot tasks;

receive two or more execution commands that are output to the robot controller from the circuitry, the two or more execution commands of two or more of the robot tasks including a first task and a second task having a lower priority than a priority of the first task;

store the two or more received execution commands;

monitor the remote storage device to detect a change in the stored environment information caused by an operation executed by one device of the plurality of devices, other than the robot, that is controlled by another local controller of the plurality of local controllers;

control the robot to execute the first task in response to determining that the changed environment information satisfies both an execution condition of the first task and an execution condition of the second task;

control the robot to execute the second task in response to determining that the changed environment information satisfies the execution condition of the second task and does not satisfy the execution condition of the first task;

control the robot to suspend the second task in response to determining that the changed environment information satisfies the execution condition of the first task during execution of the second task; and control the robot to execute the first task after completion of the second task without suspending the second task in response to determining that an execution time of the plurality of tasks becomes shorter if the first task is executed after completion of the second task.

2. The production system according to claim 1, wherein the circuitry is further configured to:

acquire the production orders of the plurality of workpieces from a host production management system; and output the execution commands of the next tasks to one or more of the plurality of local controllers based on the allocated plurality of tasks and the progress information.

3. The production system according to claim 1, wherein the plurality of devices comprise an industrial machine other than the robot, wherein the plurality of tasks include a machine task executed by the industrial machine, wherein the environment information includes a waiting time corresponding to a completion time of the machine task, and wherein the robot controller is configured to:

store the execution conditions including a first condition for the first task that requires a completion of the machine task and a second condition for the second task that does not require the completion of the machine task;

control the robot to wait for the completion of the machine task without executing the second task in response to determining that the changed environment information satisfies the second condition but the waiting time is shorter than a predetermined threshold; and control the robot to execute the second task in response to determining that the changed environment information satisfies the second condition and the waiting time is longer than the threshold.

4. The production system according to claim 1, wherein the robot controller is configured to return the robot to a start position of the second task after suspending the second task before an execution of the first task.

5. The production system according to claim 1, wherein the first task includes a conveyance of a first workpiece, wherein the second task includes a conveyance of a second workpiece, and wherein the robot controller is configured to return the robot to a start position of the conveyance of the second workpiece after suspending the conveyance of the second workpiece before an execution of the conveyance of the first workpiece.

6. The production system according to claim 1, wherein the circuitry is configured to generate at least a part of the execution conditions based on an operation in a virtual space of a virtual robot corresponding to the robot.

7. The production system according to claim 6, wherein the circuitry is configured to change at least a part of the execution conditions so as to shorten an execution time of the plurality of tasks in the virtual space.

8. The production system according to claim 6, wherein the circuitry is configured to:

store virtual progress information of the plurality of tasks in the virtual space;

store virtual environment information;

output virtual execution commands of the next tasks based on the stored virtual progress information;

update the stored virtual environment information in accordance with operations in the virtual space of a plurality of virtual devices corresponding to the plurality of devices;

update the virtual progress information in accordance with progress of the next tasks in the virtual space;

store virtual execution conditions corresponding to the execution conditions;

receive a virtual execution command that is output to a virtual robot controller corresponding to the robot controller, wherein the virtual robot controller is configured to control the virtual robot corresponding to the robot;

monitor the stored virtual environment information to detect a change in the stored virtual environment information caused by an operation executed by one virtual device of the plurality of virtual devices, other than the virtual robot; and control the virtual robot to virtually execute one robot task of the robot tasks corresponding to the received virtual execution command in response to determining that the stored virtual environment information satisfies one of the virtual execution conditions corresponding to the one robot task in the virtual space.

9. A production system, comprising:

a plurality of local controllers configured to control a plurality of devices that perform a plurality of tasks for one or more workpieces, the plurality of devices including a robot, the plurality of local controllers including a robot controller configured to control the robot; and circuitry of a host controller communicable with the plurality of local controllers, the circuitry configured to:

store progress information of the plurality of tasks;

store environment information of the one or more workpieces and the plurality of devices;

receive status information from the plurality of local controllers;

update the stored progress information for performing the plurality of tasks based at least in part on the status information received from the plurality of local controllers;

update the stored environment information based at least in part on the status information received from the plurality of local controllers; and output an execution command of a next task to one local controller of the plurality of local controllers based on the progress information, wherein the robot controller is configured to:

store execution conditions predetermined for robot tasks including a first task and a second task having a lower priority than a priority of the first task;

store two or more received execution commands of two or more of the robot tasks including the first task and the second task;

monitor the stored environment information stored by the circuitry;

control the robot to execute the first task in response to determining that the stored environment information satisfies both an execution condition of the first task and an execution condition of the second task;

control the robot to execute the second task in response to determining that the stored environment information satisfies the execution condition of the second task and does not satisfy the execution condition of the first task;

control the robot to suspend the second task in response to determining that the stored environment information satisfies the execution condition of the first task during execution of the second task; and control the robot to execute the first task after completion of the second task without suspending the second task in response to determining that an execution time of the plurality of tasks becomes shorter if the first task is executed after completion of the second task.

10. The production system according to claim 9, wherein the robot controller is configured to return the robot to a start position of the second task after suspending the second task before an execution of the first task.

11. The production system according to claim 9, wherein the first task includes a conveyance of a first workpiece, wherein the second task includes a conveyance of a second workpiece, and wherein the robot controller is configured to return the robot to a start position of the conveyance of the second workpiece after suspending the conveyance of the second workpiece before an execution of the conveyance of the first workpiece.

12. The production system according to claim 9, wherein the circuitry is configured to generate at least a part of the execution conditions based on an operation in a virtual space of a virtual robot corresponding to the robot.

13. The production system according to claim 12, wherein the circuitry is configured to change at least a part of the execution conditions so as to shorten an execution time of the plurality of tasks in the virtual space.

14. The production system according to claim 12, wherein the circuitry is configured to:

store virtual progress information of the plurality of tasks in the virtual space;

store virtual environment information;

output a virtual execution command of the next task based on the stored virtual progress information;

update the stored virtual environment information in accordance with operations in the virtual space of a plurality of virtual devices corresponding to the plurality of devices;

update the virtual progress information in accordance with progress of the next task in the virtual space;

store virtual execution conditions corresponding to the execution conditions;

receive the virtual execution command that is output to a virtual robot controller corresponding to the robot controller, wherein the virtual robot controller is configured to control the virtual robot corresponding to the robot;

monitor the stored virtual environment information to detect a change in the stored virtual environment information caused by an operation executed by one virtual device of the plurality of virtual devices, other than the virtual robot; and control the virtual robot to virtually execute one robot task of the robot tasks corresponding to the received virtual execution command in response to determining that the changed virtual environment information satisfies one of the virtual execution conditions corresponding to the one robot task in the virtual space.

15. The production system according to claim 12, wherein the plurality of devices include a second robot, wherein the plurality of tasks include a first robot task executed by the robot and a second robot task executed by the second robot, and wherein the circuitry is configured to generate an execution condition of the first robot task and an execution condition of the second robot task so as to avoid collision in the virtual space between the virtual robot and a second virtual robot corresponding to the second robot.

16. The production system according to claim 15, wherein the circuitry is configured to:

derive an overlapping region of an operation region of the virtual robot executing the first robot task and an operation region of the second virtual robot executing the second robot task;

generate the execution condition of the first robot task to require that the second virtual robot is not located in the overlapping region; and generate the execution condition of the second robot task to require that the virtual robot is not located in the overlapping region.

17. The production system according to claim 9, wherein the robot controller is further configured to:

generate the status information that includes information of position and posture of the robot;

add, into the generated status information, a notification of completion of the next task in response to the completion of the next task by the robot; and output the generated status information, and wherein the circuitry is configured to:

update the progress information based at least in part on the notification of completion of the next task; and update the environment information based at least in part on the position and posture of the robot.

18. The production system according to claim 9, wherein the plurality of devices comprise an industrial machine other than the robot, wherein the plurality of tasks include a machine task executed by the industrial machine, wherein the environment information includes a waiting time corresponding to a completion time of the machine task, and wherein the robot controller is configured to:

store the execution conditions including a first condition for the first task that requires a completion of the machine task and a second condition for the second task that does not require the completion of the machine task;

store two or more received execution commands of the two or more robot tasks;

control the robot to wait for the completion of the machine task without executing the second task in response to determining that the stored environment information satisfies the second condition but the waiting time is shorter than a predetermined threshold; and control the robot to execute the second task in response to determining that the stored environment information satisfies the second condition and the waiting time is longer than the threshold.

19. The production system according to claim 9, wherein the circuitry is further configured to:

acquire a production order of the one or more workpieces from a host production management system;

allocate the plurality of tasks to the one or more workpieces based on the production order; and output the execution command of the next task to one or more of the plurality of local controllers based on the allocated plurality of tasks and the progress information.

20. A control method for controlling, with a host controller and a plurality of local controllers, a plurality of devices that perform a plurality of tasks for one or more workpieces, the plurality of devices including a robot, the plurality of local controllers including a robot controller configured to control the robot, the method comprising:

storing, by the host controller, progress information of the plurality of tasks;

storing, by the host controller, environment information of the one or more workpieces and the plurality of devices;

receiving, at the host controller, status information from the plurality of local controllers;

updating, by the host controller, the stored progress information for performing the plurality of tasks based at least in part on the status information received from the plurality of local controllers;

updating, by the host controller, the stored environment information based at least in part on the status information received from the plurality of local controllers; and outputting, by the host controller, an execution command of a next task to one local controller of the plurality of local controllers based on the progress information;

storing, by the robot controller, execution conditions predetermined for robot tasks including a first task and a second task having a lower priority than a priority of the first task;

storing, by the robot controller, two or more received execution commands of two or more of the robot tasks including the first task and the second task;

monitoring, by the robot controller, the stored environment information stored by the host controller;

controlling, by the robot controller, the robot to execute the first task in response to determining that the stored environment information satisfies both an execution condition of the first task and an execution condition of the second task;

controlling, by the robot controller, the robot to execute the second task in response to determining that the stored environment information satisfies the execution condition of the second task and does not satisfy the execution condition of the first task;

controlling, by the robot controller, the robot to suspend the second task in response to determining that the stored environment information satisfies the execution condition of the first task during execution of the second task; and controlling, by the robot controller, the robot to execute the first task after completion of the second task without suspending the second task in response to determining that an execution time of the plurality of tasks becomes shorter if the first task is executed after completion of the second task.

* * * * *